United States Patent
Liu et al.

(10) Patent No.: US 12,550,038 B2
(45) Date of Patent: Feb. 10, 2026

(54) COMMUNICATION METHOD AND COMMUNICATION APPARATUS

(71) Applicant: HUAWEI TECHNOLOGIES CO., LTD., Guangdong (CN)

(72) Inventors: Jing Liu, Shenzhen (CN); Yuanping Zhu, Shanghai (CN); Yulong Shi, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 407 days.

(21) Appl. No.: 18/355,406

(22) Filed: Jul. 19, 2023

(65) Prior Publication Data

US 2023/0370943 A1    Nov. 16, 2023

Related U.S. Application Data

(63) Continuation of application No. PCT/CN2022/073305, filed on Jan. 21, 2022.

(30) Foreign Application Priority Data

Jan. 22, 2021    (CN) .......................... 202110091250.0

(51) Int. Cl.
H04W 40/12    (2009.01)
H04W 36/00    (2009.01)
H04W 92/12    (2009.01)

(52) U.S. Cl.
CPC ...... *H04W 40/12* (2013.01); *H04W 36/00695* (2023.05); *H04W 92/12* (2013.01)

(58) Field of Classification Search
None
See application file for complete search history.

(56) References Cited

U.S. PATENT DOCUMENTS

| 2017/0303145 A1 | 10/2017 | Yang et al. | |
| 2022/0131806 A1* | 4/2022 | Akl | H04L 47/24 |
| 2022/0132390 A1* | 4/2022 | Akl | H04W 40/04 |

(Continued)

FOREIGN PATENT DOCUMENTS

WO    2020164596 A1    8/2020

OTHER PUBLICATIONS

Huawei et al., "Consideration of topology adaptation enhancement for R17 IAB", 3GPP TSG-RAN WG2 Meeting #113-e R2-2101071, Jan. 15, 2021, total 11 pages.

(Continued)

*Primary Examiner* — Brian S Roberts

(57) ABSTRACT

In a communication system, a first central unit (CU) of a first donor node determines a first mapping that comprises a route mapping or a bearer mapping. The route mapping is between the downlink data and a downlink transmission path. The bearer mapping is between the downlink data and a downlink transmission bearer. The downlink transmission path includes a transmission path between the first CU and a target node of the downlink data through a second DU of a second donor node. The downlink transmission bearer includes a RLC channel between the second DU and a next-hop node of the second DU. The first CU then sends the first mapping to a second CU of the second donor node, and sends downlink data to the second DU of the second donor node.

20 Claims, 22 Drawing Sheets

(56) References Cited

U.S. PATENT DOCUMENTS

| | | | |
|---|---|---|---|
| 2022/0225166 A1* | 7/2022 | Akl | H04W 28/0263 |
| 2023/0239757 A1* | 7/2023 | Huang | H04W 36/0005 370/331 |
| 2023/0247495 A1* | 8/2023 | Teyeb | H04W 40/24 370/331 |
| 2023/0328625 A1* | 10/2023 | Xu | H04W 36/08 |

OTHER PUBLICATIONS

Huawei:"Discussion on the inter-donor topology management." 3GPP TSG-RAN WG3 Meeting #111-e R3-210549. Jan. 25-Feb. 4, 2021. total 5 pages.

* cited by examiner

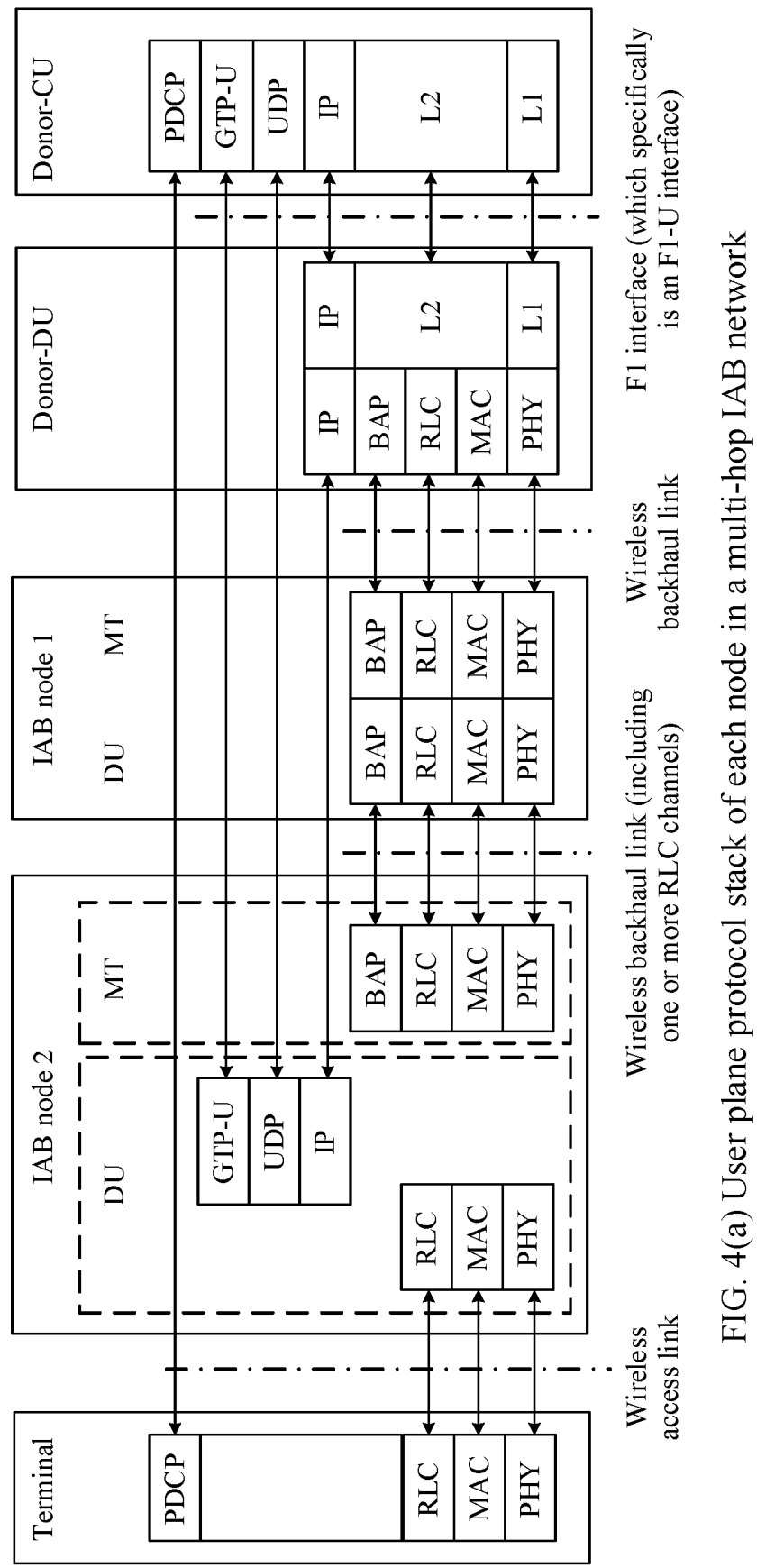
FIG. 4(a) User plane protocol stack of each node in a multi-hop IAB network

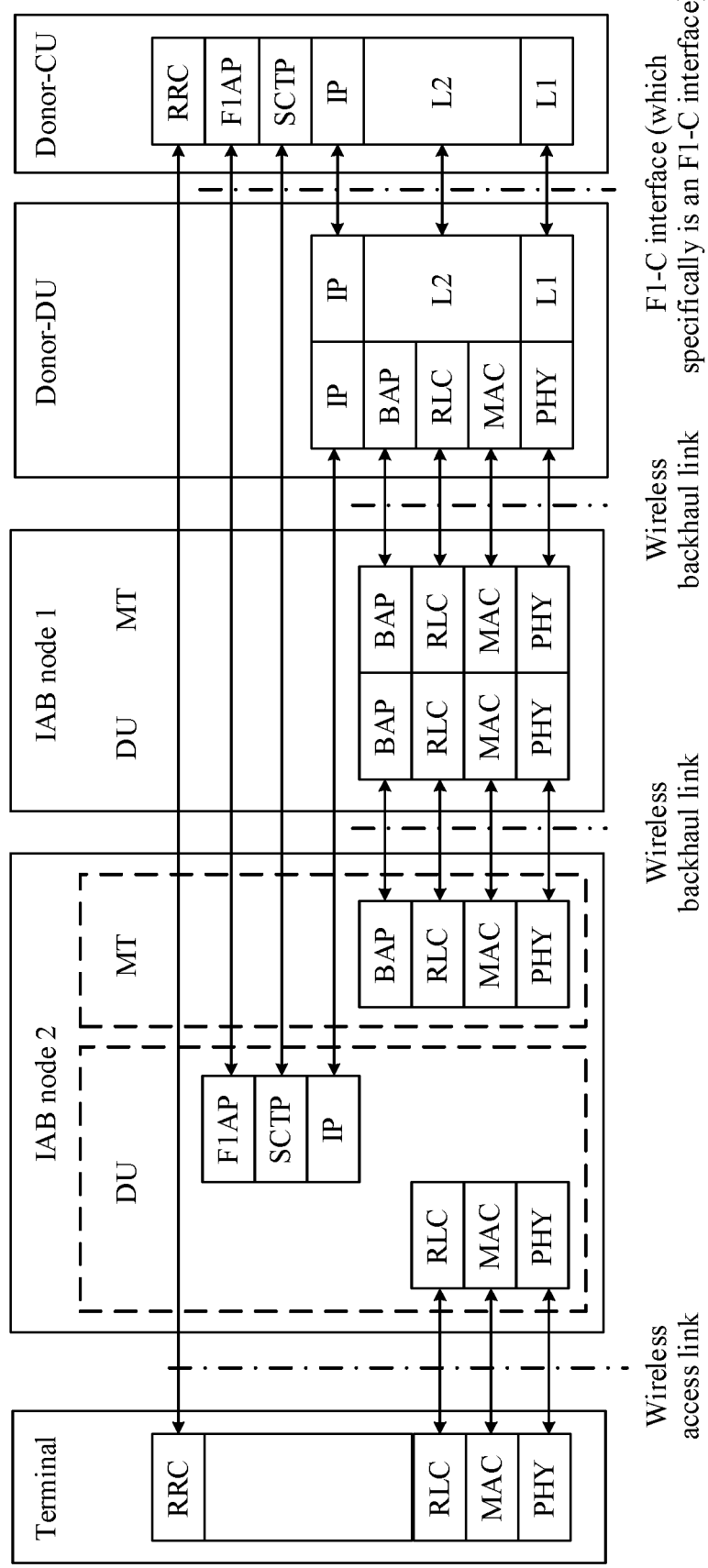
FIG. 4(b) Control plane protocol stack of each node in a multi-hop IAB network

COMMUNICATION METHOD AND COMMUNICATION APPARATUS

CROSS-REFERENCE TO RELATED APPLICATIONS

This application is a continuation of International Patent Application PCT/CN2022/073305, filed on Jan. 21, 2022, which claims priority to Chinese Patent Application 202110091250.0, filed on Jan. 22, 2021. The disclosure of the aforementioned priority applications are hereby incorporated by reference in their entirety.

TECHNICAL FIELD

This application relates to the field of communication technologies, and in particular, to a communication method and a communication apparatus.

BACKGROUND

In Release 15 of the 3rd Generation Partnership Project (3GPP), an integrated access and backhaul (IAB) node and an IAB donor node are introduced. The IAB node may provide a wireless access service for a terminal and connect to the donor node through a wireless backhaul link. One donor node may be connected to one or more IAB nodes. In a network that includes the IAB node, the IAB node may migrate. In a current communication standard discussion, a scenario and solution in which the IAB node performs intra-donor central unit (CU) migration are proposed. However, the current communication standard does not define a process in which the IAB node performs inter-donor-CU migration. Thus, currently there is no solution to ensure service continuity of a terminal in an inter-donor-CU migration scenario.

SUMMARY

Embodiments of this application provide a communication method and a communication apparatus, to ensure service continuity of a terminal in an inter-donor-CU migration scenario.

To achieve the foregoing objective, embodiments of this application provide the following technical solutions.

According to a first aspect, a communication method is provided, including: a first central unit (CU) of a first donor node (DU) determines a first mapping, and sends the first mapping to a second CU of a second donor node; and the first CU sends downlink data to a second DU of the second donor node.

The first mapping includes a route mapping and/or a bearer mapping. The route mapping is a mapping relationship between the downlink data and a downlink transmission path. The bearer mapping is a mapping relationship between the downlink data and a downlink transmission bearer. The downlink transmission path includes a transmission path between the first CU and a target node of the downlink data through the second DU. The downlink transmission bearer includes a radio link control RLC channel between the second DU and a first node. The first node is a next-hop node of the second DU.

According to the communication method provided in this embodiment of this application, in a scenario in which an IAB node performs inter-donor-CU migration, the first CU of the first donor node configures the first mapping for the downlink data of a terminal, and sends the first mapping to the second CU of the second donor node. In this way, after receiving the downlink data from the first donor node, the second donor node may perform route selection and bearer selection on the downlink data based on the first mapping, that is, in a scenario in which the IAB node performs inter-donor-CU migration, the downlink data can reach the terminal through the second donor node, to prevent service continuity of the terminal from being affected.

In a possible design, the mapping relationship between the downlink data and the downlink transmission path includes a target address of the downlink data, service attribute information of the downlink data, and a first routing identifier corresponding to the target address and the service attribute information; the mapping relationship between the downlink data and the downlink transmission bearer includes the target address of the downlink data, the service attribute information of the downlink data, and information about a first radio link control RLC channel corresponding to the target address and the service attribute information; and the downlink data includes the service attribute information.

Optionally, the service attribute information includes a differentiated services code point (DSCP) or a flow label. The service attribute information may be used to distinguish different services, to ensure service quality of service (QoS). In this way, data that carries different service attribute information may be transmitted through different transmission paths.

In a possible design, before the first CU sends the first mapping to a second CU, the method further includes:

The first CU receives, from the second CU, one or more second routing identifiers allocated by the second CU, where the first routing identifier is different from the one or more second routing identifiers. In this way, the first CU can learn of a routing identifier allocated by the second CU. Therefore, when reallocating a routing identifier, the first CU may allocate a different routing identifier to the second CU. This ensures that the routing identifier allocated by the first CU and the routing identifier allocated by the second CU are different, that is, routing identifiers allocated by the first CU and the second CU may uniquely identify a transmission path.

In a possible design, before the first CU sends the first mapping to a second CU, the method further includes:

The first CU receives, from the second CU, information about one or more RLC channels between the second DU and the first node, and quality of service QoS information corresponding to the one or more RLC channels, where the one or more RLC channels include the first RLC channel.

Generally, the first CU learns only information about a corresponding RLC channel of an IAB node managed or controlled by the first CU, and does not learn information about a corresponding RLC channel of a node managed and controlled by another CU (for example, the second CU); and the second CU needs to send, to the first CU, information about a corresponding RLC channel of a node managed and controlled by the second CU, so that the first CU determines the bearer mapping based on the information about the corresponding RLC channel.

Optionally, the first CU determines the service attribute information of the downlink data.

Alternatively, optionally, the second CU determines the service attribute information of the downlink data.

In a manner of determining, by the second CU, the service attribute information of the downlink data, in a possible design, the method further includes:

The first CU sends, to the second CU, information about a general packet radio service tunneling protocol GTP tunnel of the downlink data and QoS information corresponding to the GTP tunnel.

In this way, the second CU determines the service attribute information of the downlink data based on information received from the first CU.

In a manner of determining, by the second CU, the service attribute information of the downlink data, in a possible design, the method further includes:

The first CU receives, from the second CU, the information about the GTP tunnel of the downlink data and service attribute information corresponding to the GTP tunnel. In this way, the first CU can receive, from the second CU, the service attribute information that is of the downlink data and that is determined by the second CU, so that the first CU adds, based on the service attribute information, the corresponding service attribute information to an IP header of the downlink data.

In a possible design, the first donor node is a source donor node, and the second donor node is a target donor node; or the first donor node is a target donor node, and the second donor node is a source donor node.

In a possible design, the first donor node is a primary donor node, and the second donor node is a secondary donor node; or the first donor node is a secondary donor node, and the second donor node is a primary donor node.

According to a second aspect, this application provides a communication method, including:

A second CU of a second donor node receives a first mapping from a first central unit CU of a first donor node; and a second DU of the second donor node receives downlink data from the first CU.

The first mapping includes a route mapping and/or a bearer mapping. The route mapping is a mapping relationship between the downlink data and a downlink transmission path. The bearer mapping is a mapping relationship between the downlink data and a downlink transmission bearer. The downlink transmission path includes a transmission path between the first CU and a target node of the downlink data through the second DU. The downlink transmission bearer includes a radio link control RLC channel between the second DU and a first node. The first node is a next-hop node of the second DU.

In a possible design, the mapping relationship between the downlink data and the downlink transmission path includes a target address of the downlink data, service attribute information of the downlink data, and a first routing identifier corresponding to the target address and the service attribute information; the mapping relationship between the downlink data and the downlink transmission bearer includes the target address of the downlink data, the service attribute information of the downlink data, and information about a first radio link control RLC channel corresponding to the target address and the service attribute information; and the downlink data includes the service attribute information.

In a possible design, the downlink data includes the service attribute information.

In a possible design, the method further includes:

The second CU sends, to the first CU, one or more second routing identifiers allocated by the second CU, where the first routing identifier is different from the one or more second routing identifiers.

In a possible design, the method further includes:

The second CU sends, to the first CU, information about one or more RLC channels between the second DU and the first node, and quality of service QoS information corresponding to the one or more RLC channels, where the one or more RLC channels include the first RLC channel.

Optionally, the second CU determines the service attribute information of the downlink data.

In a manner of determining, by the second CU, the service attribute information of the downlink data, in a possible design, the method further includes:

The second CU receives, from the first CU, information about a general packet radio service tunneling protocol GTP tunnel of the downlink data and QoS information corresponding to the GTP tunnel.

In a manner of determining, by the second CU, the service attribute information of the downlink data, in a possible design, the method further includes:

The second CU sends, to the first CU, the information about the GTP tunnel of the downlink data and service attribute information corresponding to the GTP tunnel.

In a possible design, the first donor node is a source donor node, and the second donor node is a target donor node; or the first donor node is a target donor node, and the second donor node is a source donor node.

In a possible design, the first donor node is a primary donor node, and the second donor node is a secondary donor node; or the first donor node is a secondary donor node, and the second donor node is a primary donor node.

According to a third aspect, this application provides a communication method, including:

A second central unit (CU) of a second donor node determines a first mapping, and a second DU of the second donor node receives downlink data from a first CU of a first donor node.

The first mapping includes a route mapping and/or a bearer mapping. The route mapping is a mapping relationship between the downlink data and a downlink transmission path. The bearer mapping is a mapping relationship between the downlink data and a downlink transmission bearer. The downlink transmission path includes a transmission path between the first CU and a target node of the downlink data through the second DU. The downlink transmission bearer includes an RLC channel between the second DU and a first node. The first node is a next-hop node of the second DU.

In this method, the second donor node can determine the first mapping. Therefore, when receiving the downlink data, the second donor node can perform route selection and bearer selection on the received downlink data based on the first mapping. In this way, in a scenario in which an IAB node performs inter-donor-CU migration, the downlink data can reach a terminal through the second donor node. This further improves service continuity of the terminal.

In a possible design, the mapping relationship between the downlink data and the downlink transmission path includes a target address of the downlink data, service attribute information of the downlink data, and a third routing identifier corresponding to the target address and the service attribute information; and the mapping relationship between the downlink data and the downlink transmission bearer includes the target address of the downlink data, the service attribute information of the downlink data, and information about a second radio link control RLC channel corresponding to the target address and the service attribute information.

In a possible design, the method further includes:

The second CU receives, from the first CU, the service attribute information of the downlink data and quality of service QoS information corresponding to the service attribute information.

In a possible design, before the second CU determines the first mapping, the method further includes:

The second CU receives, from the first CU, one or more fourth routing identifiers allocated by the first CU. The third routing identifier is different from the one or more fourth routing identifiers.

In a possible design, before the second CU determines the first mapping, the method further includes:

The second CU receives, from the first CU, information about one or more RLC channels and QoS information corresponding to the one or more RLC channels. The one or more RLC channels include the second RLC channel.

In a possible design, the method further includes:

The second CU receives, from the first CU, information about a general packet radio service tunneling protocol GTP tunnel of the downlink data and QoS information corresponding to the GTP tunnel.

In a possible design, the method further includes:

The second CU sends, to the first CU, the information about the GTP tunnel of the downlink data and service attribute information corresponding to the GTP tunnel.

According to a fourth aspect, this application provides a communication method, where a first CU of a first donor node determines service attribute information of downlink data, and the method includes:

The first CU of the first donor node determines the service attribute information of the downlink data, and sends the service attribute information to a second CU of a second donor node.

In a possible design, the method further includes:

The first CU sends, to the second CU, the service attribute information of the downlink data and quality of service QoS information corresponding to the service attribute information.

In a possible design, the method further includes:

The first CU sends, to the second CU, one or more fourth routing identifiers allocated by the first CU.

In a possible design, the method further includes:

The first CU sends, to the second CU, information about one or more RLC channels and QoS information corresponding to the one or more RLC channels.

According to a fifth aspect, this application provides a communication method, where a first CU of a first donor node sends some information to a second CU of a second donor node, so that the second CU determines service attribute information of downlink data based on the some information, and the method includes:

The first CU of the first donor node determines information about a general packet radio service tunneling protocol GTP tunnel of the downlink data and QoS information corresponding to the GTP tunnel.

The first CU sends, to the second CU of the second donor node, the information about the GTP tunnel and the QoS information corresponding to the GTP tunnel.

In a possible design, the method further includes:

The first CU receives, from the second CU, the information about the GTP tunnel of the downlink data and service attribute information corresponding to the GTP tunnel.

In a possible design, the method further includes:

The first CU sends, to the second CU, one or more fourth routing identifiers allocated by the first CU.

In a possible design, the method further includes:

The first CU sends, to the second CU, information about one or more RLC channels and QoS information corresponding to the one or more RLC channels.

According to a sixth aspect, this application provides a communication method, including:

A first CU of a first donor node determines service attribute information of downlink data and a first mapping, and sends the first mapping to a second CU of a second donor node; and the first CU sends the downlink data to a second DU of the second donor node.

The first mapping includes a route mapping and/or a bearer mapping. The route mapping is a mapping relationship between the downlink data and a downlink transmission path. The bearer mapping is a mapping relationship between the downlink data and a downlink transmission bearer. The downlink transmission path includes a transmission path between the first CU and a target node of the downlink data through the second DU. The downlink transmission bearer includes a radio link control RLC channel between the second DU and a first node. The first node is a next-hop node of the second DU.

In a possible design, the mapping relationship between the downlink data and the downlink transmission path includes a target address of the downlink data, service attribute information of the downlink data, and a first routing identifier corresponding to the target address and the service attribute information; the mapping relationship between the downlink data and the downlink transmission bearer includes the target address of the downlink data, the service attribute information of the downlink data, and information about a first radio link control RLC channel corresponding to the target address and the service attribute information; and the downlink data includes the service attribute information.

In a possible design, the method further includes:

The first CU receives, from the second CU, one or more second routing identifiers allocated by the second CU, where the first routing identifier is different from the one or more second routing identifiers.

In a possible design, the method further includes:

The first CU receives, from the second CU, information about one or more RLC channels between the second DU and the first node, and quality of service QoS information corresponding to the one or more RLC channels.

In a possible design, the first donor node is a source donor node, and the second donor node is a target donor node; or the first donor node is a target donor node, and the second donor node is a source donor node.

In a possible design, the first donor node is a primary donor node, and the second donor node is a secondary donor node; or the first donor node is a secondary donor node, and the second donor node is a primary donor node.

According to a seventh aspect, this application provides a communication method, including:

A first CU of a first donor node receives service attribute information of downlink data;

a second CU of a second donor node determines a first mapping; and the first CU sends the downlink data to a second DU of the second donor node.

The first mapping includes a route mapping and/or a bearer mapping. The route mapping is a mapping relationship between the downlink data and a downlink transmission path. The bearer mapping is a mapping relationship between the downlink data and a downlink transmission bearer. The downlink transmission path includes a transmission path between the first CU and a target node of the downlink data through the second DU. The downlink transmission bearer includes a radio link control RLC channel between the second DU and a first node. The first node is a next-hop node of the second DU.

In a possible design, before the second CU determines the first mapping, the method further includes:

The first CU sends, to the second CU, the service attribute information and quality of service QoS information corresponding to the service attribute information.

In a possible design, the method further includes:

The first CU sends, to the second CU, one or more fourth routing identifiers allocated by the first CU.

In a possible design, the method further includes:

The first CU sends, to the second CU, information about one or more RLC channels and QoS information corresponding to the one or more RLC channels.

According to an eighth aspect, this application provides a communication method. The method includes:

A second CU of a second donor node determines service attribute information of downlink data and a first mapping; and a first CU of a first donor node sends the downlink data to a second DU of the second donor node.

The first mapping includes a route mapping and/or a bearer mapping. The route mapping is a mapping relationship between the downlink data and a downlink transmission path. The bearer mapping is a mapping relationship between the downlink data and a downlink transmission bearer. The downlink transmission path includes a transmission path between the first CU and a target node of the downlink data through the second DU. The downlink transmission bearer includes an RLC channel between the second DU and a first node. The first node is a next-hop node of the second DU.

In a possible design, the first CU sends, to the second CU, information about a GTP tunnel of the downlink data and QoS information corresponding to the GTP tunnel.

In a possible design, the first CU receives, from the second CU, the information about the GTP tunnel of the downlink data and service attribute information corresponding to the GTP tunnel.

According to a ninth aspect, this application provides a communication method, including:

A second CU of a second donor node determines service attribute information of downlink data;

a first CU of a first donor node determines a first mapping, and sends the first mapping to the second CU; and the first CU sends the downlink data to a second DU of the second donor node.

The first mapping includes a route mapping and/or a bearer mapping. The route mapping is a mapping relationship between the downlink data and a downlink transmission path. The bearer mapping is a mapping relationship between the downlink data and a downlink transmission bearer. The downlink transmission path includes a transmission path between the first CU and a target node of the downlink data through the second DU. The downlink transmission bearer includes an RLC channel between the second DU and a first node. The first node is a next-hop node of the second DU.

In a possible design, the first CU sends, to the second CU, information about a GTP tunnel of the downlink data and QoS information corresponding to the GTP tunnel.

In a possible design, the first CU receives, from the second CU, the information about the GTP tunnel of the downlink data and service attribute information corresponding to the GTP tunnel.

According to a tenth aspect, this application provides a communication method, including:

A primary network device determines first indication information, and sends the first indication information to a secondary network device.

The first indication information is used to request/indicate the secondary network device to transmit first signaling to a first node through a first signaling radio bearer.

In a possible design, the method further includes: The primary network device receives second indication information from the secondary network device, where the second indication information indicates that establishment of the first signaling radio bearer fails, or indicates that the first signaling cannot be transmitted through the first signaling radio bearer.

In a possible design, the method further includes:

The primary network device sends third indication information to the first node, where the third indication information indicates information about an uplink transmission path used for transmitting the first signaling, and the uplink transmission path includes an MCG path or an SCG path.

In a possible design, the method further includes:

The primary network device sends fourth indication information to the first node, where the fourth indication information indicates information about a bearer for transmitting the first signaling on the uplink transmission path.

In a possible design, the first signaling includes an F1-C message.

In a possible design, the first signaling radio bearer includes an SRB 3 or a split SRB.

In a possible design, if the first signaling radio bearer is the SRB 3, the method includes:

The primary network device sends the first signaling to the secondary network device. The secondary network device encapsulates the first signaling into an RRC message and sends the RRC message to the first node through the SRB 3.

In a possible design, if the first signaling radio bearer is the split SRB, the method includes:

The primary network device encapsulates the first signaling into an RRC message, and sends the RRC message to the secondary network device. The secondary network device sends the RRC message to the first node through the split SRB.

According to the method, the F1-C message may be transmitted on the SCG path, and reliability of transmitting the F1-C message can be improved.

According to an eleventh aspect, this application provides a communication method, including:

A primary network device receives fifth indication information from a secondary network device, and sends first signaling to the secondary network device based on the fifth indication information.

The fifth indication information indicates bearer information corresponding to transmission of the first signaling on an SCG path.

In a possible design, before the primary network device receives the fifth indication information from the secondary network device, the method further includes:

The primary network device sends sixth indication information to the secondary network device, where the sixth indication information is used to request the secondary network device to transmit the first signaling.

In a possible design, the method further includes:

The primary network device sends third indication information to a first node, where the third indication information indicates information about an uplink transmission path used for transmitting the first signaling, and the uplink transmission path includes an MCG path or an SCG path.

In a possible design, the method further includes:

The primary network device sends fourth indication information to the first node, where the fourth indication information indicates information about a bearer for transmitting the first signaling on the uplink transmission path.

In a possible design, the first signaling includes an F1-C message.

In a possible design, the first signaling radio bearer includes an SRB 3 or a split SRB.

In a possible design, if the first signaling radio bearer is the SRB 3, the method includes:

The primary network device sends the first signaling to the secondary network device. The secondary network device encapsulates the first signaling into an RRC message and sends the RRC message to the first node through the SRB 3.

In a possible design, if the first signaling radio bearer is the split SRB, the method includes:

The primary network device encapsulates the first signaling into an RRC message, and sends the RRC message to the secondary network device. The secondary network device sends the RRC message to the first node through the split SRB.

According to a twelfth aspect, this application provides a communication apparatus. The apparatus includes a module configured to perform any one of the first aspect or the possible implementations of the first aspect.

According to a thirteenth aspect, this application provides a communication apparatus. The apparatus includes a module configured to perform any one of the second aspect or the possible implementations of the second aspect.

According to a fourteenth aspect, this application provides a communication apparatus. The apparatus includes a module configured to perform any one of the third aspect or the possible implementations of the third aspect.

According to a fifteenth aspect, this application provides a communication apparatus. The apparatus includes a module configured to perform any one of the fourth aspect or the possible implementations of the fourth aspect.

According to a sixteenth aspect, this application provides a communication apparatus. The apparatus includes a module configured to perform any one of the fifth aspect or the possible implementations of the fifth aspect.

According to a seventeenth aspect, this application provides a communication apparatus. The apparatus includes a module configured to perform any one of the sixth aspect or the possible implementations of the sixth aspect.

According to an eighteenth aspect, this application provides a communication apparatus. The apparatus includes a module configured to perform any one of the seventh aspect or the possible implementations of the seventh aspect.

According to a nineteenth aspect, this application provides a communication apparatus. The apparatus includes a module configured to perform any one of the eighth aspect or the possible implementations of the eighth aspect.

According to a twentieth aspect, this application provides a communication apparatus. The apparatus includes a module configured to perform any one of the ninth aspect or the possible implementations of the ninth aspect.

According to a twenty-first aspect, this application provides a communication apparatus. The apparatus includes a module configured to perform any one of the tenth aspect or the possible implementations of the tenth aspect.

According to a twenty-second aspect, this application provides a communication apparatus. The apparatus includes a module configured to perform any one of the eleventh aspect or the possible implementations of the eleventh aspect.

According to a twenty-third aspect, a network node is provided, including a processor. The processor is connected to a memory, the memory is configured to store computer-executable instructions, and the processor executes the computer-executable instructions stored in the memory, to implement any method provided in any one of the foregoing aspects. The memory and the processor may be integrated together, or may be independent components. If the memory and the processor are independent components, the memory may be located inside the network node, or may be located outside the network node.

In a possible implementation, the processor includes a logic circuit and an input interface and/or an output interface. The output interface is configured to perform a sending action in a corresponding method, and the input interface is configured to perform a receiving action in a corresponding method.

In a possible implementation, the network node further includes a communication interface and a communication bus, and the processor, the memory, and the communication interface are connected through the communication bus. The communication interface is configured to perform receiving and sending actions in the corresponding method. The communication interface may also be referred to as a transceiver. Optionally, the communication interface includes a transmitter or a receiver. In this case, the transmitter is configured to perform a sending action in a corresponding method, and the receiver is configured to perform a receiving action in a corresponding method.

In a possible implementation, the network node exists in a product form of a chip.

According to a twenty-fourth aspect, a computer-readable storage medium is provided, including instructions. When the instructions are run on a computer, the computer is enabled to perform any method provided in any one of the foregoing aspects.

According to a twenty-fifth aspect, a computer program product including instructions is provided. When the instructions are run on a computer, the computer is enabled to perform any method provided in any one of the foregoing aspects.

According to a twenty-sixth aspect, a system chip is provided. The system chip is applied to a network node, the system chip includes at least one processor, and related program instructions are executed in the at least one processor, to perform any method provided in any one of the foregoing aspects.

According to a twenty-seventh aspect, a communication system is provided, including one or more network nodes of the network nodes provided in the twelfth aspect to the twenty-second aspect.

It should be noted that various possible implementations in any one of the foregoing aspects may be combined on a premise that the solutions are not contradictory.

BRIEF DESCRIPTION OF DRAWINGS

FIG. 3, FIG. 4(a), and FIG. 4(b) each are a schematic diagram of an architecture of a protocol stack according to an embodiment of this application;

FIG. 7-1 to FIG. 7-3 each are a schematic diagram of an inter-donor-CU migration scenario according to an embodiment of this application;

FIG. 7-4 to FIG. 7-6 each are a schematic diagram of a dual-connectivity scenario according to an embodiment of this application;

FIG. 15-1 is a flowchart of a communication method according to an embodiment of this application;

FIG. 15-2 is a schematic diagram of protocol stack processing related to SRB 3 transmission according to an embodiment of this application;

FIG. 15-3 is a schematic diagram of protocol stack processing related to split SRB transmission according to an embodiment of this application;

DESCRIPTION OF EMBODIMENTS

Figure 1:
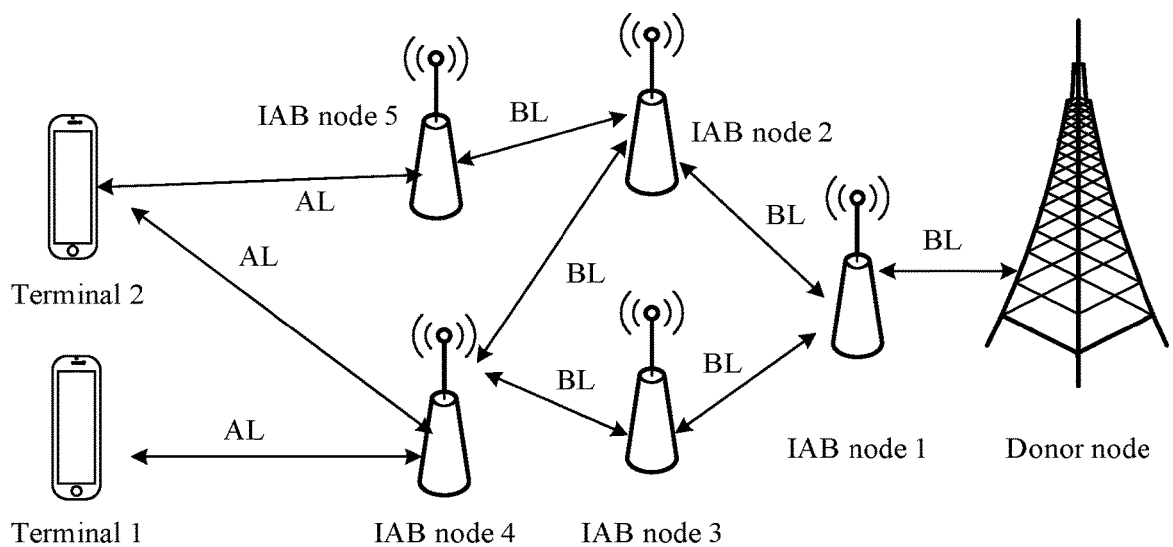
FIG. 1 is a schematic diagram of an IAB networking scenario according to an embodiment of this application.

The following describes the technical solutions in embodiments of this application with reference to the accompanying drawings in embodiments of this application. In descriptions of this application, unless otherwise specified, "/" means "or". For example, AB may represent A or B. A term "and/or" in this specification describes only an association relationship between associated objects and indicates that there may be three relationships. For example, A and/or B may represent the following three cases: Only A exists, both A and B exist, and only B exists. In addition, in the descriptions of this application, unless otherwise specified, "a plurality of" means two or more than two. In addition, to clearly describe the technical solutions in embodiments of this application, terms such as "first" and "second" are used in embodiments of this application to distinguish between same items or similar items that provide basically same functions or purposes. Persons skilled in the art may understand that the terms such as "first" and "second" do not limit a quantity or an execution sequence, and the terms such as "first" and "second" do not indicate a definite difference.

The technical solutions in embodiments of this application may be applied to various communication systems, for example, an orthogonal frequency division multiple access (OFDMA) system, a single-carrier frequency division multiple access (SC-FDMA), and another system. Terms "system" and "network" may be interchanged with each other. The OFDMA system may implement wireless technologies such as evolved universal terrestrial radio access (E-UTRA) and ultra mobile broadband (UMB). E-UTRA is an evolved version of a universal mobile telecommunication system (UMTS). A new version of E-UTRA is used in 3GPP long term evolution (LTE) and various versions evolved based on the LTE. A fifth generation (5G) communication system using new radio (NR) is a next-generation communication system under research. In addition, the communication system may be further applied to a future-oriented communication technology to which the technical solutions provided in embodiments of this application are applicable.

Devices in this application include a terminal and a wireless backhaul node.

The terminal in embodiments of this application may also be referred to as user equipment (UE), an access terminal, a subscriber unit, a subscriber station, a mobile station, a remote station, a remote terminal, a mobile device, a user terminal, a wireless communication device, a user agent, or a user apparatus. Alternatively, the terminal may be a station (ST) in a wireless local area network (WLAN), or may be a cellular phone, a cordless phone, a session initiation protocol (SIP) phone, a wireless local loop (WLL) station, a personal digital assistant (PDA) device, a handheld device having a wireless communication function, a computing device or another processing device connected to a wireless modem, a vehicle-mounted device, or a wearable device (which may also be referred to as a wearable intelligent device). Alternatively, the terminal may be a terminal in the next-generation communication system, for example, a terminal in 5G or a terminal in a future evolved public land mobile network (PLMN).

The wireless backhaul node is configured to provide a wireless backhaul service for a node (for example, the terminal) that wirelessly accesses the wireless backhaul node. The wireless backhaul service is a data and/or signaling backhaul service provided through a wireless backhaul link.

System architectures and service scenarios described in embodiments of this application are intended to describe the technical solution in embodiments of this application more clearly, and do not constitute a limitation on the technical solutions provided in embodiments of this application. Persons of ordinary skill in the art may learn that the technical solutions provided in embodiments of this application are also applicable to a similar technical problem as a network architecture evolves and a new service scenario emerges. In embodiments of this application, an example in which methods provided in embodiments of this application are applied to an NR system or a 5G network is used for description. However, it should be noted that the methods provided in embodiments of this application may also be applied to another network, for example, may be applied to an evolved packet system (EPS) network (namely, a 4th generation (4G) network). Correspondingly, when the methods provided in embodiments of this application are applied to the EPS network, a network node performing the methods provided in embodiments of this application is replaced with a network node in the EPS network. For example, when the methods provided in embodiments of this application are applied to a 5G network or an NR system, a wireless backhaul node in the following descriptions may be a wireless backhaul node in the 5G network. For example, the wireless backhaul node in the 5G network may be referred to as an IAB node, or may have another name. This is not specifically limited in embodiments of this application. When the methods provided in embodiments of this application are applied to the EPS network, a wireless backhaul node in the following descriptions may be a wireless backhaul node in the EPS network. For example, the wireless backhaul node in the EPS network may be referred to as a relay node (RN).

With development of technologies such as virtual reality (VR), augmented reality (AR), and the internet of things, there will be more terminals in a future network, and usage of network data will also continuously increase. To adapt to an increasing quantity of terminals and rapidly increasing usage of the network data in the market, higher requirements are imposed on capacity of the 5G network. In a hotspot area, to meet a 5G ultra-high capacity requirement, using a high-frequency small cell for networking becomes more popular. A high-frequency carrier has a poor propagation characteristic, is severely attenuated if blocked, and has small coverage. Therefore, a large quantity of small cells need to be densely deployed in the hotspot area. These small cells may be IAB nodes.

To design a flexible and convenient access and backhaul solution, a wireless transmission solution may be used for both an access link (AL) and a backhaul link (BL) in an IAB scenario.

In a network including an IAB node (referred to as an IAB network for short below), the IAB node may provide a radio access service for a terminal, and is connected to a donor node through a wireless backhaul link to transmit service data of a user. For example, the donor node may be a donor base station. The donor node may be an IAB donor or a DgNB (namely, a donor gNodeB) for short in the 5G network. The donor node may be a complete entity, or may be in a form in which a central unit (CU) (referred to as a donor-CU or CU for short in this specification) and a distributed unit (DU) (referred to as a donor-DU for short in this specification) are separated, that is, the donor node includes the donor-CU and the donor-DU. In embodiments of this application and the accompanying drawings, an example in which the donor node includes the donor-CU and the donor-DU is used to describe the methods provided in embodiments of this application.

The donor-CU may alternatively be in a form in which a user plane (UP) (referred to as a CU-UP for short in this specification) and a control plane (CP) (referred to as a CU-CP for short in this specification) are separated, that is, the donor-CU includes the CU-CP and the CU-UP.

The IAB node is connected to a core network through the donor node via a wired link. For example, in a 5G standalone architecture, the IAB node is connected to a core network (5G core (5GC)) of a 5G network through the donor node via the wired link. In a 5G non-standalone architecture, the IAB node is connected to an evolved packet core (EPC) through an evolved NodeB (eNB) on the control plane, and is connected to the EPC through the donor node and an eNB on the user plane.

To ensure service transmission reliability, an IAB network supports multi-hop IAB node networking and multi-connection IAB node networking. Therefore, there may be a plurality of transmission paths between the terminal and the donor node. On one path, there is a determined hierarchical relationship between IAB nodes, and between an IAB node and a donor node serving the IAB node. Each IAB node considers, as a parent node, a node providing a backhaul service for the IAB node. Accordingly, each IAB node may be considered as a child node of the parent node of the IAB node.

For example, refer to FIG. 1. A parent node of an IAB node 1 is a donor node, the IAB node 1 is a parent node of an IAB node 2 and an IAB node 3, both the IAB node 2 and the IAB node 3 are parent nodes of an IAB node 4, and a parent node of an IAB node 5 is the IAB node 2. An uplink data packet of a terminal may be transmitted to the donor node through one or more IAB nodes, and then sent by the donor node to a mobile gateway device (for example, a user plane function (UPF) network element in the 5G network). A path for transmitting the uplink data packet is referred to as an uplink transmission path. A downlink data packet is received by the donor node from the mobile gateway device, and then sent to the terminal through the one or more IAB nodes. A path for transmitting the downlink data packet is referred to as a downlink transmission path. For example, in FIG. 1, there are two available paths for data packet transmission between a terminal 1 and the donor node, and the two available paths are: the terminal 1→the IAB node 4→the IAB node 3→the IAB node 1→the donor node, and the terminal 1→the IAB node 4→the IAB node 2→the IAB node 1→the donor node. There are three available paths for data packet transmission between a terminal 2 and the donor node: the terminal 2→the IAB node 4→the IAB node 3→the IAB node 1→the donor node, the terminal 2→the IAB node 4→the IAB node 2→the IAB node 1→the donor node, and the terminal 2→the IAB node 5→the IAB node 2→the IAB node 1→the donor node.

It may be understood that, in the IAB network, one transmission path between the terminal and the donor node may include one or more IAB nodes. Each IAB node needs to maintain a wireless backhaul link oriented to a parent node and a wireless link with a child node. If one IAB node is a node accessed by the terminal, a wireless access link exists between the IAB node and a child node (namely, the terminal). If one IAB node is a node that provides a backhaul service for another IAB node, a wireless backhaul link exists between the IAB node and a child node (namely, the another IAB node). For example, refer to FIG. 1. On a path "the terminal 1→the IAB node 4→the IAB node 3→the IAB node 1→the donor node", the terminal 1 accesses the IAB node 4 through a wireless access link, the IAB node 4 accesses the IAB node 3 through a wireless backhaul link, the IAB node 3 accesses the IAB node 1 through a wireless backhaul link, and the IAB node 1 accesses the donor node through a wireless backhaul link.

In still some embodiments, for example, the IAB node may be a device such as a customer premises equipment (CPE) and a residential gateway (RG). In this case, the methods provided in embodiments of this application may further be applied to a home access scenario.

The foregoing IAB networking scenario is merely an example. In an IAB scenario in which multi-hop and multi-connectivity are combined, there are more other possible IAB networking scenarios. For example, a donor node and an IAB node connected to another donor node form dual-connectivity to serve the terminal. The possible IAB networking scenarios are not enumerated herein.

To make embodiments of this application more clearly, the following collectively describes some content and concepts related to embodiments of this application.

1. Link, Previous-Hop Node of a Node, Next-Hop Node of a Node, Ingress Link of a Node, and Egress Link of a Node Link: A link is a path between two neighboring nodes on a path.

A previous-hop node of a node is a last node that is on a path including the node and that receives a data packet earlier than the node. The previous-hop node of the node may also be referred to as a previous-hop node of the data packet. For example, still refer to FIG. 1. For downlink transmission, the IAB node 3 may be referred to as a previous-hop node of the IAB node 4. For uplink transmission, the IAB node 4 may be referred to as a previous-hop node of the IAB node 3.

A next-hop node of a node is a first node that is on a path including the node and that receives a data packet later than the node. The next-hop node of the node may also be referred to as a next-hop node of the data packet.

An ingress link of a node refers to a link between the node and a previous-hop node of the node, and may also be referred to as a previous-hop link of the node.

An egress link of a node refers to a link between the node and a next-hop node of the node, and may also be referred to as a next-hop link of the node.

An ingress RLC radio link control channel refers to a backhaul radio link control channel between a node and a previous-hop node of the node.

An egress RLC radio link control channel refers to a backhaul radio link control channel between a node and a next-hop node of the node.

2. Access IAB Node and Intermediate IAB Node

In embodiments of this application, an access IAB node is an IAB node accessed by a terminal, and an intermediate IAB node is an IAB node that provides a wireless backhaul service for another IAB node (for example, the access IAB node or another intermediate IAB node).

For example, refer to FIG. 1. On a path "the terminal 1→the IAB node 4→the IAB node 3→the IAB node 1→the donor node", the IAB node 4 is the access IAB node, and the IAB node 3 and the IAB node 1 are intermediate IAB nodes. The IAB node 3 provides a backhaul service for the IAB node 4, and the IAB node 1 provides a backhaul service for the IAB node 3.

It should be noted that an IAB node is an access IAB node for a terminal that accesses the IAB node, and all other IAB nodes on a path between the access IAB node and a donor node are intermediate IAB nodes. Therefore, whether an IAB node is specifically an access IAB node or an intermediate IAB node is not fixed and needs to be determined based on a specific application scenario. For example, still refer to FIG. 1. The IAB node 4 may be referred to as an access IAB node of UE 1, and the IAB node 3 may be referred to as an intermediate IAB node.

3. Components of an IAB Node

An IAB node may be considered as an MT and a DU. When the IAB node is oriented to a parent node of the IAB node, the IAB node may be considered as a terminal. In this case, the IAB node serves as the MT. When the IAB node is oriented to a child node of the IAB node (the child node may be a terminal or a terminal part of another IAB node), the IAB node may be considered as a network device. In this case, the IAB node serves as the DU. Therefore, it may be considered that the IAB node includes an MT part and a DU part. An IAB node may establish a backhaul connection with at least one parent node of the IAB node through the MT part. A DU part of the IAB node may provide an access service for a terminal or an MT part of another IAB node.

Figure 2:
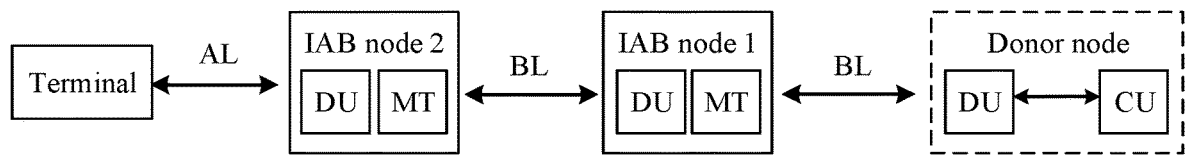
FIG. 2 is a schematic diagram of nodes in a transmission path according to an embodiment of this application.

For example, refer to FIG. 2. A terminal is connected to a donor node sequentially through a IAB node 2 and a IAB node 1. The IAB node 1 and the IAB node 2 each include a DU part and an MT part. The DU part of the IAB node 2 provides an access service for the terminal. The DU part of the IAB node 1 provides an access service for the MT part of the IAB node 2. A donor-DU provides an access service for the MT part of the IAB node 1. The donor-DU and a donor-CU may be connected through an F1 interface. The donor-CU may be connected to a core network through an NG interface.

In this embodiment of this application, the MT part of the IAB node may be referred to as an IAB-MT (or referred to as an IAB-UE) for short, and the DU part of the IAB node may be referred to as an IAB-DU for short.

4. Protocol Stack Architectures of an Intermediate IAB Node, an Access IAB Node, a Donor-DU, a Donor-CU, and a Terminal A user plane protocol stack (as shown in (a) in FIG. 3) of an intermediate IAB node is the same as a control plane protocol stack (as shown in (b) in FIG. 3) of the intermediate IAB node.

Figure 3:
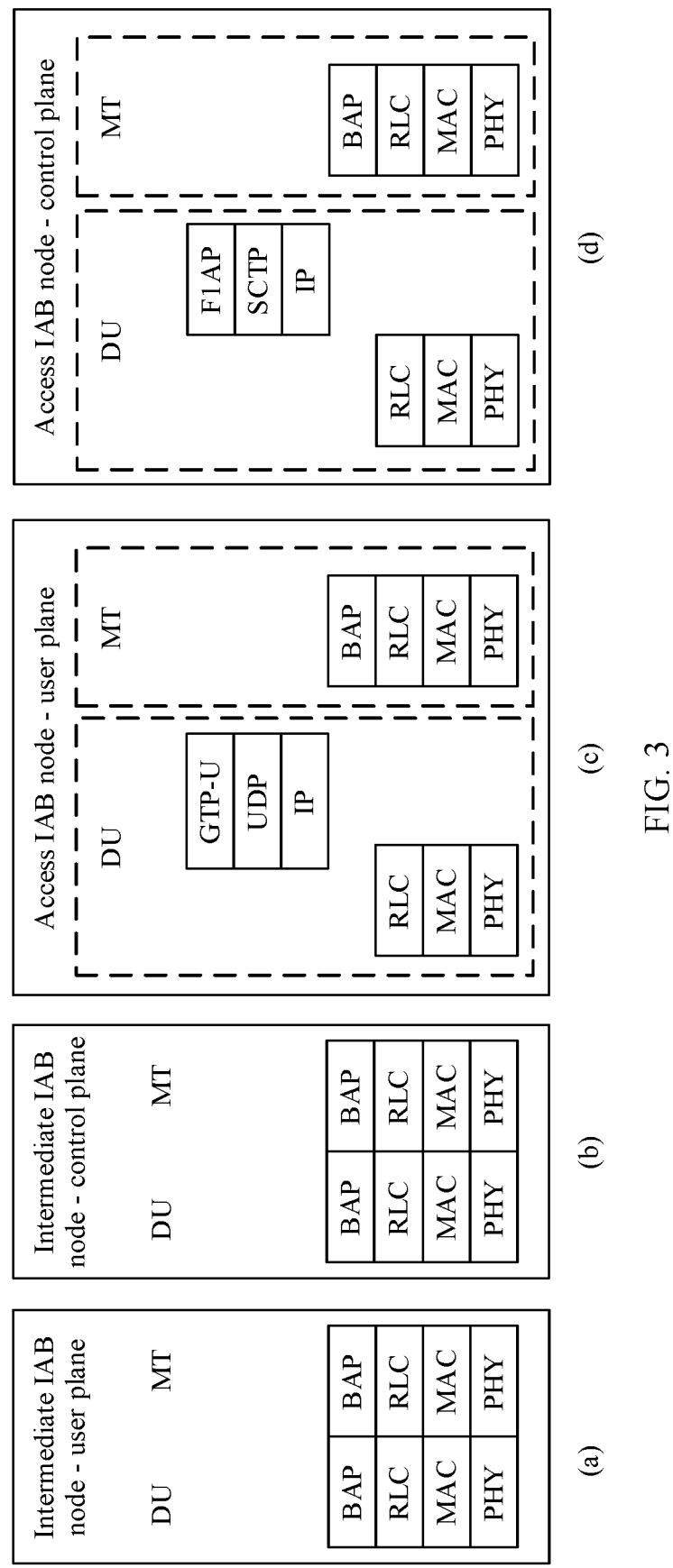

A user plane protocol stack of an access IAB node is different from a control plane protocol stack of the access IAB node, refer to (c) in FIG. 3 and (d) in FIG. 3 respectively.

For example, based on the example shown in FIG. 3, for an architecture of user plane protocol stack of each node, refer to FIG. 4(a), and for an architecture of a control plane protocol stack of each node, refer to FIG. 4(b).

Meanings of protocol layers in FIG. 3, FIG. 4(a), and FIG. 4(b) are: a packet data convergence protocol (PDCP) layer, a general packet radio service tunneling protocol user plane (GTP-U) layer, a user datagram protocol (UDP) layer, an internet protocol (IP) layer, an L2 layer (layer 2), an L1 layer (layer 1), a radio link control (RLC) layer, a medium access control (MAC) layer, a physical (PHY) layer, a radio resource control (RRC) layer, an F1 application protocol (F1AP) layer, and a stream control transmission protocol (SCTP) layer. The L2 layer is a link layer. For example, the L2 layer may be a data link layer in an open systems interconnection (OSI) reference model. The L1 layer may be a physical layer. For example, the L1 layer may be a physical layer in the OSI reference model.

It should be noted that, in FIG. 4(a) and FIG. 4(b), an example in which a donor node includes a donor-DU and a donor-CU is used for drawing. Therefore, protocol layers of the donor-DU and the donor-CU are shown in FIG. 4(a) and FIG. 4(b). If the donor node is an entity with complete functions, the donor node only retains protocol stacks of external interfaces of the donor-DU and the donor-CU, and does not need a protocol layer on an internal interface between the donor-DU and the donor-CU.

In addition, it should be noted that, regardless of an architecture of a control plane protocol stack or an architecture of a user plane protocol stack, when the donor-DU is a proxy node of the F1 interface between the donor-CU and the IAB node, in an architecture of an IAB node-oriented protocol stack in the donor-DU and above the IP layer, a UDP layer and a GTP-U layer (not shown in FIG. 4(a) and FIG. 4(b)) that are respectively equivalent to the UDP layer and the GTP-U layer in an architecture of a protocol stack of the DU part in the access IAB node are included.

5. Protocol Layer of an F1 Interface and Protocol Layer of a Wireless Backhaul Interface An F1 interface may refer to a logical interface between an IAB node (for example, an IAB-DU) and a donor node (for example, a donor-CU). The F1 interface may also have another name, and supports a user plane and a control plane. A protocol layer of the F1 interface is a communication protocol layer on the F1 interface.

In some other embodiments, the F1 interface may alternatively be a wired interface between a donor-CU and a donor-DU.

For example, a user plane protocol layer of the F1 interface may include one or more of an IP layer, a UDP layer, and a GTP-U layer. Optionally, the user plane protocol stack of the F1 interface further includes a PDCP layer and/or an IP security (IPsec) layer.

For example, a control plane protocol layer of the F1 interface may include one or more of an IP layer, an F1AP layer, and an SCTP layer. Optionally, the control plane protocol layer of the F1 interface further includes one or more of a PDCP layer, an IPsec layer, and a datagram transport layer security (DTLS) layer.

A wireless backhaul interface is a logical interface between IAB nodes or between an IAB node and a donor node (or donor-DU). A protocol layer of the wireless backhaul interface is a communication protocol layer on the wireless backhaul interface. The protocol layer of the wireless backhaul interface includes one or more of the following protocol layers: a backhaul adaptation protocol (BAP) layer, an RLC layer, a MAC layer, and a PHY layer.

For example, a user plane protocol layer of the IAB node on the F1 interface includes a GTP-U layer, a UDP layer, and an IP layer. In one case, refer to FIG. 4(a). The GTP-U layer and the UDP layer of the IAB node are equivalent to a donor-CU, and the IP layer is equivalent to a donor-DU. In another case, the donor-DU is a proxy node of the F1 interface between the donor-CU and the IAB node, and the GTP-U layer, the UDP layer, and the IP layer of the IAB node are respectively equivalent to protocol layers in the donor-DU. It should be noted that, if security protection is considered for the F1 interface, the user plane protocol layer of the F1 interface may further include an IPsec layer and/or a PDCP layer. In a possible implementation, the IPsec layer or the PDCP layer is located above the IP layer and below the GTP-U layer.

For example, a control plane protocol layer of the IAB node on the F1 interface includes an F1AP layer, an SCTP layer, and an IP layer. In one case, refer to FIG. 4(b). The F1AP layer and the SCTP layer of the IAB node are equivalent to the donor-CU, and the IP layer is equivalent to the donor-DU. In another case, the donor-DU is a proxy node of the F1 interface between the donor-CU and the IAB node, and the F1AP layer, the SCTP layer, and the IP layer of the IAB node are equivalent to the donor-DU. It should be noted that, if security protection is considered for the F1 interface, the control plane protocol layer of the F1 interface may further include one or more of an IPsec layer, a PDCP layer, and a DTLS layer. In a possible implementation, the IPsec layer, the PDCP layer, or the DTLS layer is located above the IP layer and below the F1AP layer.

It may be understood that, when a protocol layer for security protection is introduced into protocol layers of the F1 interface, architectures of protocol stacks of some nodes in FIG. 3, FIG. 4(a), and FIG. 4(b) change. For details, refer to the text for understanding. Architectures of protocol stacks of nodes in the IAB network shown in FIG. 3, FIG. 4(a), and FIG. 4(b) in embodiments of this application are merely examples. Methods provided in embodiments of this application do not depend on the examples, but the examples make the methods provided in embodiments of this application easier to understand.

6. Transmit-Side Protocol Stack and Receive-Side Protocol Stack

In embodiments of this application, a transmit-side protocol stack of a node is a protocol stack that is of the node and that is oriented to a next-hop node, and a receive-side protocol stack of a node is a protocol stack that is of the node and that is oriented to a previous-hop node.

For example, in an architecture of a protocol stack shown in FIG. 4(a) and FIG. 4(b), for uplink transmission, a terminal-oriented protocol stack in a DU part of an access IAB node (an IAB node 2) is a receive-side protocol stack, a donor node-oriented or a donor-CU-oriented protocol stack in the DU part of the access IAB node is a transmit-side protocol stack, a protocol stack of an MT part of the access IAB node is a transmit-side protocol stack, a protocol stack of a DU part of an intermediate IAB node is a receive-side protocol stack, a protocol stack of an MT part of the intermediate IAB node is a transmit-side protocol stack, an IAB node-oriented protocol stack in a donor-DU is a receive-side protocol stack, and a donor-CU-oriented protocol stack in the donor-DU is a transmit-side protocol stack. For downlink transmission, a terminal-oriented protocol stack in a DU part of an access IAB node is a transmit-side protocol stack, a donor node-oriented or donor-CU-oriented protocol stack in the DU part of the access IAB node is a receive-side protocol stack, a protocol stack of an MT part of the access IAB node is a receive-side protocol stack, a protocol stack of a DU part of an intermediate IAB node is a transmit-side protocol stack, a protocol stack of an MT part of the intermediate IAB node is a receive-side protocol stack, an IAB node-oriented protocol stack in a donor-DU is a transmit-side protocol stack, and a donor-CU-oriented protocol stack in the donor-DU is a receive-side protocol stack.

In the following descriptions, the transmit-side protocol stack is referred to as a transmit side for short, and the receive-side protocol stack is referred to as a receive side for short.

7. Upper-Layer Protocol Layer and Lower-Layer Protocol Layer

In embodiments of this application, a location relationship between protocol layers is defined as follows: In a process in which a node sends data, a protocol layer that first processes a data packet is above a protocol layer that processes the data packet later, that is, the protocol layer that first processes the data packet may be considered as an upper-layer protocol layer of the protocol layer that processes the data packet later; or in a process in which a node receives data, a protocol layer that first processes a data packet is below a protocol layer that processes the data packet later, that is, the protocol layer that first processes the data packet may be considered as a lower-layer protocol layer of the protocol layer that processes the data packet later.

For example, refer to FIG. 3. In a protocol stack of an intermediate IAB node, a BAP layer is an upper-layer protocol layer of an RLC layer, a MAC layer, and a PHY layer, and the RLC layer, the MAC layer, and the PHY layer are lower-layer protocol layers of the BAP layer. In addition, it should be noted that, in embodiments of this application, for a node, a transmit-side protocol stack is considered as a lower-layer protocol stack of a receive-side protocol stack. For example, for an uplink data packet of an intermediate IAB node, a BAP layer of an MT part (that is, a transmit-side protocol stack) is a lower-layer protocol layer of a BAP layer of a DU part (that is, a receive-side protocol stack).

It should be noted that, for a downlink data packet of an access IAB node, because a protocol layer of an MT part of the access IAB node and a donor node-oriented or donor-CU-oriented protocol stack in a DU part of the access IAB node are both receive-side protocol stacks, a BAP layer of the MT part is a lower-layer protocol layer of an IP layer of the DU part. For an uplink data packet of an access IAB node, because a protocol layer of an MT part of the access IAB node and a donor node-oriented or donor-CU-oriented protocol stack in a DU part of the access IAB node are both transmit-side protocol stacks, a BAP layer of the MT part is a lower-layer protocol layer of an IP layer of the DU part.

8. RLC Channel (RLC CH) and Logical Channel (LCH)

An RLC channel is a channel between an RLC layer and an upper-layer protocol layer (for example, an Adapt layer). A logical channel is a channel between the RLC layer and a lower-layer protocol layer (for example, a MAC layer). The logical channel may also be referred to as a MAC logical channel. An RLC bearer is an RLC layer entity and the MAC logical channel.

Currently, a configuration of a radio bearer (RB) of a terminal corresponds to a configuration of a higher layer (for example, a PDCP layer) part and a configuration of a lower layer (for example, an RLC layer and a MAC layer) part. A configuration of the RLC bearer is a configuration of a lower layer part corresponding to the RB, and specifically includes a configuration of the RLC layer entity and a configuration of the MAC logical channel. In this specification, an RLC bearer of an IAB node on a wireless backhaul link includes an RLC layer and a MAC logical channel part, an RLC channel of the IAB node on the wireless backhaul link may be a channel between an RLC layer and a PDCP layer or may refer to a channel between the RLC layer and an Adapt layer, and the RLC channel of the IAB node on the wireless backhaul link is specifically determined by an upper-layer protocol layer of the RLC layer. The following uses an example in which the RLC channel is the channel between the RLC layer and the Adapt layer for description. The RLC channel of the IAB node on the wireless backhaul link is in a one-to-one correspondence with the RLC layer entity, and the RLC channel is also in a one-to-one correspondence with the RLC bearer. For details, refer to FIG. 5.

The RB of the terminal may be a data radio bearer (DRB), or may be a signaling radio bearer (SRB).

For ease of description, the RLC channel, the RLC bearer, and the logical channel are collectively referred to as service differentiation channels in the following descriptions. In other words, the service differentiation channel in the following descriptions may be replaced with any one of the RLC channel, the RLC bearer, and the logical channel.

9. Route Selection and Bearer Selection

Route selection in embodiments of this application is used to determine a routing identifier (Routing ID) for data packet selection.

Bearer selection in embodiments of this application may also be referred to as QoS selection. Bearer selection is used to select an RLC bearer or an RLC channel or a logical channel for sending a data packet.

10. Routing Table

For a node, a routing table includes one or more routing identifiers, and the one or more routing identifiers correspond to an identifier of a next-hop node of the node. Different nodes corresponding to a same routing identifier have different routing tables. For example, for a transmission path identified by a routing identifier 1, three nodes included in the transmission path are successively a node 1, a node 2, and a node 3. A routing table of the node 1 includes the routing identifier 1 and an identifier of the node 2, and there is a correspondence between the routing identifier 1 and the identifier of the node 2. A routing table of the node 2 includes the routing identifier 1 and an identifier of the node 3.

In a possible implementation, a donor-CU delivers a corresponding routing table to each IAB node managed/controlled by the donor-CU. The donor-CU also sends a routing table corresponding to the donor-DU to a donor-DU that belongs to a same donor node as the donor-CU.

Figure 6:
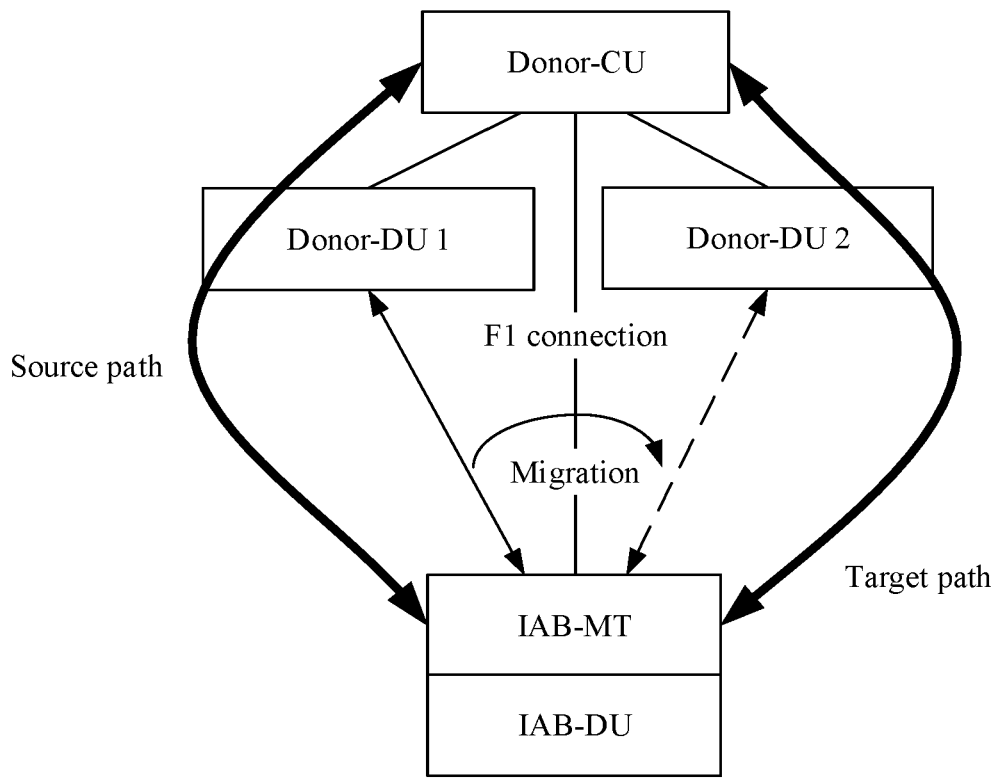
FIG. 6 is a schematic diagram of an intra-donor-CU migration scenario.

According to a current communication standard, for example, a scenario in which an IAB node performs intra-donor-CU migration is mentioned in R16. As shown in FIG. 6, the IAB node migrates from a source parent node donor-DU 1 to a target parent node donor-DU 2, and the source parent node and the target parent node are connected to a same donor-CU. In this scenario, the IAB node that migrates may be referred to as a migrating IAB node. An IAB-MT and an IAB-DU of the migrating IAB node are managed/controlled only by a same donor-CU. In the scenario, service data of a terminal may be continuously uninterrupted during migration of the IAB node. However, in a current standard, how to avoid terminal data interruption in an inter-donor-CU migration scenario is not proposed. In addition, different from that in an intra-donor-CU migration solution, an MT part and a DU part that are of a migrating IAB node are all connected to a same donor node, and during inter-donor-CU migration, an MT part and a DU part of an IAB node may be connected to different donor nodes. Therefore, the existing intra-donor-CU migration solution is not applicable to an inter-donor-CU migration scenario.

Figures 1, 7:
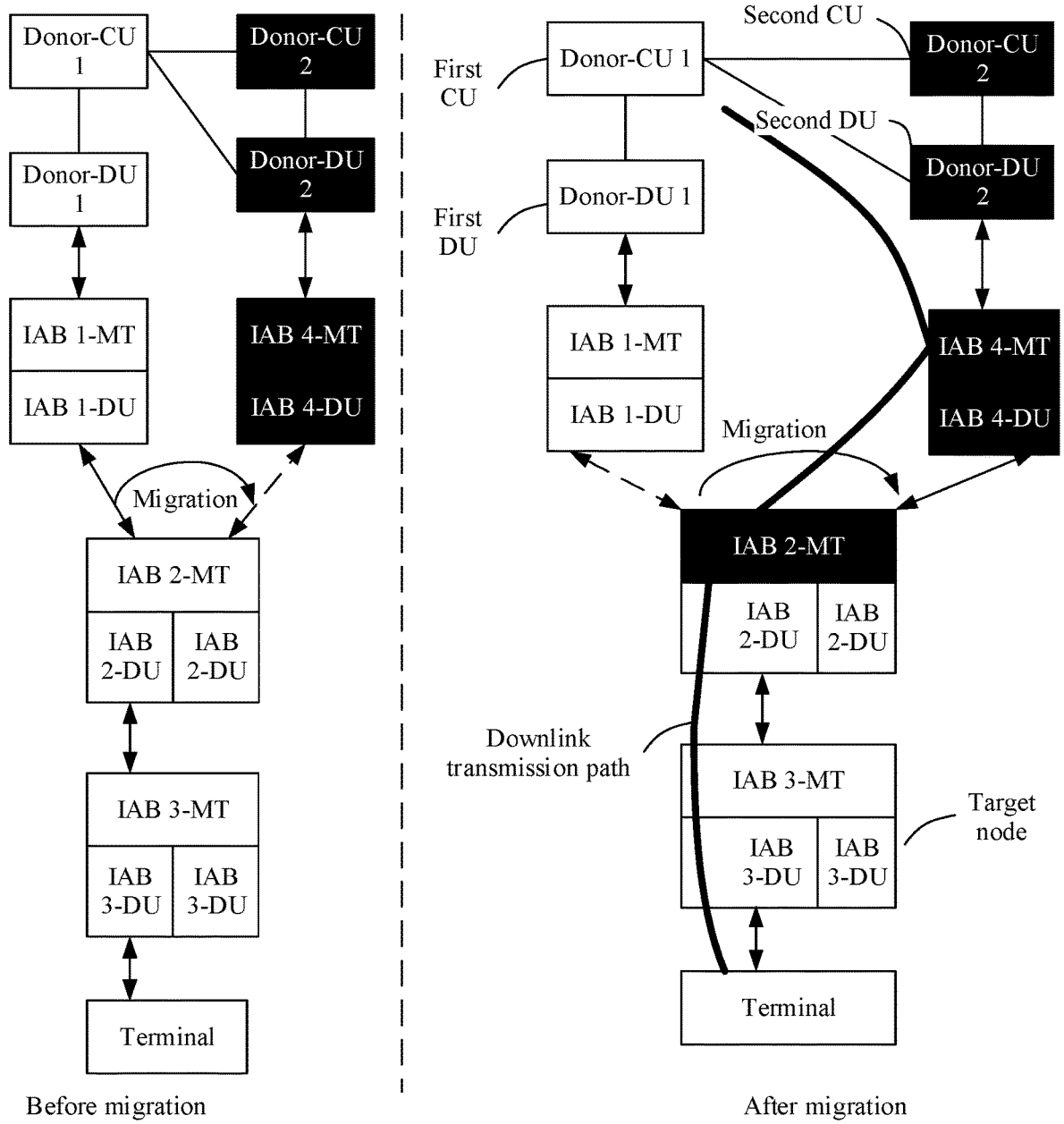
Figures 2, 7:
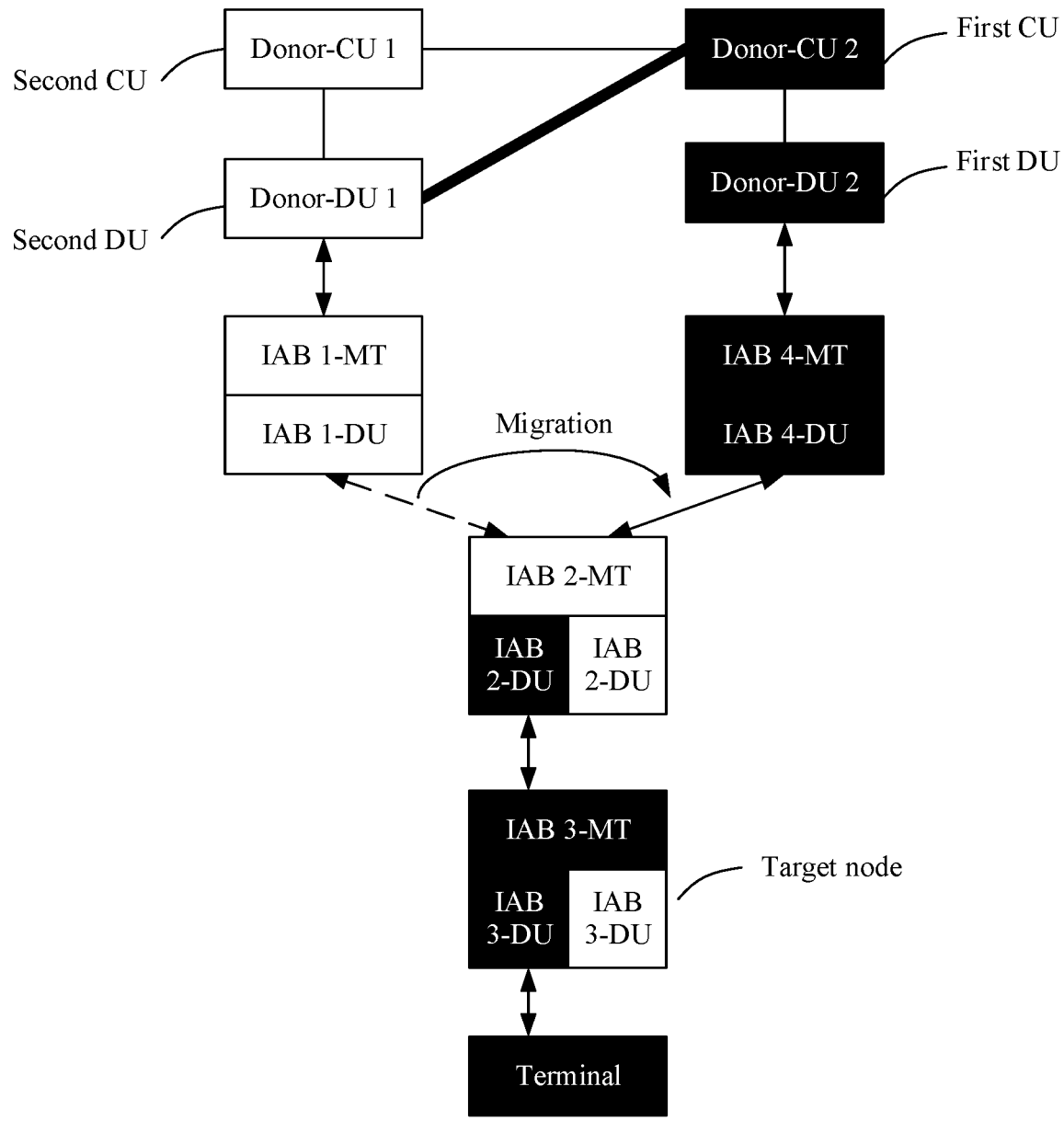
Figures 3, 7:
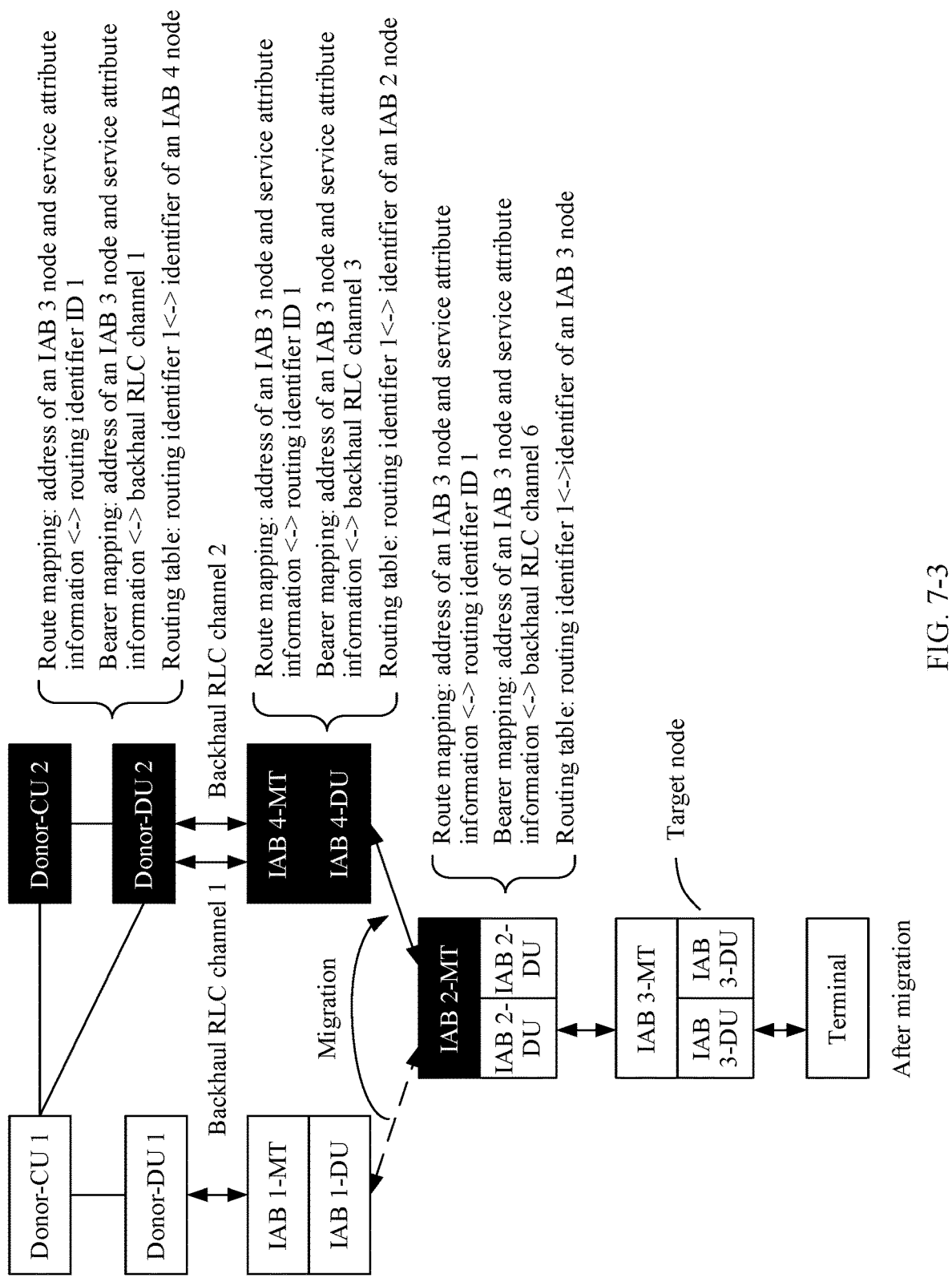

To improve service data continuity of a terminal in the inter-donor-CU migration scenario, embodiments of this application provide communication methods shown in the following embodiments. Embodiments of this application are applied to the inter-donor-CU migration scenario. FIG. 7-1 is an example of the inter-donor-CU migration scenario to which an embodiment of this application is applicable.

That an IAB 2 node migrates is used as an example, that is, an IAB 2-MT migrates from a source parent node IAB 1-DU to a target parent node IAB 4-DU. The IAB 1-DU and the IAB 4-DU are managed/controlled by different donor-CUs. Specifically, the IAB 1-DU is managed/controlled by a donor-CU 1, and the IAB 4-DU is managed/controlled by a donor-CU 2. The donor-CU 1 is a source donor-CU in this migration, and the donor-CU 2 is a target donor-CU in this migration.

Before the IAB 2 node migrates, a donor node of each IAB node and a connection relationship between the IAB node and the donor node are as follows:

Donor nodes of an IAB 1 node, the IAB 2 node, a IAB 3 node, and a terminal are the donor-CU 1, that is, the IAB 1 node, the IAB 2 node, the IAB 3 node, and the terminal are all managed/controlled by the donor-CU 1. An IAB 1-MT establishes an RRC connection with the donor-CU 1, and an IAB 1-DU establishes an F1 connection with the donor-CU 1. An IAB 2-MT establishes an RRC connection with the donor-CU 1, and an IAB 2-DU (which is an IAB-DU on the left of two IAB-DUs in FIG. 7-1) establishes an F1 connection with the donor-CU 1. An IAB 3-MT establishes an RRC connection with the donor-CU 1, and an IAB 3-DU (which is an IAB 3-DU on the left of two IAB 3-DUs in FIG. 7-1) establishes an F1 connection with the donor-CU 1. UE establishes an RRC connection with the donor-CU 1.

An IAB 4 node is managed/controlled by the donor-CU 2, that is, an IAB 4-MT establishes an RRC connection with the donor-CU 2, and the IAB 4-DU establishes an F1 connection with the donor-CU 2.

In FIG. 7-1, a black node or node part is managed by the donor-CU 2, and a white node or node part is managed by the donor-CU 1. Meanings of black and white in subsequent drawings such as FIG. 7-2 or FIG. 7-3 are similar to those in FIG. 7-1.

In some cases, for the IAB 2 node, the IAB 2-MT migrates first, or the IAB 2-MT completes migration first, that is, the IAB 2-MT migrates to the donor-CU 2, and the IAB 2-DU has not migrated to the donor-CU 2 (that is, the IAB 2-DU has not established an F1 connection with the donor-CU 2). In this case, after the IAB 2-MT migrates, a donor node of each IAB node and a connection relationship between the IAB node and the donor node are as follows:

The IAB 1 node, the IAB 3 node, and the terminal are still managed/controlled by the donor-CU 1, and the IAB 4 node is still managed/controlled by the donor-CU 2. That is, the IAB 1-MT maintains the RRC connection with the donor-CU 1, and the IAB 1-DU maintains the F1 connection with the donor-CU 1. The IAB 3-MT maintains the RRC connection with the donor-CU 1, and the IAB 3-DU (which is an IAB 3-DU on the left of two IAB 3-DUs in FIG. 7-1) maintains the F1 connection with the donor-CU 1. The terminal maintains the RRC connection with the donor-CU 1. The IAB 4-MT maintains the RRC connection with the donor-CU 2, and the IAB 4-DU maintains the F1 connection with the donor-CU 2.

Management/control of the IAB 2 node is changed, that is, the IAB 2-MT establishes an RRC connection with the donor-CU 2, but the IAB 2-DU (which is an IAB 2-DU on the left of two IAB 2-DUs in FIG. 7-1) maintains the F1 connection with the donor-CU 1. In other words, a DU and an MT that belong to a same donor node are connected to different donor-CUs respectively.

In this embodiment of this application, for a migrating IAB node, when an IAB-MT of the migrating IAB node migrates to a target parent node earlier than an IAB-DU of the migrating IAB node, this migration case is referred to as top-down migration (or there may be another name). For example, as mentioned above, in a migration case shown in FIG. 7-1, the IAB 2-MT migrates to the target parent node, that is, the IAB 4 node, earlier than the IAB 2-DU. This migration case is the top-down migration.

In still some cases, refer to FIG. 7-2. For the migrating node IAB 2, the IAB 2-DU may migrate earlier than the IAB 2-MT, or the IAB 2-DU may complete migration earlier than the IAB 2-MT (IAB 2-DU migration refers to migration of an F1 interface of the IAB 2-DU, the IAB 2-DU establishes an F1 connection with the donor-CU 1 before the migration, and the IAB 2-DU establishes an F1 connection with the donor-CU 2 after the migration). That is, when the IAB 2-DU, the IAB 3 node, and the terminal have migrated to the donor-CU 2, the IAB 2-MT has not migrated to the donor-CU 2. In this case, after the IAB 2-DU migrates and before the IAB 2-MT completes migration, a donor node of each IAB node and a connection relationship between the IAB node and the donor node are as follows:

Donor nodes of the IAB 1 node and the IAB 4 node remain unchanged. Specifically, the IAB 1-MT maintains the RRC connection with the donor-CU 1, and the IAB 1-DU maintains the F1 connection with the donor-CU 1. The IAB 4-MT maintains the RRC connection with the donor-CU 2, and the IAB 4-DU maintains the F1 connection with the donor-CU 2.

Compared with situation before the migration, management and control of the terminal, the IAB 3 node, and the IAB 2 node after the migration are changed. Specifically, the IAB 3-MT establishes an RRC connection with the donor-CU 2, and the IAB 3-DU (a black IAB 3-DU in FIG. 7-2) establishes an F1 connection with the donor-CU 2. The terminal establishes an RRC connection with the donor-CU 2. The IAB 2-MT maintains the RRC connection with the donor-CU 1, but the IAB 2-DU (a black IAB 2-DU in FIG. 7-1) establishes an F1 connection with the donor-CU 2.

Figures 4, 7:
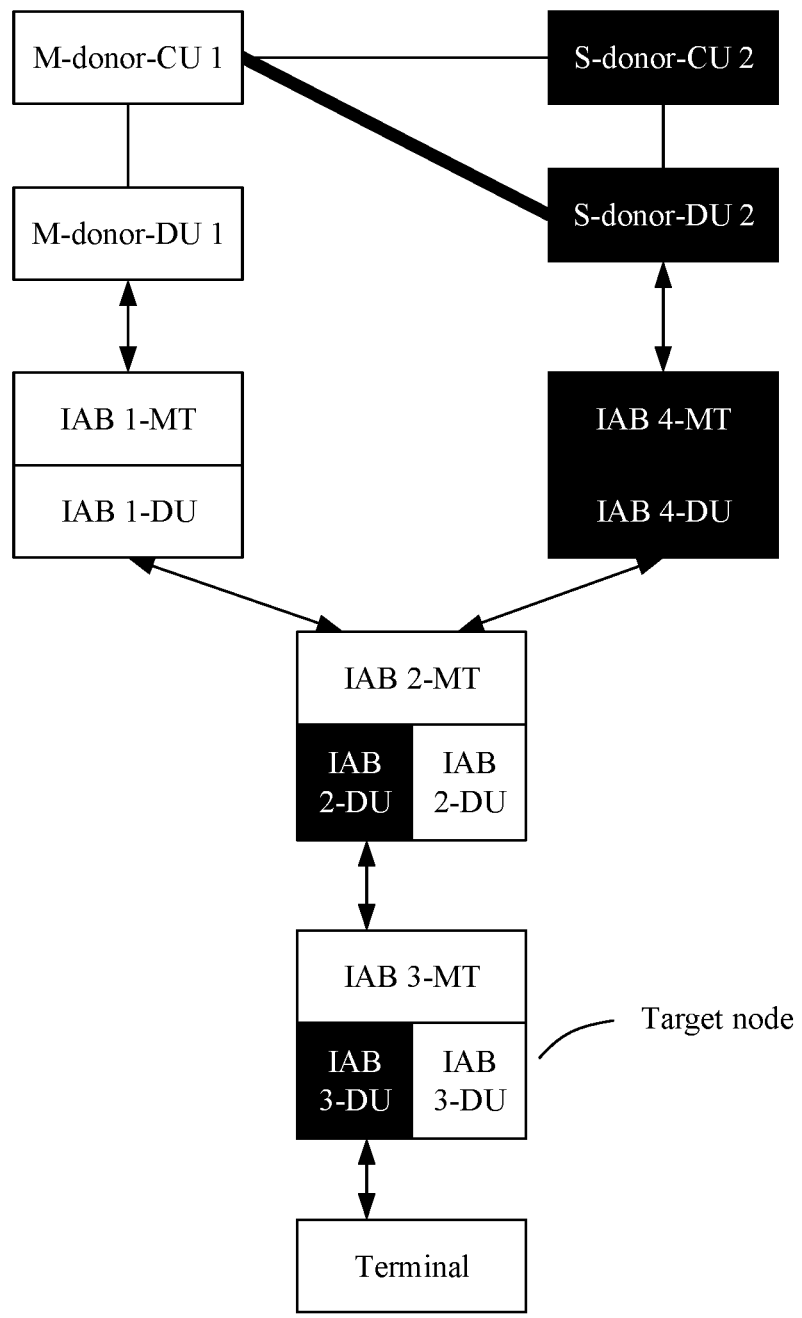
Figures 5, 7:
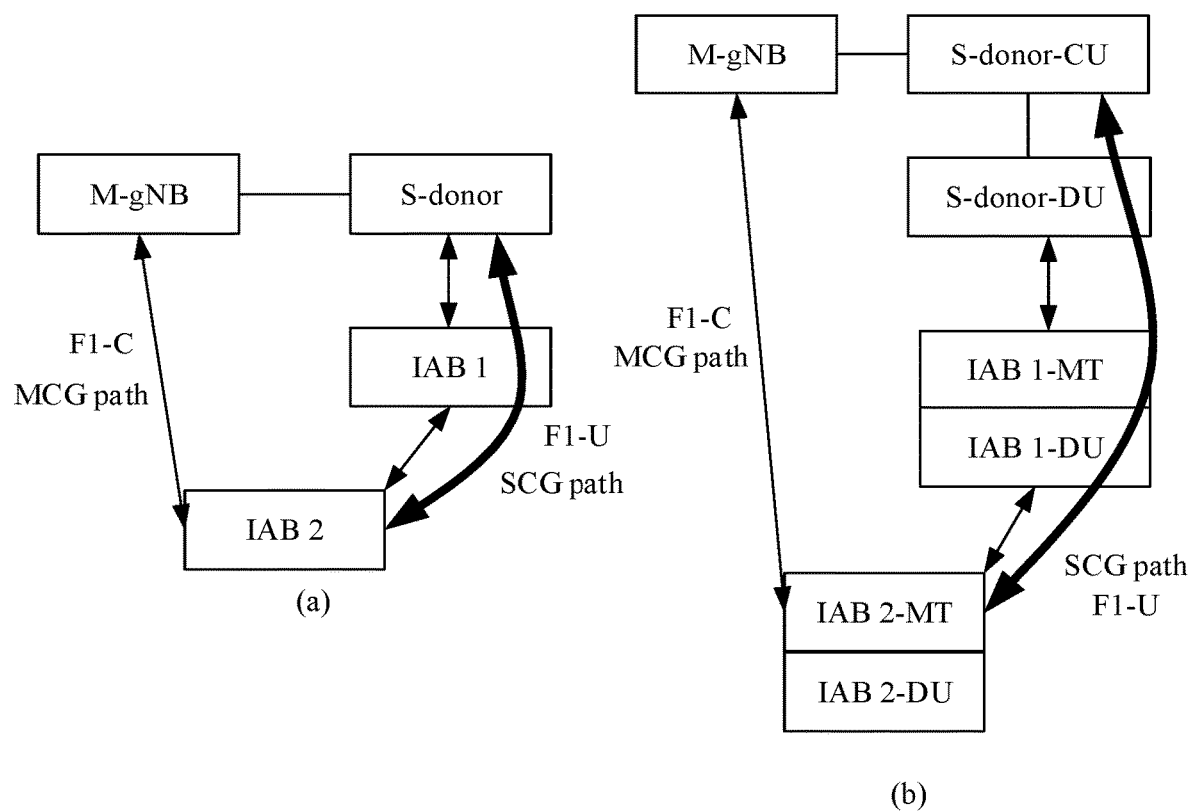
Figures 6, 7:
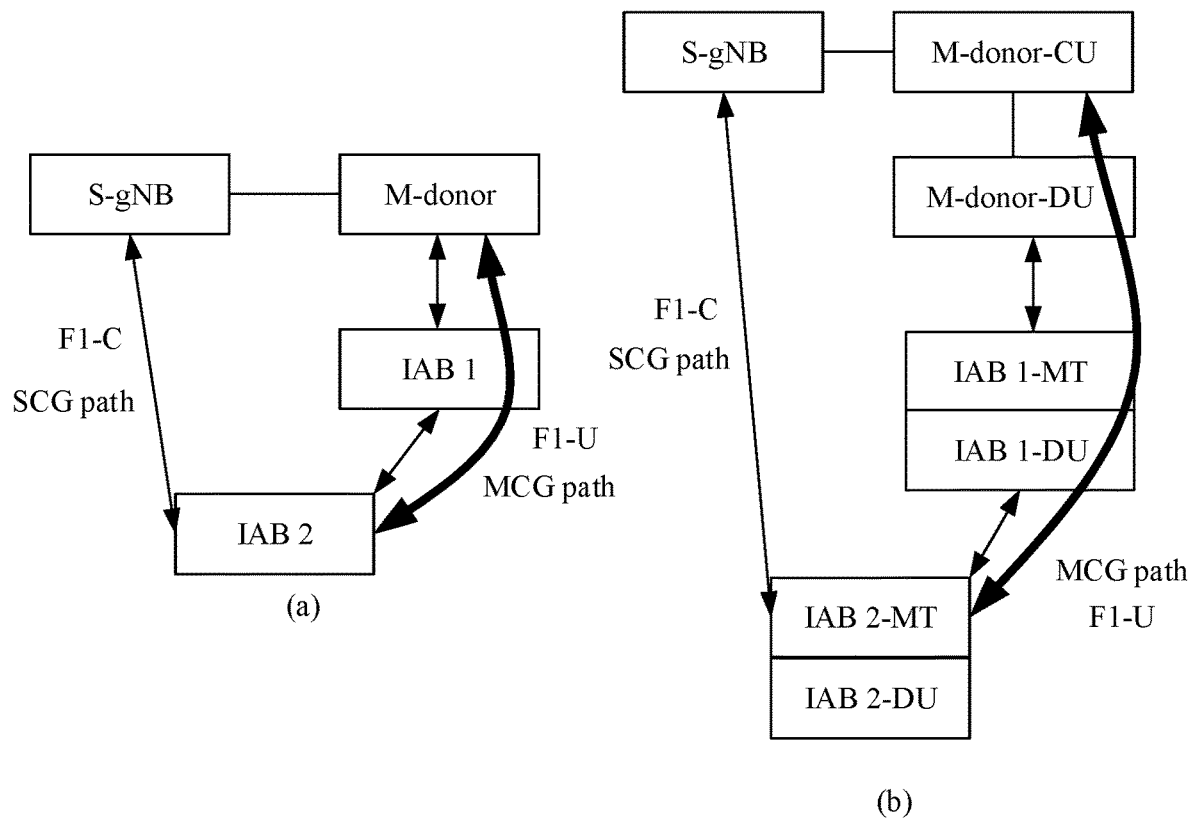

In some other embodiments, technical solutions in this application may be further applicable to a dual-connectivity (DC) scenario. Refer to FIG. 7-4. The IAB 2 node is still used as an example, and the IAB 2-MT operates in a dual-connectivity mode, and the dual-connectivity mode means that two parent nodes, that is, the IAB 1-DU and the IAB 4-DU, exist at the same time. In a possible implementation, an M-donor serves as a master eNodeB of the IAB 2-MT, and an S-donor serves as a secondary eNodeB of the IAB 2-MT.

In FIG. 7-4, a connection relationship between each IAB node or terminal and a donor node is as follows:

The IAB 1 node is managed/controlled by an M-donor-CU 1, that is, the IAB 1-MT establishes an RRC connection with the M-donor-CU 1, and the IAB 1-DU establishes an F1 connection with the M-donor-CU 1.

The IAB 2-MT establishes an RRC connection with the M-donor-CU 1, and the IAB 2-DU (a white part in FIG. 7-4) establishes an F1 connection with the M-donor-CU 1.

The IAB 3 node is managed/controlled by the M-donor-CU 1, that is, the IAB 3-MT establishes an RRC connection with the M-donor-CU 1, and the IAB 3-DU (a white part on the right in FIG. 7-4) establishes an F1 connection with the M-donor-CU 1.

The terminal is managed/controlled by the M-donor-CU 1, that is, the terminal establishes an RRC connection with the M-donor-CU 1.

The IAB 4 node is managed/controlled by an S-donor-CU 2, that is, the IAB 4-MT establishes an RRC connection with the S-donor-CU 2, and the IAB 4-DU establishes an F1 connection with the S-donor-CU 2.

In this embodiment of this application, for a migrating IAB node, when an IAB-DU of the migrating IAB node migrates to a target parent node earlier than an IAB-MT of the migrating IAB node, this migration case is referred to as bottom-up migration (or there may be another name). For example, in a migration case shown in FIG. 7-2, the IAB 2-DU migrates to the target parent node, that is, the IAB 4 node, earlier than the IAB 2-MT. This migration case is the bottom-up migration.

FIG. 7-1 is merely an example of a communication system to which an embodiment of this application is applicable. In specific implementation, the communication system may further include more or fewer devices. A topology (for example, a specific number of connections and a specific number of hops) of the communication system may be of another type.

For example, for a link between the IAB 2 node and the donor-CU, the IAB 2 node may be directly connected to the donor-CU node, that is, the IAB 1 node or the IAB 4 node does not exist. Alternatively, at least two intermediate IAB nodes exist between the IAB 2 node and the donor-CU, that is, in addition to the IAB 1 node or the IAB 4 node, at least one another IAB node exists between the IAB 2 node and the donor-CU.

For another example, for a link between the IAB 2 node and the terminal, the terminal may be directly connected to the IAB 2 node, that is, the IAB 3 node does not exist, or at least two intermediate nodes exist between the terminal and the IAB 2 node, that is, other than the IAB 3 node, at least one another IAB node exists between the terminal and the IAB 2 node.

The following separately describes the embodiments.

Embodiment 1

Figure 8:
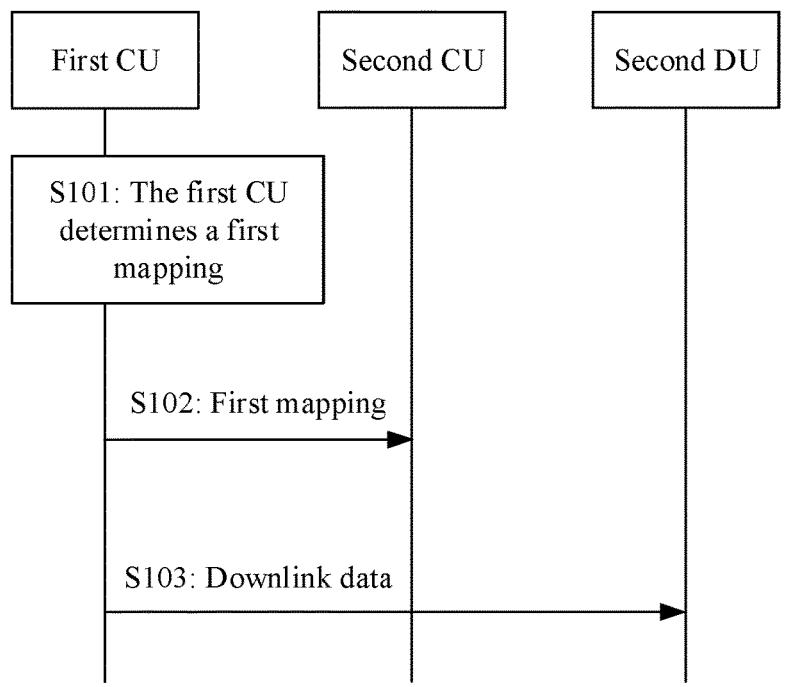
FIG. 8 to FIG. 14 each are a flowchart of a communication method according to an embodiment of this application.

An embodiment of this application provides a communication method. As shown in FIG. 8, the method includes the following steps.

S101: A first CU determines a first mapping.

For ease of description, "a CU of a first donor node" mentioned in this embodiment of this application may be referred to as the first CU, "a CU of a second donor node" may be referred to as a second CU, "a DU of the first donor node" may be referred to as a first DU, and "a DU of the second donor node" may be referred to as a second DU.

In some embodiments of this application, the first donor node is a source donor node, and a second donor node is a target donor node; or the first donor node is a target donor node, and a second donor node is a source donor node.

The source donor node, that is, before migration of an IAB node, manages and controls a donor node of the IAB node, and the target donor node, that is, after the migration of the IAB node, manages and controls the donor node of the IAB node.

In still some embodiments, the first donor node is a primary donor node, and the second donor node is a secondary donor node; or the first donor node is a secondary donor node, and the second donor node is a primary donor node.

The first mapping includes a route mapping and/or a bearer mapping. The route mapping is a mapping relationship between downlink data and a downlink transmission path. The downlink transmission path includes a transmission path between the first CU and a target node of the downlink data through a second DU. In other words, the downlink transmission path includes the transmission path between the first CU and the target node of the downlink data through the second DU. For example, FIG. 7-1 shows an example of the downlink transmission path.

Optionally, a mapping relationship between the downlink data and the downlink transmission path includes a target address of the downlink data, service attribute information of the downlink data, and a first routing identifier (routing ID) corresponding to the target address and the service attribute information. A routing identifier may be used to uniquely identify a transmission path. Different transmission paths correspond to different routing identifiers.

Optionally, the downlink data includes the service attribute information.

Optionally, the target address includes a target IP address. Optionally, the service attribute information includes a differentiated services code point (DSCP) or a flow label. The service attribute information may be used to distinguish different services, to ensure service quality of service (QoS). In this way, data that carries different service attribute information may be transmitted through different transmission paths.

For example, the first donor node is the source donor node, and the second donor node is the target donor node. In a scenario shown in FIG. 7-1, the first CU is a donor-CU 1, and a second CU is a donor-CU 2. The downlink data is sent to a terminal, and an access IAB node of the terminal is an IAB 3 node. Therefore, the target node of the downlink data is the IAB 3 node, the target address of the downlink data is an address of the IAB 3 node, and the downlink transmission path is a transmission path 1 between the donor-CU 1 and the IAB 3 node through a donor-DU 2. The downlink transmission path 1 corresponds to a routing identifier 1. The route mapping is a mapping relationship between the downlink data and the routing identifier 1. Optionally, the mapping relationship between the downlink data and the routing identifier 1 may be the address of the IAB 3 node, the service attribute information of the downlink data, and the routing identifier 1 corresponding to the address of the IAB 3 node and the service attribute information. This means that, for downlink data (for example, downlink data 1) that has a corresponding service attribute (for example, the DSCP is 000111) and that is sent to the IAB 3 node, the donor-DU 2 transmits the downlink data 1 through a downlink transmission path (for example, the transmission path 1) corresponding to a corresponding routing identifier.

The bearer mapping is a mapping relationship between the downlink data and a downlink transmission bearer. The downlink transmission bearer includes a first RLC channel between the second DU and a first node. The first node is a next-hop node of the second DU. A radio link control RLC channel may also be referred to as a backhaul RLC channel.

Optionally, a mapping relationship between the downlink data and the downlink transmission bearer includes the target address of the downlink data, the service attribute information of the downlink data, and information about the first RLC channel corresponding to the target address and the service attribute information.

Optionally, information about an RLC channel includes an identifier of the RLC channel and identifiers of nodes (for example, BAP addresses of the nodes) at two ends of the RLC channel. An explanation of the information about the RLC channel is applicable to all embodiments of this application.

Still refer to FIG. 7-1. The downlink transmission bearer includes the first RLC channel between the donor-DU 2 and an IAB 4-MT. The bearer mapping is a mapping relationship between the downlink data and the first RLC channel. Optionally, the mapping relationship between the downlink data and the first RLC channel may be the address of the IAB 3 node, the service attribute information of the downlink data, and the first RLC channel corresponding to the address of the IAB 3 node and the service attribute information. This means that, for downlink data (for example, the downlink data 1) that has a corresponding service attribute and that is sent to the IAB 3 node, the donor-DU 2 sends the downlink data 1 to the IAB 4-MT through the first RLC channel between the donor-DU 2 and the IAB 4-MT. That is, a downlink bearer mapping on the donor-DU 2 is determined by the donor-CU 1.

FIG. 7-1 is still used as an example. In some embodiments, according to the foregoing solution, the donor-CU 1 determines the RLC channel used for transmitting the downlink data between the donor-DU 2 and an IAB 4 node. In this way, after the donor-DU 2 receives the downlink data from the donor-CU 1, the donor-DU 2 maps the downlink data to a corresponding RLC channel and sends the downlink data to the IAB 4 node. For the IAB 4 node, a downlink bearer mapping on the IAB 4 node can be implemented in two manners.

In a possible implementation, the donor-CU 2 determines a bearer mapping on the IAB 4 node. Downlink transmission is used as an example for description. The donor-CU 2 determines the downlink bearer mapping on the IAB 4 node, that is, the donor-CU 2 determines a mapping relationship between an ingress RLC channel and an egress RLC channel on the IAB 4 node, and sends the mapping relationship to the IAB 4 node. The ingress RLC channel refers to an RLC channel between the donor-DU 2 and the IAB 4-MT, and the egress RLC channel refers to an RLC channel between an IAB 4-DU and an IAB 2-MT. That is, the donor-CU 2 maps the downlink data onto the ingress RLC channel and sends the downlink data to the IAB 4-MT, after the IAB 4-MT extracts the downlink data from the ingress RLC channel, the IAB 4-MT sends the downlink data to the IAB 4-DU through an internal interface, and the IAB 4-DU maps the downlink data to a corresponding egress RLC channel and sends the downlink data to the IAB 2-MT. In this implementation, the mapping relationship between the downlink data and the downlink transmission bearer includes information about the ingress RLC channel and information about the egress RLC channel.

In another possible implementation, the donor-CU 1 determines a bearer mapping on the IAB 4 node. Downlink transmission is used as an example for description. The donor-CU 1 determines a downlink bearer mapping on the IAB 4 node, that is, the donor-CU 1 determines a mapping relationship between an ingress RLC channel and an egress RLC channel on the IAB 4 node, and sends the mapping relationship to the IAB 4 node through the donor-CU 2. In this implementation, the mapping relationship between the downlink data and the downlink transmission bearer includes information about the ingress RLC channel and information about the egress RLC channel. That is, the donor-CU 1 sends the first mapping to the donor-CU 2, where the first mapping further includes the information about the ingress RLC channel and information about a corresponding egress RLC channel. Information about an RLC channel includes an identifier of the RLC channel and identifiers of nodes (for example, BAP addresses of the nodes) at two ends of the RLC channel.

FIG. 7-1 is still used as an example. In some embodiments, according to the foregoing solution, after receiving the downlink data from the donor-DU 2, the IAB 4 node maps the downlink data from the donor-DU 2 to a corresponding egress RLC channel and sends the downlink data to the IAB 2 node. For the IAB 2 node, a downlink bearer mapping on the IAB 2 node can be implemented in two manners.

In a possible implementation, the donor-CU 1 determines a bearer mapping on the IAB 2 node. Downlink transmission is used as an example for description. The donor-CU 1 determines the downlink bearer mapping on the IAB 2 node, that is, the donor-CU 1 determines a mapping relationship between an ingress RLC channel and an egress RLC channel on the IAB 2 node, and sends the mapping relationship to the IAB 2 node. The ingress RLC channel refers to an RLC channel between the IAB 4-DU and the IAB 2-MT, and the egress RLC channel refers to an RLC channel between an IAB 2-DU and an IAB 3-MT. That is, the IAB 4-DU maps the downlink data to the ingress RLC channel and sends the downlink data to the IAB 2-MT, after the IAB 2-MT extracts the downlink data from the ingress RLC channel, the IAB 2-MT sends the downlink data to the IAB 2-DU through an internal interface, and the IAB 2-DU maps the downlink data to a corresponding egress RLC channel and sends the downlink data to the IAB 3-MT. In this implementation, the mapping relationship between the downlink data and the downlink transmission bearer includes information about the ingress RLC channel and information about the egress RLC channel.

In another possible implementation, the donor-CU 2 determines a bearer mapping on the IAB 2 node. Downlink transmission is used as an example for description. The donor-CU 2 determines a downlink bearer mapping on the IAB 2 node, that is, the donor-CU 2 determines a mapping relationship between an ingress RLC channel and an egress RLC channel on the IAB 2 node, and sends the mapping relationship to the IAB 2 node through the donor-CU 1. In this implementation, the mapping relationship between the downlink data and the downlink transmission bearer includes information about the ingress RLC channel and information about the egress RLC channel. That is, the donor-CU 2 sends a mapping relationship to the donor-CU 1, where the mapping relationship includes the information about the ingress RLC channel and information about a corresponding egress RLC channel. Information about an RLC channel includes an identifier of the RLC channel and identifiers of nodes (for example, BAP addresses of the nodes) at two ends of the RLC channel.

S102: The first CU sends the first mapping to the second CU.

Correspondingly, the second CU receives the first mapping from the first CU.

Optionally, the first CU sends the route mapping to the second CU, that is, the first CU sends the following three parameters to the second CU: the target address of the downlink data, the service attribute information of the downlink data, and the first routing identifier corresponding to the target address and the service attribute information. The target address and the service attribute information of the downlink data may be used to determine a corresponding first routing identifier.

Optionally, the first CU sends the bearer mapping to the second CU, that is, the first CU sends the following three parameters to the second CU: the target address of the downlink data, the service attribute information of the downlink data, and the information about the first RLC channel corresponding to the target address and the service attribute information. The target address and the service attribute information of the downlink data may be used to determine information about a corresponding first RLC channel.

An Xn interface is established between the first CU and the second CU, and the first CU transfers an XnAP message to the second CU by using the interface, where the XnAP message carries the first mapping.

For example, still refer to FIG. 7-1. The donor-CU 1 sends the following parameters to the donor-CU 2: the target address (the address of the IAB 3 node) of the downlink data, the service attribute information of the downlink data, and the first routing identifier corresponding to the target address and the service attribute information.

For another example, the donor-CU 1 sends the following parameters to the donor-CU 2: the target address (the address of the IAB 3 node) of the downlink data, the service attribute information of the downlink data, and information about the RLC channel between the donor-DU 2 and the IAB 4 node. Both the target address and the service attribute information are associated with the information about the RLC channel between the donor-DU 2 and the IAB 4 node. This means that the donor-DU 2 may determine, based on the two parameters, that is, the target address and the service attribute information, an RLC channel that needs to be used for sending the downlink data.

For another example, the donor-CU 1 sends the following parameters to the donor-CU 2: the information about the ingress RLC channel and the information about the egress RLC channel. The information about the ingress RLC channel is associated with the information about the egress RLC channel, so that the donor-CU 2 may further send the mapping relationship to the IAB 4 node. That is, the IAB 4 node may determine, based on the information about the ingress RLC channel, an egress RLC channel that needs to be used for sending the downlink data.

It may be understood that the second CU receives the first mapping from the first CU, which means that a route mapping and/or a bearer mapping of a node managed and controlled by the second CU may change. Therefore, the second CU may send the first mapping to the node managed and controlled by the second CU, to facilitate update of the route mapping and/or the bearer mapping of the node managed and controlled by the second CU. For example, FIG. 7-1 is still used as an example. After receiving the first mapping from the donor-CU 1, the donor-CU 2 may send the first mapping to the donor-DU 2 and the IAB 4 node, so that each node performs route mapping and/or bearer mapping on the downlink data based on the first mapping.

S103: The first CU sends the downlink data to the second DU.

Correspondingly, the second DU receives the downlink data from the first CU.

FIG. 7-1 is still used as an example to describe a specific procedure in which the first CU sends the downlink data to the second DU. In FIG. 7-1, the donor-CU 1 performs encapsulation processing on the downlink data sent to the terminal at a GTP-U layer, a UDP layer, and an IP layer, to generate an IP data packet. Encapsulation processing at the IP layer includes: adding corresponding service attribute information (such as a DSCP/a flow label) to the downlink data of the terminal, adding the service attribute information to an IP header field, and adding a target IP address (that is, the IP address of the IAB 3 node) of the IP data packet to the IP header field.

Before the IAB 2 node migrates, the donor-CU 1 sends the downlink data to UE through a source path, where the source path includes the donor-DU 1, the IAB 1 node, the IAB 2 node, and the IAB 3 node. All nodes and the terminal on the source path are managed/controlled by the donor-CU 1. Therefore, the donor-CU 1 learns network topologies related to these nodes, and learns an access IAB node of the terminal, that is, the target node is the IAB 3 node.

Once the IAB 2-MT migrates, the donor-CU 1 sends the downlink data to the UE through a target path, where the target path includes the donor-DU 2, the IAB 4 node, the IAB 2 node, and the IAB 3 node. Different nodes on the target path are managed/controlled by different donor-CUs. For example, the donor-DU 2, the IAB 2-MT, and the IAB 4 node (including the IAB 4-MT and the IAB 4-DU) are managed/controlled by the donor-CU 2, and the IAB 2-DU, the IAB 3 node (including the IAB 3-MT and the IAB 3-DU), and the terminal are managed/controlled by the donor-CU 1. To route the downlink data on the target path, before the IAB 3 node migrates, the donor-DU 2 needs to allocate an IP address to the IAB 3 node in advance, and sends the newly allocated IP address to the IAB 3 node sequentially through the donor-CU 2 and the donor-CU 1. If the donor-CU 1 determines to send the downlink data to the UE through the target path, the target IP address added by the donor-CU 1 in the IP header field is updated to the IP address allocated by the donor-DU 2 to the IAB 3 node. Because the IP address allocated by the donor-DU 2 to the IAB 3 node has a same network prefix as an IP address of the donor-DU 2, the donor-CU 1 may correctly route a generated IP packet to the donor-DU 2.

After receiving the IP data packet from the donor-CU 1, the donor-DU 2 extracts the target IP address (that is, the IP address of the IAB 3 node) and the service attribute information (such as a DSCP or a flow label) from the IP data packet, and performs route selection and/or bearer selection on the IP data packet based on the first mapping previously received from the donor-CU 2.

Specifically, the donor-DU 2 may determine a routing identifier corresponding to the IP data packet based on the route mapping received from the donor-CU 2, for example, based on the following three received parameters: the target IP address, the service attribute information, a routing identifier corresponding to the target IP address and the service attribute information, and the target IP address and the service attribute information carried in the IP data packet. For example, the target IP address carried in the IP data packet received by the donor-DU 2 from the donor-CU 1 is 192.168.6.2, and the service attribute information is that the DSCP is 000111. In addition, the route mapping received by the donor-DU 2 from the donor-CU 2 is shown in Table 1 (Table 1 is only an example). In this case, the donor-DU 2 may learn, by querying Table 1, that the routing identifier corresponding to the IP data packet is 1, and performs route selection on the IP data packet based on the routing identifier.

TABLE 1

| Route mapping | | |
|---|---|---|
| Target IP address | Service attribute information | Routing identifier |
| 192.168.6.2 | A DSCP is 000111 | 1 |
| 192.168.6.3 | A DSCP is 001111 | 2 |

After determining a routing identifier of the downlink IP data packet, the donor-DU 2 determines, based on a routing table received from the donor-CU 2, that is, the routing identifier and an address that is of a next-hop node and that corresponds to the routing identifier, the next-hop node to which the IP data packet needs to be routed. The address of the next-hop node may be a BAP address of the next-hop node. For example, if an address that is of the next-hop node and that corresponds to the routing identifier 1 and that is indicated in the routing table is a BAP address of the IAB 4 node, the donor-DU 2 learns that the IP data packet received from the donor-CU 1 needs to be sent to the IAB 4 node.

The donor-DU 2 carries the determined routing identifier at the BAP layer and sends the IP data packet and the determined routing identifier to the next-hop node, that is, the IAB 4 node.

Similarly, the donor-DU 2 determines, based on the bearer mapping received from the donor-CU 2, for example, the target IP address, the service attribute information, an identifier of the RLC channel corresponding to the target IP address and the service attribute information, and the IP data packet received from the donor-CU 1, an RLC channel to which the IP data packet needs to be mapped and sent. For example, the donor-DU 2 determines that the IP data packet needs to be mapped to an RLC channel 1 shown in FIG. 5, and sends the IP data packet to a next-hop node of the donor-DU 2 through the RLC channel 1.

Similarly, subsequent nodes of the donor-CU 2, such as the IAB 4 node, the IAB 2 node, and the IAB 3 node shown in FIG. 7-1 may perform, based on a route mapping, a bearer mapping, and a routing table that are received from a corresponding donor node, route selection and bearer selection for the downlink data received from a previous node. For example, refer to (b) in FIG. 7-6. After receiving the IP data packet from the ingress RLC channel, the IAB 4 node performs processing at the BAP layer, extracts the routing identifier, and performs, based on the first mapping (the first mapping may be carried in an F1AP message, and optionally, an F1 interface is established between the IAB 4-DU and the donor-CU 2 to transfer the F1AP message) obtained from the donor-CU 2, route selection and bearer selection on the IP data packet.

Route selection: The IAB 4 node searches the routing table (the routing table is obtained from the donor-CU 2) based on the routing identifier extracted from the BAP layer, that is, the IAB 4 node determines, based on the routing identifier and a BAP address that is of a next-hop node and that corresponds to the routing identifier, the next-hop node to which the IP data packet needs to be routed (for example, needs to be routed to the IAB 2 node).

Bearer selection: The IAB 4 node determines an egress RLC channel to which the IP data packet is mapped based on the bearer mapping obtained from the donor-CU 2, that is, an identifier of an ingress RLC channel and an identifier of an egress RLC channel corresponding to the ingress RLC channel.

Similarly, the IAB 2 node and the IAB 3 node perform route selection and bearer selection based on the first mapping obtained from the donor-CU 1.

FIG. 7-1 is still used as an example. It can be seen that, in a scenario in which the IAB 2 node performs inter-donor-CU migration, the MT part and the DU part that are of the IAB 2 node may be respectively connected to different donor nodes. In this case, the downlink data can still reach the terminal through the downlink transmission path the donor-CU 1→the donor-DU 2→the IAB 4 node→the IAB 2 node→the IAB 3 node. Therefore, service continuity of the terminal is improved as much as possible.

According to the communication method provided in this embodiment of this application, in a scenario in which an IAB node performs inter-donor-CU migration, the first CU of the first donor node configures, for the downlink data of the terminal, the route mapping and/or the bearer mapping corresponding to the downlink transmission path, and sends the route mapping and/or bearer mapping to the second CU of the second donor node, so that the second CU further forwards the received route mapping and/or bearer mapping to the second DU of the second donor node. In this way, after receiving the downlink data from the first CU of the first donor node, the second DU of the second donor node may send the downlink data based on the route mapping and/or the bearer mapping, that is, the downlink data can reach the terminal through the second donor node. This prevents service continuity of the terminal from being affected.

Figure 9:
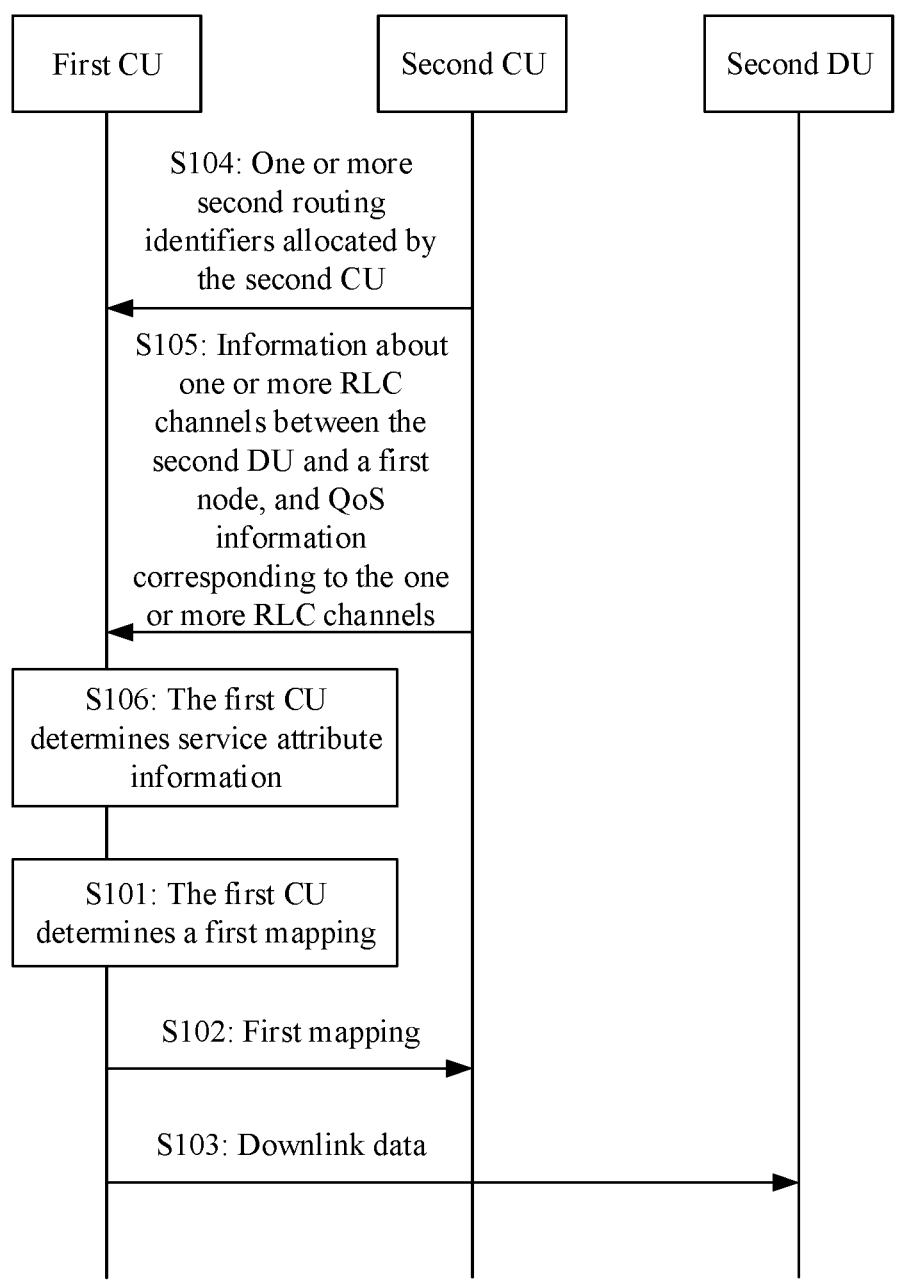

Optionally, before the first CU determines the first mapping, referring to FIG. 9, the foregoing method may further include the following step S104.

S104: The second CU sends, to the first CU, one or more second routing identifiers allocated by the second CU.

Correspondingly, the first CU receives, from the second CU, the one or more second routing identifiers allocated by the second CU.

The first routing identifier is different from the one or more second routing identifiers.

In this embodiment of this application, to avoid a conflict between the routing identifier allocated by the first CU and the routing identifier allocated by the second CU, before the first CU determines the first mapping (that is, the route mapping), the second CU needs to send the one or more routing identifiers (that is, the second routing identifiers) allocated by the second CU to the first CU. For example, the second CU may send, to the first CU, all routing identifiers allocated by the second CU, to ensure that both the routing identifier allocated by the first CU and the routing identifier allocated by the second CU can uniquely identify a transmission path.

Optionally, before the first CU determines the first mapping, referring to FIG. 9, the foregoing method may further include step S105.

S105: The second CU sends, to the first CU, information about one or more RLC channels between the second DU and the first node, and QoS information corresponding to the one or more RLC channels.

Correspondingly, the first CU receives, from the second CU, the information about the one or more RLC channels between the second DU and the first node and the QoS information corresponding to the one or more RLC channels.

The one or more RLC channels include the first RLC channel.

In this embodiment, the information about the RLC channels between the second DU and the first node is configured by the second DU, and is sent to the first node through an RRC message of the second CU. The first CU cannot learn the information about the RLC channels between the second DU and the first node. For the first CU to determine the first mapping (that is, the bearer mapping), the first CU needs to be able to learn of the QoS information corresponding to the RLC channels between the second DU and the first node, so that the first CU can determine an RLC channel that is between the second DU and the first node and to which the downlink data is mapped for transmission.

For example, FIG. 7-1 is still used as an example. The donor-CU 1 determines a downlink bearer mapping on the donor-DU 2. This means that the donor-CU 1 needs to determine the target address of the downlink data, the service attribute information of the downlink data, and an RLC channel (that is, an RLC channel between the donor-DU 2 and the IAB 4-MT) corresponding to the target address and the service attribute information.

However, the donor-CU 1 learns of only information about a corresponding RLC channel (for example, information about an RLC channel between the IAB 2-DU and the IAB 3-MT) of an IAB node managed or controlled by the donor-CU 1, and does not learn of information about the RLC channel that is between the donor-DU 2 and the IAB 4-MT and that is managed and controlled by the donor-CU 2. Therefore, to enable the donor-CU 1 to determine the bearer mapping, the donor-CU 2 needs to send QoS information of the RLC channel established between the donor-DU 2 and the IAB 4-MT to the donor-CU 1. For example, the donor-CU 2 sends the following parameters to the donor-CU 1: an identifier of the donor-DU 2, an identifier of the IAB 4 node, an identifier of the RLC channel (for example, an RLC channel 1 to an RLC channel 3) established between the donor-DU 2 and the IAB 4-MT, and QoS information corresponding to each RLC channel (QoS information corresponding to the RLC channel 1 to the RLC channel 3).

Optionally, an identifier of a node may be information about a BAP address of the node or other information. For example, the identifier of the IAB 4 node may be a BAP address of the IAB 4 node, and the identifier of the donor-DU 2 may be a BAP address of the donor-DU 2. The QoS information includes at least one of the following information: a QoS flow identifier, a 5QI, a PDU session identifier, and a guaranteed bit rate.

In this way, after receiving, from the second CU, the information about the one or more RLC channels between the second DU and the first node and the QoS information corresponding to the one or more RLC channels, the first CU may determine, based on the QoS information corresponding to the one or more RLC channels, an RLC channel that needs to be used by the second DU to send the downlink data.

In some embodiments, the service attribute information of the downlink data is determined by the first CU. That is, before the first CU determines the first mapping, the foregoing method may further include the following step S106.

S106: The first CU determines the service attribute information.

FIG. 7-1 is used as an example to describe an example of a method for determining a service attribute by the first CU. The donor-CU 1 receives the downlink data of the terminal from a core network device (for example, a UPF), and the donor-CU 1 can determine, based on QoS information of the downlink data of the terminal, the service attribute information (for example, a DSCP/a flow label) of the downlink data. After receiving the downlink data of the terminal, the donor-CU 1 determines the service attribute information of the downlink data based on the QoS information of the downlink data, maps the downlink data to a corresponding GTP tunnel, and sends the downlink data to a target node (for example, the IAB 3 node). Therefore, the donor-CU 1 may determine a correspondence between information about the tunnel of the downlink data and the service attribute information. The information about the tunnel may be, for example, but is not limited to, a GTP-FTEID. The GTP-FTEID includes a tunnel identifier (general packet radio service tunneling protocol tunnel endpoint ID (GTP-TEID)) and an IP address. For example, the donor-CU 1 determines the correspondence between the information about the tunnel of the downlink data and the service attribute information, and the correspondence may be a correspondence between a GTP-FTEID allocated by the donor-CU 1 on an F1 interface and a DSCP/flow label, a correspondence between a GTP-FTEID allocated by the IAB 3-DU on the F1 interface and a DSCP/flow label, or a correspondence between the GTP-FTEID allocated by the donor-CU 1 on the F1 interface and the GTP-TEID allocated by the IAB 3-DU on the F1 interface and a DSCP/flow label. It can be learned that in this embodiment, after receiving the downlink data of the terminal from the core network device (for example, the UPF), the first CU determines the service attribute information of the downlink data (step S106), and then, the first CU determines the first mapping (step S101) based on information received from the second CU in the foregoing steps S104 and S105.

Embodiment 2

Figure 10:
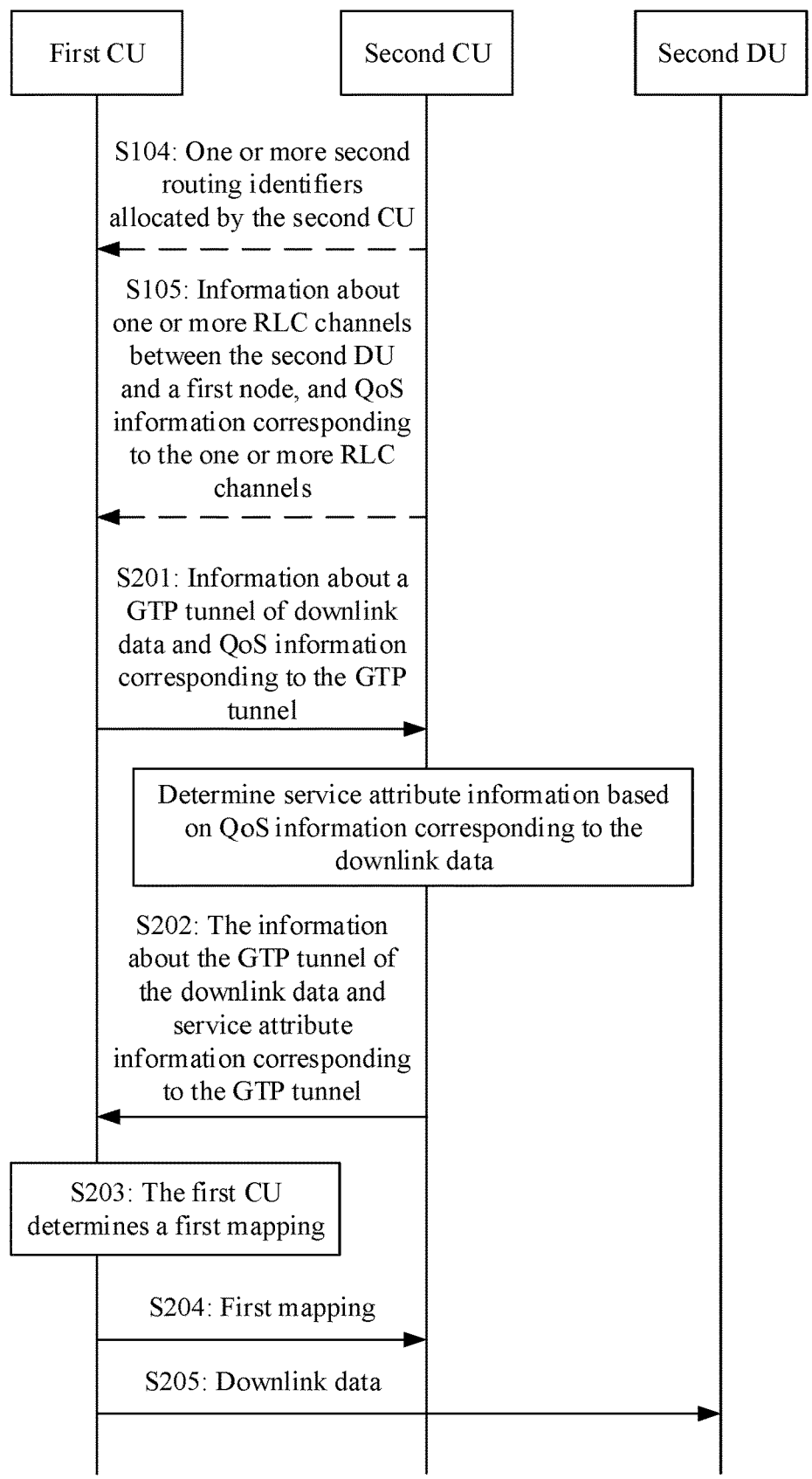

Same as Embodiment 1, a first mapping is determined by a first CU in Embodiment 2. For a solution in which the first CU determines the first mapping, refer to step S101 to step S105 in Embodiment 1. Details are not described herein again. In Embodiment 1, a service attribute of downlink data is determined by the first CU. Different from Embodiment 1, service attribute information of the downlink data is determined by a second CU in Embodiment 2. Specifically, referring to FIG. 10, a communication method in Embodiment 2 further includes:

S201: The first CU sends, to the second CU, information about a GTP tunnel of the downlink data and QoS information corresponding to the GTP tunnel.

FIG. 7-1 is still used as an example. To assist a donor-CU 2 in determining the service attribute information of the downlink data of the terminal, a donor-CU 1 needs to send, to the donor-CU 2, the QoS information corresponding to the GTP tunnel of the downlink data of the terminal. The donor-CU 1 maps the downlink data of the terminal to a corresponding GTP tunnel and sends the downlink data to a target node of the downlink data. Therefore, the downlink data may be identified through information about the GTP tunnel. For description of the information about the GTP tunnel, refer to the foregoing description. Details are not described again.

In this way, the donor-CU 2 (that is, the second CU) may determine the service attribute information of the downlink data of the terminal based on information received from the donor-CU 1.

S202: The first CU receives, from the second CU, the information about the GTP tunnel of the downlink data and service attribute information corresponding to the GTP tunnel.

FIG. 7-1 is still used as an example. To enable the donor-CU 1 (that is, the first CU) to determine the first mapping, the donor-CU 2 (the second CU) needs to send, to the donor-CU 1, the service attribute information that is of the downlink data of the terminal and that is determined by the donor-CU 2. For example, the donor-CU 2 sends, to the donor-CU 1, the information about the GTP tunnel of the downlink data of the terminal and the service attribute information corresponding to the GTP tunnel. The service attribute information may be used by the donor-CU 1 to determine the first mapping (including a route mapping and/or a bearer mapping) of the downlink data of the terminal. The service attribute information may also be used by the donor-CU 1 to add service attribute information to an IP data packet.

S203: The first CU determines the first mapping.

Optionally, before step S203, S104 and S105 may be further included. In a possible implementation, the first CU determines the first mapping based on information received from the second CU in steps S104 to S105.

S204: The first CU sends the first mapping to the second CU.

Correspondingly, the second CU receives the first mapping from the first CU.

S205: The first CU sends the downlink data to a second DU.

Correspondingly, the second DU receives the downlink data from the first CU.

For specific implementations of steps S203 to S205, refer to the foregoing steps S101 to S103.

Embodiment 3

Figure 11:
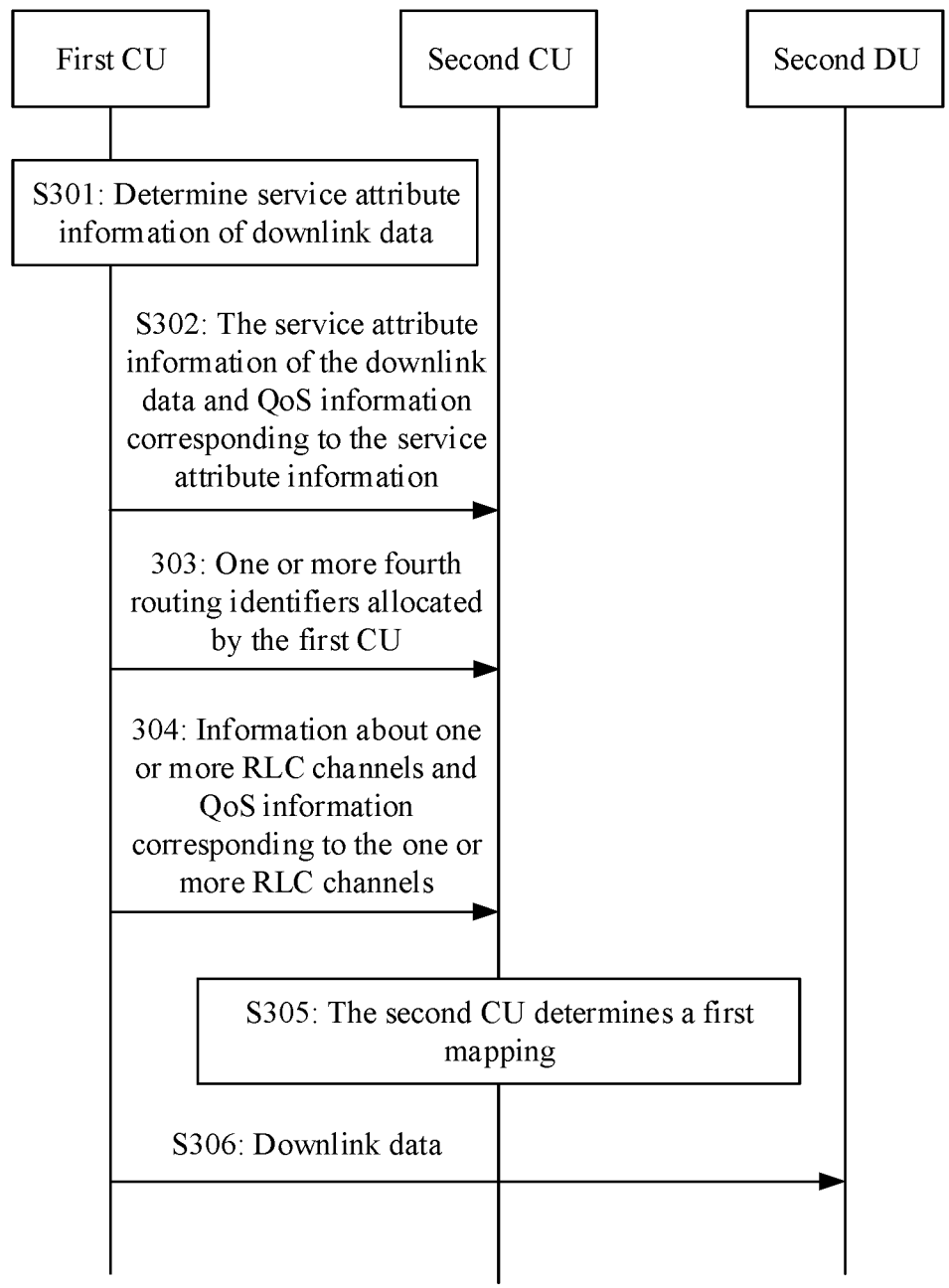

This application further provides a communication method. In Embodiment 1 and Embodiment 2, a first mapping is determined by a first CU. Different from Embodiment 1 and Embodiment 2, the first mapping is determined by a second CU in Embodiment 3. Specifically, referring to FIG. 11, the method includes the following steps.

S301: The first CU determines service attribute information of downlink data.

S302: The first CU sends, to the second CU, the service attribute information of the downlink data and QoS information corresponding to the service attribute information.

Correspondingly, the second CU receives, from the first CU, the service attribute information of the downlink data and the QoS information corresponding to the service attribute information.

For descriptions of the service attribute information of the downlink data and the QoS information corresponding to the service attribute information, refer to Embodiment 1 and Embodiment 2.

S303: The first CU sends, to the second CU, one or more fourth routing identifiers allocated by the first CU.

The second CU receives, from the first CU, the one or more fourth routing identifiers allocated by the first CU.

A third routing identifier is different from the one or more fourth routing identifiers. In this way, it can be ensured that a routing identifier allocated by the second CU to a downlink transmission path of the downlink data does not conflict with a routing identifier allocated by the first CU.

S304: The second CU receives, from the first CU, information about one or more RLC channels and QoS information corresponding to the one or more RLC channels.

Optionally, the one or more RLC channels include the following second RLC channel. In other words, the one or more RLC channels are RLC channels managed and controlled by the first CU, and the one or more RLC channels are not managed and controlled by the second CU. For example, still referring to FIG. 7-1, the one or more RLC channels may be an RLC channel between an IAB 2-DU and an IAB 3-MT. Information that is about an RLC channel and that is received by the donor-CU 2 from the donor-CU 1 includes: an identifier of an IAB 2 node, an identifier of an IAB 3 node, an identifier of the RLC channel (for example, an RLC channel 1 to an RLC channel 3) established between the IAB 2-DU and the IAB 3-MT, and QoS information corresponding to each RLC channel (QoS information corresponding to the RLC channel 1 to the RLC channel 3).

Optionally, an identifier of a node may be information about a BAP address of the node or other information. For example, the identifier of the IAB 2 node may be a BAP address of the IAB 2 node, and the identifier of the IAB 3 node may be a BAP address of the IAB 3 node.

In this embodiment, a sequence of steps S301, S302, and steps S303, and S304 is not limited.

S305: The second CU determines the first mapping.

The first mapping includes a route mapping and/or a bearer mapping. The route mapping is a mapping relationship between the downlink data and a downlink transmission path. The bearer mapping is a mapping relationship between the downlink data and a downlink transmission bearer. The downlink transmission path includes a transmission path between the first CU of a first donor node and a target node of the downlink data through a second distributed unit DU of a second donor node. The downlink transmission bearer includes a radio link control RLC channel between the second DU and a first node. The first node is a next-hop node of the second DU.

Optionally, the mapping relationship between the downlink data and the downlink transmission path includes a target address of the downlink data, the service attribute information of the downlink data, and a third routing identifier corresponding to the target address and the service attribute information.

Optionally, the mapping relationship between the downlink data and the downlink transmission bearer includes the target address of the downlink data, the service attribute information of the downlink data, and information about a second RLC channel corresponding to the target address and the service attribute information.

Optionally, the second CU determines the first mapping based on information received from the first CU in steps S302 to S304. Specifically, the second CU determines the route mapping based on the service attribute information and the QoS information corresponding to the service attribute information, that is, determines the target address, the service attribute information, and a routing identifier corresponding to the target address and the service attribute information. It may be understood that the routing identifier is different from the routing identifier allocated by the first CU. The second CU determines the bearer mapping based on the service attribute information and the QoS information corresponding to the service attribute information, that is, determines the target address, the service attribute information, and information about an RLC channel corresponding to the target address and the service attribute information.

S306: The first CU sends the downlink data to the second DU.

Correspondingly, the second DU receives the downlink data from the first CU.

After receiving the downlink data from the first CU, the second DU performs route selection and bearer selection for the downlink data based on the first mapping received from the second CU.

FIG. 7-1 is still used as an example. In some embodiments, according to the foregoing solution, the donor-CU 2 determines an RLC channel used for transmitting the downlink data between a donor-DU 2 and an IAB 4 node. In this way, after the donor-DU 2 receives the downlink data from the donor-CU 1, the donor-DU 2 maps the downlink data to a corresponding RLC channel and sends the downlink data to the IAB 4 node.

The IAB 4 node sends, to the IAB 2 node, the downlink data based on a mapping relationship that is between an ingress RLC channel and an egress RLC channel and that is determined by the donor-CU 2. The ingress RLC channel refers to an RLC channel between the donor-DU 2 and an IAB 4-MT, and the egress RLC channel refers to an RLC channel between an IAB 4-DU and an IAB 2-MT.

For the IAB 2 node, a downlink bearer mapping on the IAB 2 node can be implemented in two manners.

In a possible implementation, the donor-CU 1 determines a bearer mapping on the IAB 2 node. Downlink transmission is used as an example for description. The donor-CU 1 determines the downlink bearer mapping on the IAB 2 node, that is, the donor-CU 1 determines a mapping relationship between an ingress RLC channel and an egress RLC channel on the IAB 2 node, and sends the mapping relationship to the IAB 2 node. The ingress RLC channel refers to an RLC channel between the IAB 4-DU and the IAB 2-MT, and the egress RLC channel refers to an RLC channel between the IAB 2-DU and the IAB 3-MT. That is, the IAB 4-DU maps the downlink data to the ingress RLC channel and sends the downlink data to the IAB 2-MT, after the IAB 2-MT extracts the downlink data from the ingress RLC channel, the IAB 2-MT sends the downlink data to the IAB 2-DU through an internal interface, and the IAB 2-DU maps the downlink data to a corresponding egress RLC channel and sends the downlink data to the IAB 3-MT. In this implementation, the mapping relationship between the downlink data and the downlink transmission bearer includes information about the ingress RLC channel and information about the egress RLC channel.

In this implementation, the donor-CU 1 does not learn information about the ingress RLC channel on the IAB 2 node. The donor-CU 1 needs to receive, from the donor-CU 2, the information about the ingress RLC channel on the IAB 2 node, so that the donor-CU 1 determines the bearer mapping Information about an RLC channel includes: an identifier of the IAB 4 node, an identifier of the IAB 2 node, an identifier of an RLC channel (for example, an RLC channel 1 to an RLC channel 3) established between the IAB 4-DU and the IAB 2-MT, and QoS information corresponding to each RLC channel (QoS information corresponding to the RLC channel 1 to the RLC channel 3).

Optionally, an identifier of a node may be information about a BAP address of the node or other information. For example, the identifier of the IAB 4 node may be a BAP address of the IAB 4 node, and the identifier of the IAB 2 node may be a BAP address of the IAB 2 node.

In another possible implementation, the donor-CU 2 determines a bearer mapping on the IAB 2 node. Downlink transmission is used as an example for description. The donor-CU 2 determines a downlink bearer mapping on the IAB 2 node, that is, the donor-CU 2 determines a mapping relationship between an ingress RLC channel and an egress RLC channel on the IAB 2 node, and sends the mapping relationship to the IAB 2 node through the donor-CU 1. In this implementation, the mapping relationship between the downlink data and the downlink transmission bearer includes information about the ingress RLC channel and information about the egress RLC channel.

In this implementation, the donor-CU 2 does not learn information about the egress RLC channel on the IAB 2 node. The donor-CU 2 needs to receive, from the donor-CU 1, the information about the egress RLC channel on the IAB 2 node, so that the donor-CU 2 determines the bearer mapping. For information about an RLC channel, refer to the description in step S304. Details are not described herein again.

The IAB 3 node is similar to the IAB 2 node. A downlink bearer mapping scheme on the IAB 3 node is the same as a mapping scheme on the IAB 2 node 2. Details are not described herein again.

Embodiment 4

Figure 12:
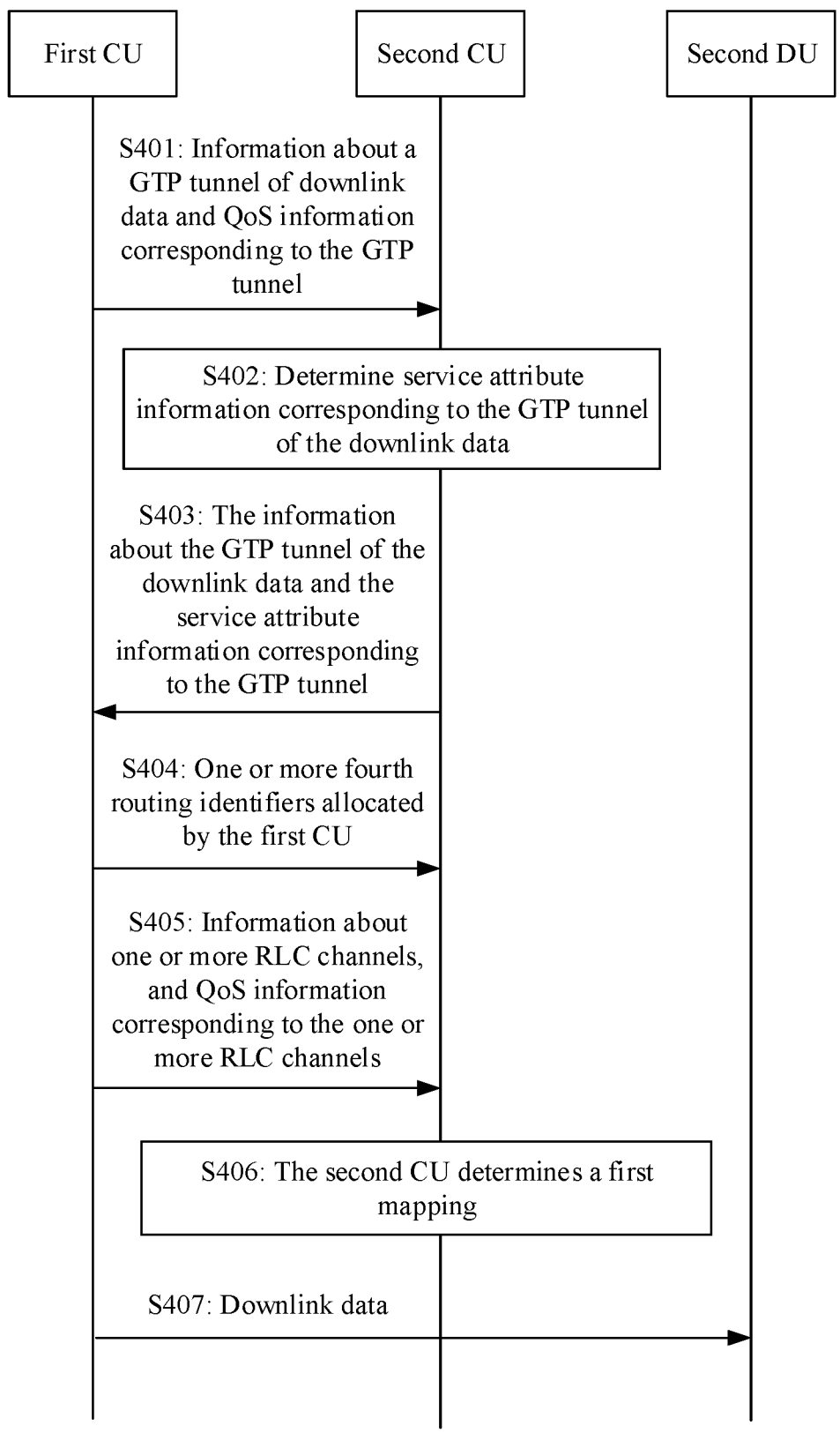

This application further provides a communication method. Similar to Embodiment 3, a first mapping is determined by a second CU in Embodiment 4. Different from Embodiment 3, service attribute information is determined by the second CU in Embodiment 4. Specifically, referring to FIG. 12, the method further includes the following steps.

S401: A first CU sends, to the second CU, information about a GTP tunnel of downlink data and QoS information corresponding to the GTP tunnel.

Correspondingly, the second CU receives, from the first CU, the information about the GTP tunnel of the downlink data and the QoS information corresponding to the GTP tunnel.

S402: The second CU determines service attribute information corresponding to the GTP tunnel of the downlink data.

The second CU determines, based on the information about the GTP tunnel of the downlink data and the QoS information corresponding to the GTP tunnel, the service attribute information corresponding to the GTP tunnel of the downlink data.

S403: The second CU sends, to the first CU, the information about the GTP tunnel of the downlink data and the service attribute information corresponding to the GTP tunnel.

The first CU receives, from the second CU, the information about the GTP tunnel of the downlink data and the service attribute information corresponding to the GTP tunnel.

S404: The first CU sends, to the second CU, one or more fourth routing identifiers allocated by the first CU.

The second CU receives, from the first CU, the one or more fourth routing identifiers allocated by the first CU. A third routing identifier is different from the one or more fourth routing identifiers.

For step S404, refer to step S303.

S405: The first CU sends, to the second CU, information about one or more RLC channels and QoS information corresponding to the one or more RLC channels.

The second CU receives, from the first CU, the information about one or more RLC channels and the QoS information corresponding to the one or more RLC channels.

For step S405, refer to step S304.

S406: The second CU determines the first mapping.

The first mapping includes a route mapping and/or a bearer mapping. The route mapping is a mapping relationship between the downlink data and a first routing identifier of a downlink transmission path. The bearer mapping is a mapping relationship between the downlink data and a downlink transmission bearer, and more specifically between the downlink data and a first backhaul radio link control RLC channel included in the downlink transmission bearer. The downlink transmission path includes a transmission path between the first CU of a first donor node and a target node of the downlink data through a second distributed unit DU of a second donor node. The downlink transmission bearer includes a first backhaul radio link control RLC channel between the second DU and a first node. The first node is a next-hop node of the second DU.

For step S406, refer to step S305.

S407: The first CU sends the downlink data to the second DU.

Correspondingly, the second DU receives the downlink data from the first CU.

For step S407, refer to step S306.

In the foregoing embodiments, top-down migration is used as an example to describe technical solutions of embodiments of this application, a scenario in FIG. 7-1 is used as an example, and that an IAB 2 node performs top-down migration means that an IAB 2-MT migrates earlier than an IAB 2-DU, or the IAB 2-MT completes migration first. In this scenario, the first donor node is a source donor node, and the second donor node is a target donor node.

Technical solutions in embodiments of this application (for example, technical solutions of Embodiment 1 to Embodiment 4) are also applicable to bottom-up migration. For example, in a bottom-up migration scenario shown in FIG. 7-2, the IAB 2-DU migrates earlier than the IAB 2-MT, or the IAB 2-DU completes migration earlier than the IAB 2-MT. In this scenario, the first donor node is a target donor node, and the second donor node is a source donor node. FIG. 7-2 is used as an example. After receiving the downlink data from a core network device, a donor-CU 2 may add the service attribute information to the downlink data, and send, to a donor-DU 1, the downlink data that carries the service attribute information.

A correspondence between the downlink data and the service attribute information may be generated by the donor-CU 2, or may be generated by a donor-CU 1, and then sent by the donor-CU 1 to the donor-CU 2.

The donor-DU 1 receives the downlink data from the donor-CU 2, performs route selection on the downlink data based on the route mapping, and performs bearer selection on the downlink based on the bearer mapping.

The route mapping required by the donor-DU 1 may be determined by the donor-CU 1 and sent to the donor-DU 1. The route mapping may also be determined by the donor-CU 2 and sent to the donor-CU 1, and then sent to the donor-DU 1 by the donor-CU 1. Similarly, the bearer mapping may be determined by the donor-CU 1 and sent to the donor-DU 1. The bearer mapping may also be determined by the donor-CU 2 and sent to the donor-CU 1, and then sent to the donor-DU 1 by the donor-CU 1.

It should be noted that in this embodiment of this application, an example in which the first CU and the second CU determine the first mapping of the downlink data is used to describe a solution of normally transmitting the downlink data of the terminal in an inter-donor-CU migration scenario. For a mapping configuration of uplink data of a terminal, refer to the method for configuring the first mapping of the downlink data, so that the terminal can perform uplink data transmission. The mapping configuration of the uplink data of the terminal is mainly a mapping configuration on an access IAB node of the terminal (in this embodiment, the access IAB node of the terminal is an IAB 3 node). As shown above, the route/bearer mapping on the IAB 3 node may be determined by the donor-CU 1 and sent to the IAB 3 node, or may be determined by the donor-CU 2 and sent to the donor-CU 1, and then sent by the donor-CU 1 to the IAB 3 node. A solution of how to enable normal transmission of the uplink data is not specifically described herein.

The solutions in Embodiment 1 to Embodiment 4 of this application are not only applicable to a bottom-up or top-down inter-donor-CU migration scenario, but also applicable to a dual-connectivity scenario such as that shown in FIG. 7-4.

Embodiment 5

An embodiment of this application further provides a communication method, and the method is applied to a dual-connectivity scenario.

In the RAN3 #110 meeting, the standard mentions that the R17 eIAB needs to support CP-UP transmission separation in a dual-connectivity scenario, that is, support transmission of an F1-C message and F1-U data by using different paths. Specifically, the F1-C message is transmitted over a single-hop air interface, and the F1-U data may be transmitted over a multi-hop air interface.

Figure 5:
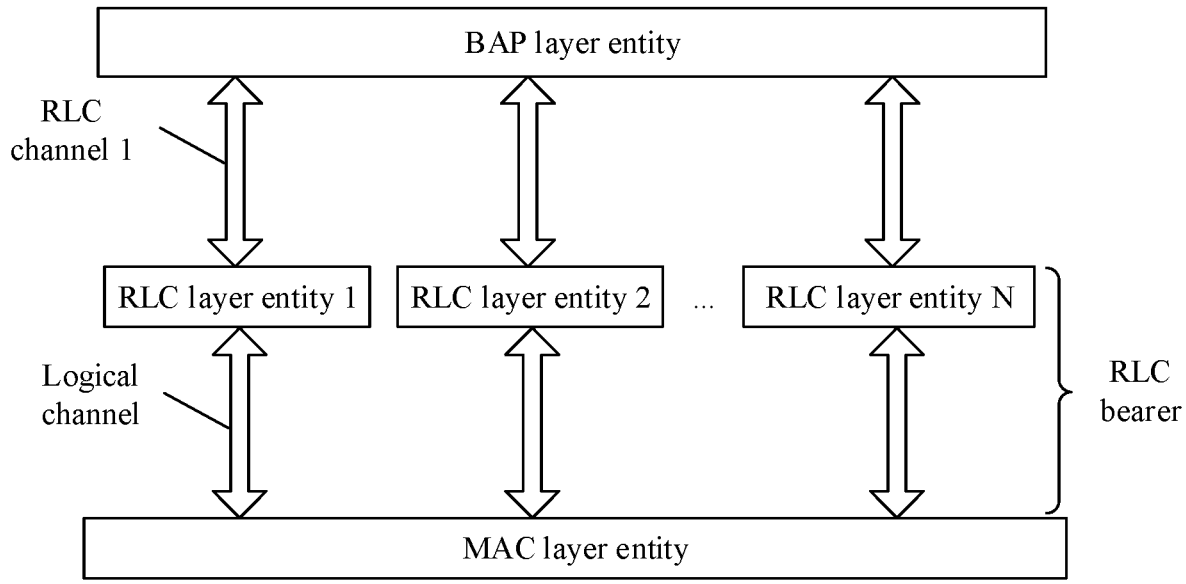
FIG. 5 is a schematic diagram of an RLC channel, an RLC bearer, and a logical channel according to an embodiment of this application.

FIG. 7-5 and FIG. 7-6 show two scenarios for F1-C message and F1-U data transmission. In the dual-connectivity scenario, a transmission path between an IAB node and a master eNodeB may be referred to as a master cell group (MCG) path (or may be another name), and a path between the IAB node and a secondary eNodeB is referred to as a secondary cell group (SCG) path.

As shown in (a) of FIG. 7-5, in a scenario 1, there may be one or more other IAB nodes between a secondary eNodeB S-donor and an IAB 2 node on an SCG path, that is, a multi-hop node exists. The SCG path may be used for transmitting the F1-U data. There is no other IAB node between a master eNodeB M-gNB and the IAB 2 node on an MCG path, and the MCG path may be used for transmitting the F1-C message. As shown in (a) of FIG. 7-6, in a scenario 2, there may be one or more other IAB nodes between an M-donor and an IAB-node 2 on an MCG path. An example in which there is one another IAB node is used for description in the figure. The MCG path may be used for transmitting the F1-U data. The SCG path of a single-hop air interface shown in (a) of FIG. 7-5 may be used to transmit the F1-C message.

The S-donor in the foregoing scenario 1 or scenario 2 may be of a CU-DU split architecture, or may be a complete entity. The IAB 1 node and the IAB 2 node may be of an MT-DU architecture. (b) of FIG. 7-5 and (b) of FIG. 7-6 are drawn by using an example in which a donor is of a DU-CU architecture and an IAB node is of an MT-CU architecture.

It can be learned that the F1-C message may be transmitted through a single-hop MCG path or SCG path, and the F1-U data may be transmitted through a single-hop or multi-hop SCG path or MCG path.

Figure 13:
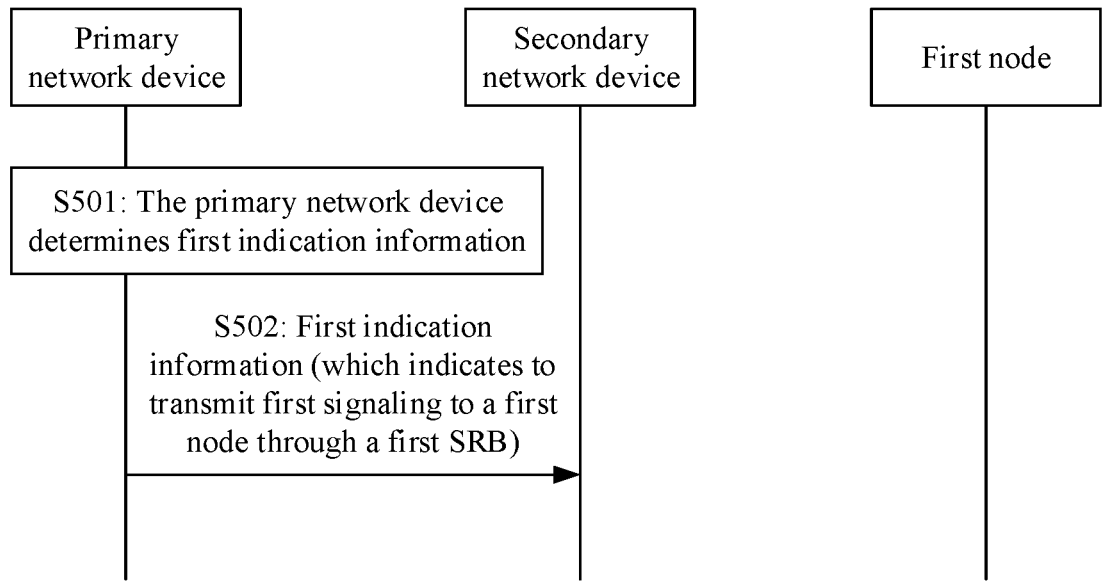

This embodiment is mainly targeted for the foregoing dual-connectivity scenario. Referring to FIG. 13, the method includes the following steps.

S501: A primary network device determines first indication information.

The first indication information is used to request/indicate a secondary network device to transmit first signaling to a first node through a first signaling radio bearer (SRB). The first signaling radio bearer is a signaling radio bearer on an SCG path. Optionally, the first signaling radio bearer includes an SRB 3 or a split SRB. Optionally, the first signaling includes an F1-C message. For example, the F1-C message includes an F1AP message, or the F1-C message includes SCTP/IPsec-related signaling.

That is, in the method, the primary network device determines whether the secondary network device needs to establish the first signaling radio bearer to transmit the first signaling, and requests or indicates the secondary network device to establish the first signaling radio bearer to transmit the first signaling.

The scenario 2 in (b) of FIG. 7-6 is used as an example. The primary network device is an M-donor, the secondary network device is an S-gNB, and the first node is an IAB 2 node. The M-donor sends the first indication information to the S-gNB, to request/indicate the S-gNB to transmit the F1-C message to the IAB 2 node through, for example, an SRB 3 (or a split SRB).

S502: The primary network device sends the first indication information to the secondary network device.

Figure 14:
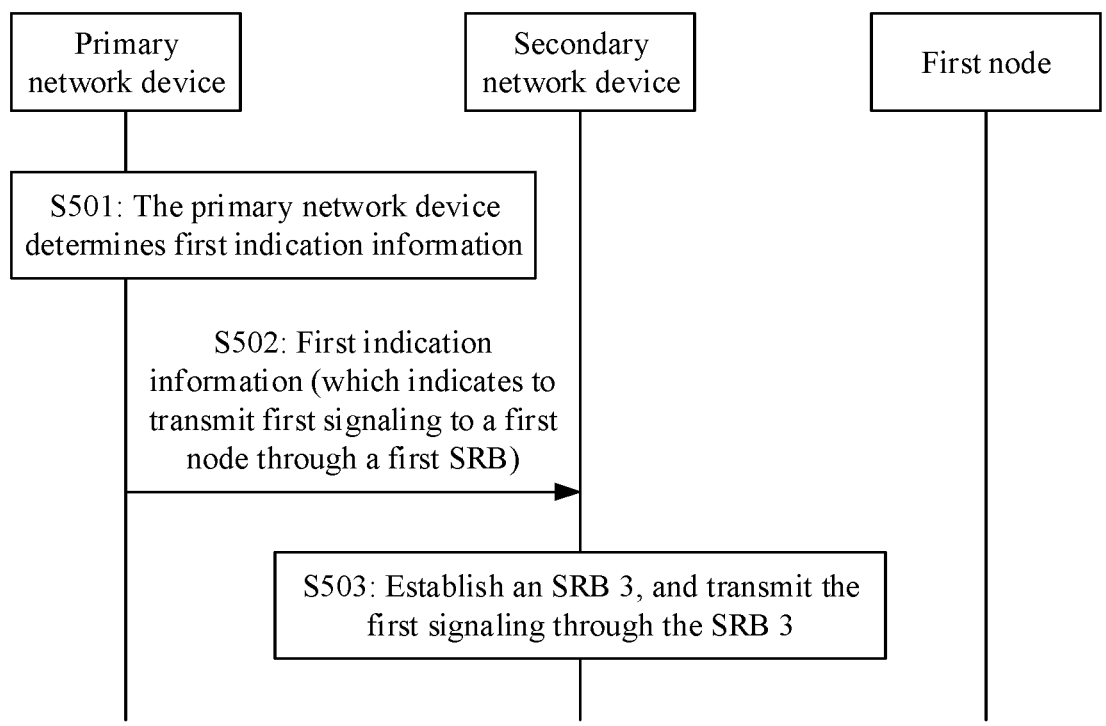

In a possible implementation, after the secondary network device receives the first indication information from the primary network device, if a condition for establishing a first SRB is met, referring to FIG. 14, the secondary network device may further perform step S503 of establishing an SRB 3, and transmit the first signaling, for example, the F1-C message, through the SRB 3.

Optionally, the secondary network device sends indication information to the primary network device, to indicate that the first signaling radio bearer has been established.

Figures 1, 15:
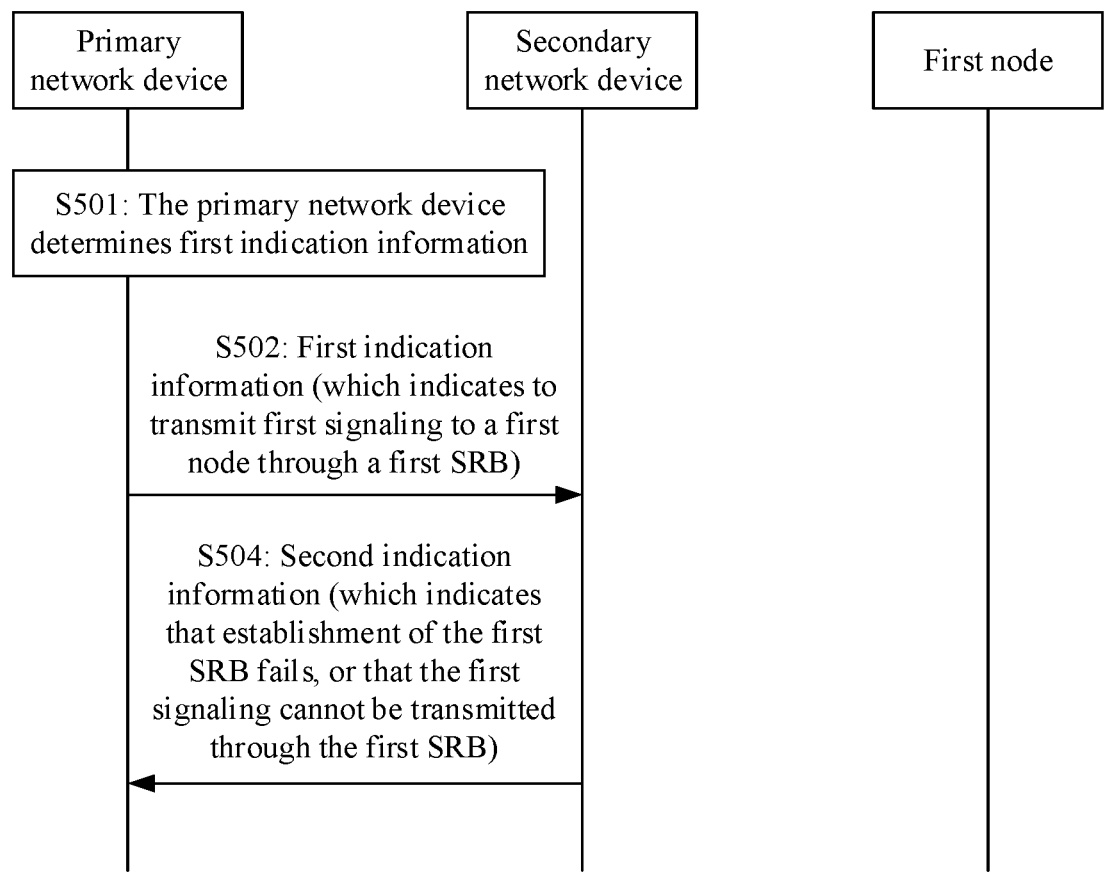
Figures 2, 15:
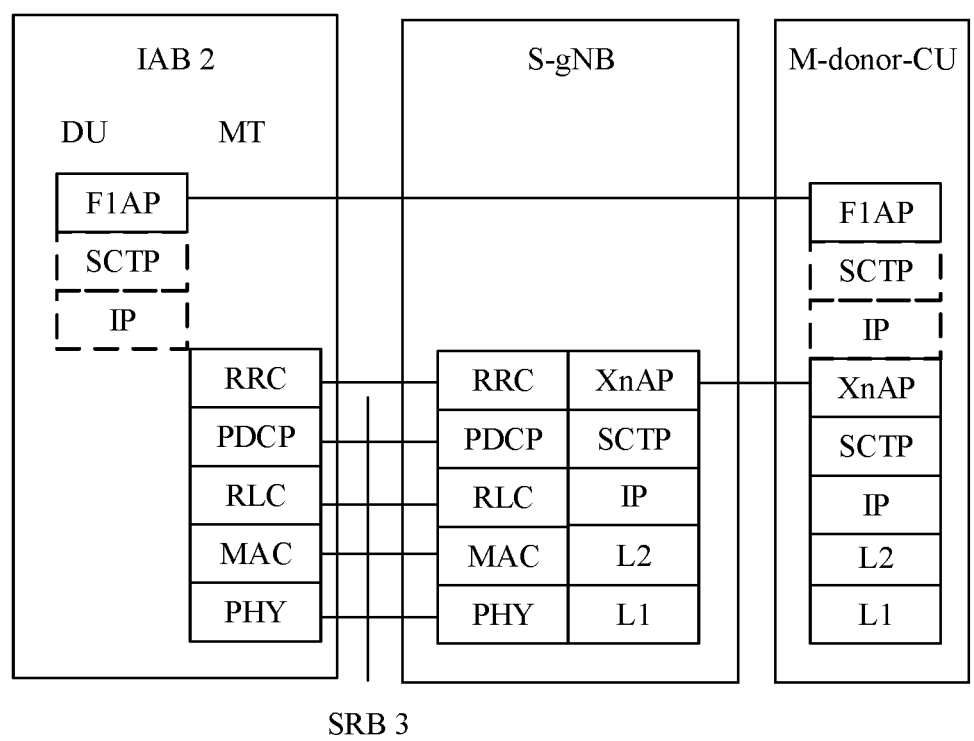
Figures 3, 15:
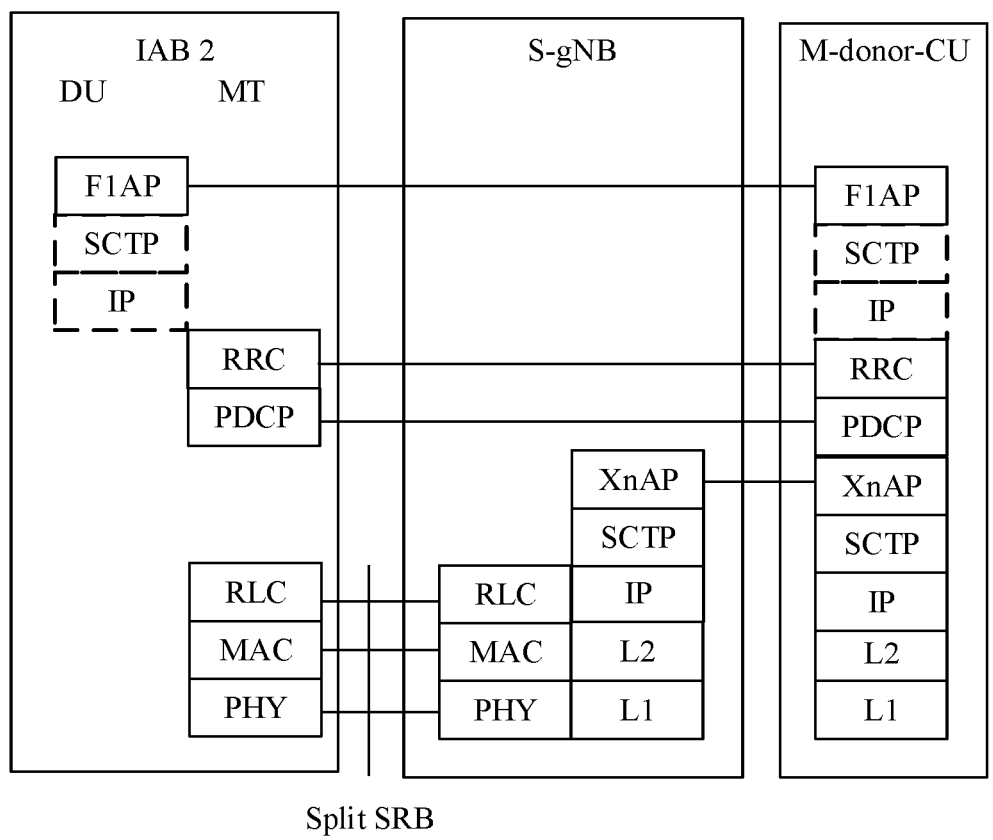

Alternatively, in another possible implementation, if the secondary network device does not meet the condition for establishing the first SRB, for example, the SRB 3 cannot be established, or there is no sufficient resource, referring to FIG. 15-1, the secondary network device may further perform the following step S504:

S504: The secondary network device sends second indication information to the primary network device.

The primary network device receives the second indication information from the secondary network device.

The second indication information indicates that establishment of the first signaling radio bearer fails, or that the first signaling cannot be transmitted through the first signaling radio bearer. Optionally, the second indication information carries a cause value for a first signaling radio bearer establishment failure.

In this way, the primary network device can clearly learn of an establishment status of the first signaling radio bearer based on the second indication information received from the secondary network device, to determine a manner of transmitting the first signaling.

The following describes a specific implementation of transmitting the F1-C message through an SCG path with reference to the accompanying drawings.

Manner 1: The F1-C message is transmitted through an SRB 3 on the SCG.

With reference to FIG. 15-2, in this manner, an M-donor-CU generates the F1-C message, that is, an F1AP message (including a UE-associated F1AP message and a non-UE associated F1AP message), encapsulates the generated F1-C message into an XnAP message, and sends the XnAP message to an S-gNB through an Xn interface between the M-donor-CU and the S-gNB. The S-gNB extracts the F1-C message from the received XnAP message, encapsulates the F1-C message into an NR RRC message over a Uu interface, maps the message to an SRB 3, and sends the message to an IAB-MT 2. The IAB-MT 2 extracts the F1-C message from the RRC message and sends the F1-C message to an IAB-DU 2 through an internal interface for parsing.

Alternatively, an M-donor-CU generates the F1-C message, processes the F1-C message at an SCTP layer, encapsulates the generated F1-C message into an IP packet, then adds the IP packet to an XnAP message, and sends the XnAP message to an S-gNB over an Xn interface. The SgNB extracts the IP packet from the received XnAP message, encapsulates the IP packet into an NR RRC message over a Uu interface, maps the RRC message to an SRB 3, and sends the RRC message an IAB-MT 2 through the SRB 3. The IAB-MT 2 extracts the IP packet from the RRC message and sends the IP packet to an IAB-DU 2 through an internal interface, and the IAB-DU 2 parses the IP packet.

Manner 2: The F1-C message is transmitted through a split SRB on the SCG.

With reference to FIG. 15-3, in this manner, an M-donor-CU encapsulates the generated F1-C message into an NR RRC message, then encapsulates the RRC message into an XnAP message, and sends the XnAP message to an S-gNB over an Xn interface. The S-gNB extracts the RRC message from the received XnAP message, maps the RRC message to a split SRB (for example, a split SRB 1 or a split SRB 2), and sends the RRC message to an IAB-MT 2 through the split SRB. The IAB-MT 2 extracts the F1-C message from the RRC message and sends the F1-C message to an IAB-DU 2 through an internal interface for parsing.

Alternatively, an M-donor-CU generates the F1-C message, processes the generated F1-C message at an SCTP layer and an IP layer, encapsulates the generated F1-C message into an NR RRC message, then processes the RRC message at a PDCP layer to obtain a PDCP PDU, encapsulates the PDCP PDU into an XnAP message, and sends the XnAP message to an S-gNB through an Xn interface. The S-gNB extracts the PDCP PDU from the received XnAP message, maps the PDCP PDU to a split SRB, and sends the split SRB to an IAB-MT 2. The IAB-MT 2 extracts an IP packet from the received split SRB and sends the IP packet to an IAB-DU 2 through an internal interface for parsing.

Embodiment 6

Figure 16:
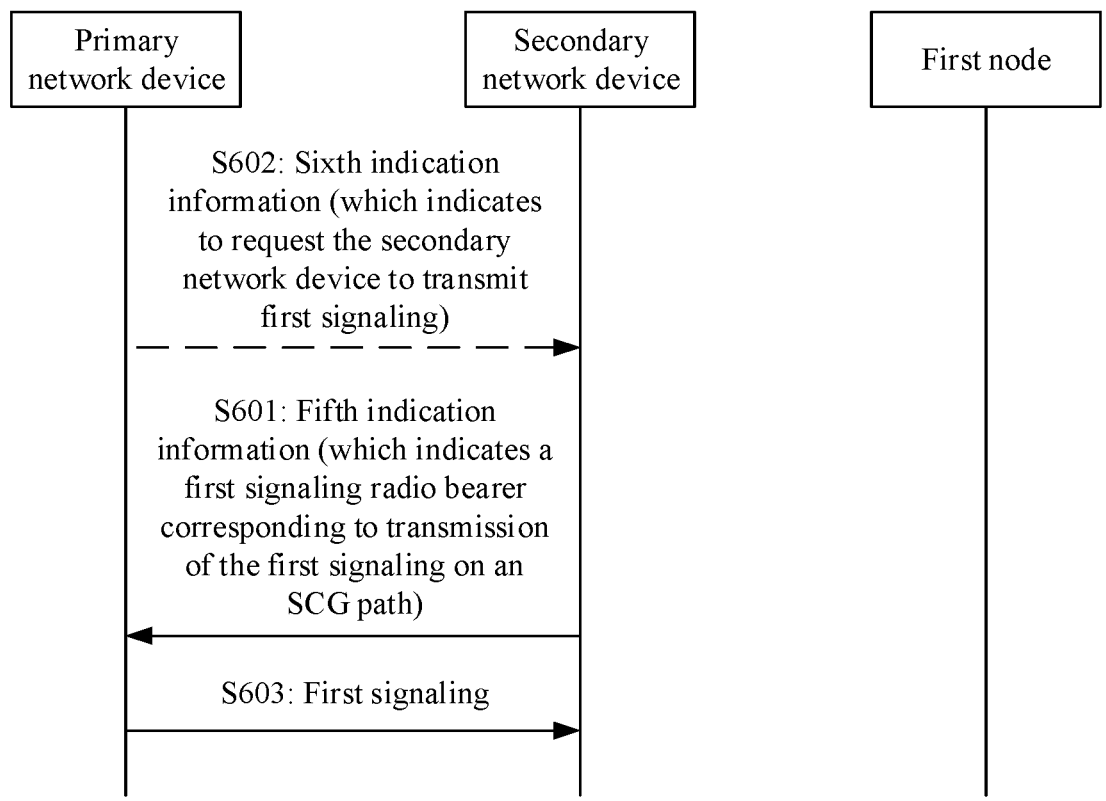
FIG. 16 to FIG. 19 each are a flowchart of a communication method according to an embodiment of this application.

An embodiment of this application further provides a communication method, and the method is applied to a dual-connectivity scenario. Different from Embodiment 5 in which a primary network device determines a signaling radio bearer (an SRB 3 or a split SRB) used for transmitting first signaling on an SCG path, a secondary network device determines the signaling radio bearer used for transmitting the first signaling on the SCG path in Embodiment 6. Refer to FIG. 16. The method includes the following steps.

S601: A secondary network device sends fifth indication information to a primary network device.

Correspondingly, the primary network device receives the fifth indication information from the secondary network device.

The fifth indication information indicates a corresponding first signaling radio bearer for transmitting the first signaling on the SCG path, that is, indicates that the first signaling is transmitted through the first signaling radio bearer. Optionally, the first signaling includes an F1-C message. For example, the F1-C message includes an F1AP message, or the F1-C message includes SCTP/IPsec-related signaling.

Optionally, the first signaling radio bearer includes an SRB 3 or a split SRB.

In some embodiments, if the secondary network device determines that the first signaling needs to be transmitted through the SCG path, the secondary network device sends the fifth indication information to the primary network device, to indicate a first signaling radio bearer corresponding to transmission of the first signaling on the SCG path.

In some other embodiments, the primary network device may further trigger the secondary network device to send the fifth indication information. In a possible implementation, before step S601, the primary network device may perform step S602 of sending sixth indication information to the secondary network device, where the sixth indication information is used to request the secondary network device to transmit the first signaling. In response to the sixth indication information, the secondary network device determines whether to transmit the first signaling through the SCG path, and if the secondary network device determines to transmit the first signaling on the SCG path, the secondary network device sends the fifth indication information to the primary network device.

S603: The primary network device sends the first signaling to the secondary network device based on the fifth indication information.

When the secondary network device transmits the first signaling by using different first signaling radio bearers, the primary network device may process the first signaling differently. Two processing methods are described as follows:

In a first processing manner, if the first signaling radio bearer indicated by the fifth indication information is an SRB 3, the primary network device sends the first signaling to the secondary network device. This is equivalent to that the primary network device directly transparently transmits the first signaling. Subsequently, the secondary network device encapsulates the first signaling into an RRC message, and sends the RRC message to a first node through the SRB 3. For a specific process, refer to manner 1 in step S504 in Embodiment 5. Details are not described herein again.

In a second processing manner, if the first signaling radio bearer indicated by the fifth indication information is a split SRB, the primary network device first encapsulates the first signaling into an RRC message, and sends the RRC message to the secondary network device. Subsequently, the secondary network device sends the RRC message to a first node through the split SRB. For a specific process, refer to manner 2 in step S504 in Embodiment 5. Details are not described herein again.

Embodiment 7

Figure 17:
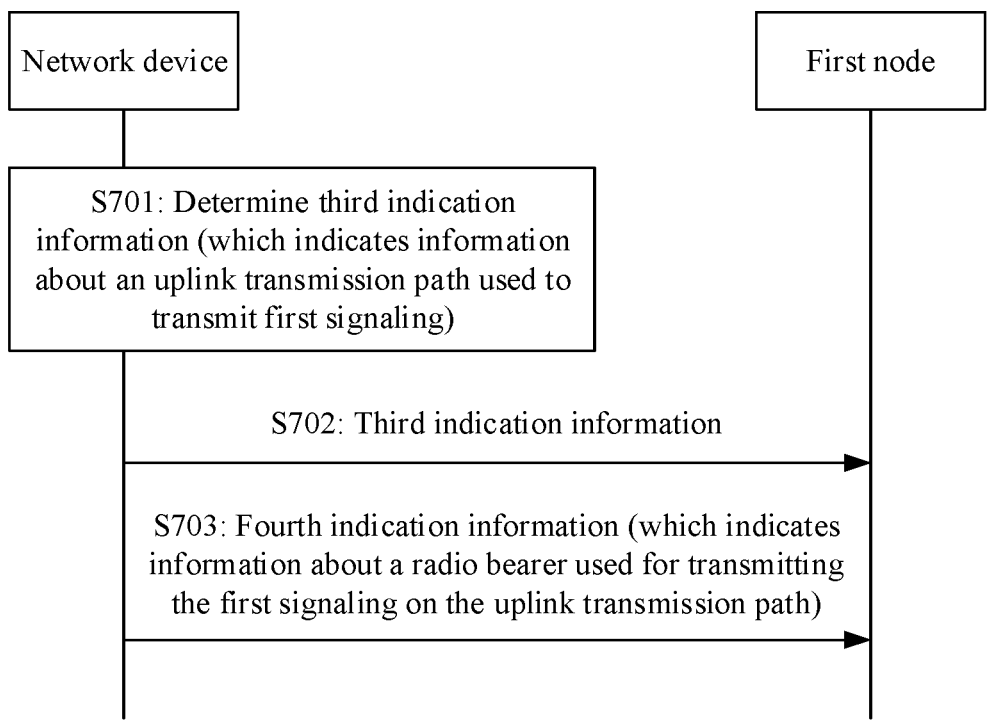

This application further provides a communication method. The communication method is used by a network device to indicate, to a first node, an uplink transmission path (an SCG path or an MCG path) used for transmitting first signaling. Refer to FIG. 17. The method includes the following steps.

S701: The network device determines third indication information.

The third indication information indicates information about the uplink transmission path used for transmitting the first signaling, and the uplink transmission path includes an MCG path or an SCG path.

Optionally, the third indication information may be of an enumerated type. To be specific, the third indication information includes an identifier of the MCG path or an identifier of the SCG path. Alternatively, the third indication information may include an identifier of a cell group, or may include a preset identifier. For example, one bit is set to indicate the MCG path or the SCG path, 0 indicates the MCG path, and 1 indicates the SCG path.

The network device may be a primary network device or a secondary network device. In other words, the primary network device or the secondary network device may determine that the uplink transmission path of the first signaling is the SCG path or the MCG path.

S702: The network device sends third indication information to a first node.

If the network device is the primary network device, the primary network device directly sends the third indication information to the first node, to indicate that the uplink transmission path used by the first node to transmit the first signaling is the SCG path or the MCG path.

Alternatively, if the network device is the secondary network device, the network device sends the third indication information to the first node through the primary network device.

A scenario 2 in (b) of FIG. 7-6 is still used as an example. The primary network device is an M-donor, the secondary network device is an S-gNB, and the first node is an IAB 2 node. If the M-donor determines the third indication information (that is, determines the uplink transmission path used for transmitting the first signaling (for example, an F1-C message)), the M-donor directly sends the third indication information to the IAB 2 node. For example, the M-donor carries the third indication information through an RRC message, and sends the RRC message to an IAB 2-MT. In this way, the IAB 2 node can learn that the F1-C message needs to be transmitted to the M-donor through, for example, an S-gNB on the SCG path. For another example, if the S-gNB determines the third indication information, the S-gNB sends the third indication information to the IAB 2 node through the M-donor. For example, the S-gNB carries the third indication information through an RRC message and sends the RRC message to the M-donor, and the M-donor further sends the RRC message to the IAB 2-MT.

Optionally, the network device may further perform step S703 of sending fourth indication information to the first node.

The fourth indication information indicates information about a radio bearer used for transmitting the first signaling on the uplink transmission path. Optionally, if the uplink transmission path is an MCG path, a corresponding signaling radio bearer may be an SRB 1 or an SRB 2. If the uplink transmission path is an SCG path, a corresponding signaling radio bearer may be an SRB 3 or a split SRB.

Alternatively, optionally, the fourth indication information indicates information about a logical channel used for transmitting the first signaling on the uplink transmission path.

In this way, the first node can learn of the first signaling radio bearer (for example, the SRB 3 of the SCG path) used for transmitting the first signaling (for example, the F1-C message).

Embodiment 8

Figure 18:
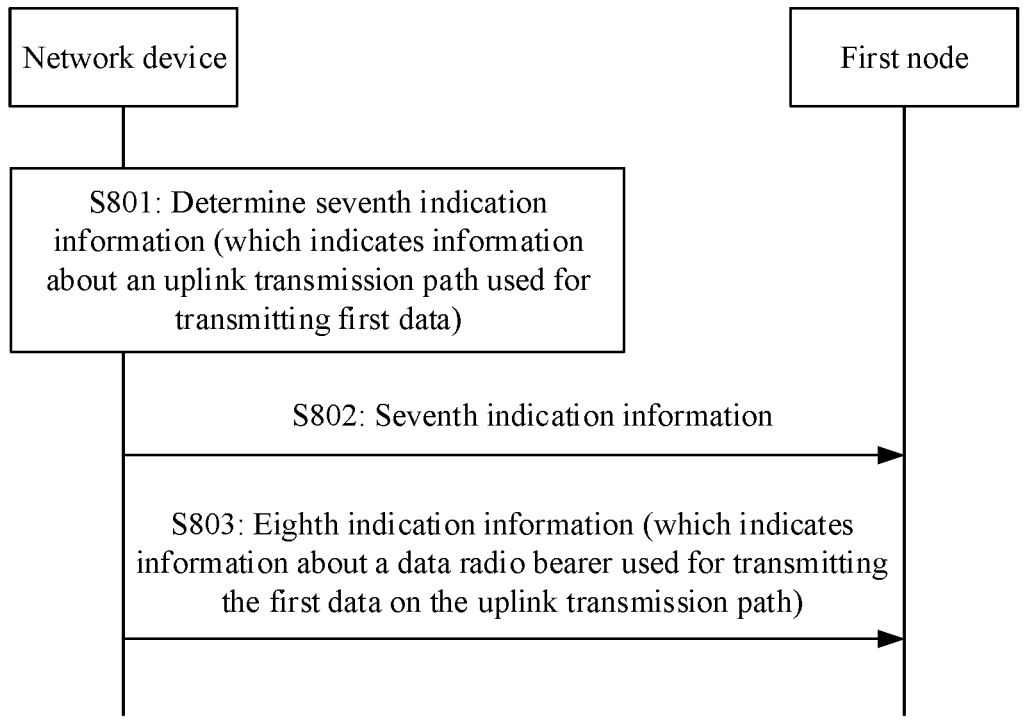

This application further provides a communication method. The communication method is used by a network device to indicate, to a first node, an uplink transmission path used for transmitting first data. Refer to FIG. 18. The method includes the following steps.

S801: The network device determines seventh indication information.

The seventh indication information indicates information about the uplink transmission path used for transmitting the first data, and the uplink transmission path includes an MCG path or an SCG path. Optionally, the first data may be F1-U data. For example, the F1-U data refers to data transmitted in a GTP tunnel established between a donor-CU and a DU of an access IAB node, and the access IAB node is an IAB node accessed by a terminal. For example, FIG. 7-1 is still used as an example. Data transmitted in a GTP tunnel between the donor-CU 1 and the IAB 3-DU may be referred to as the F1-U data.

Optionally, the seventh indication information may be of an enumerated type. To be specific, the seventh indication information includes an identifier of the MCG path or an identifier of the SCG path. Alternatively, the seventh indication information may include an identifier of a cell group, or may include a preset identifier. For example, one bit is set to indicate the MCG path or the SCG path, 0 indicates the MCG path, and 1 indicates the SCG path.

The network device may be a primary network device or a secondary network device. In other words, the primary network device or the secondary network device may determine that the uplink transmission path of the first data is the SCG path or the MCG path.

S802: The network device sends the seventh indication information to a first node.

If the network device is the primary network device, the primary network device directly sends the seventh indication information to the first node, to indicate that the uplink transmission path used by the first node to transmit the first data is the SCG path or the MCG path. Optionally, the seventh indication information is carried in an RRC message generated by the primary network device.

Alternatively, if the network device is the secondary network device, the network device sends the seventh indication information to the first node through the primary network device. The seventh indication information is carried in an RRC message generated by the secondary network device. In this way, the secondary network device may deliver only one piece of seventh indication information to the first node, and the first node may transmit all F1-U data on a UL path indicated by the seventh indication information.

In some other embodiments, if the network device is the secondary network device, the secondary network device may further send a GTP-TEID to the first node through the primary network device. There is a correspondence between the GTP-TEID and the seventh indication information. Optionally, the seventh indication information and the GTP-TEID are carried in an F1AP message generated by the secondary network device. In this way, the secondary network device may configure transmission of UL F1-U data of the first node per GTP-U. In other words, the secondary network device separately indicates a UL transmission path of each type of F1-U data. This indication manner is flexible, and different types of F1-U data may be transmitted on different UL transmission paths. This facilitates load balancing.

Optionally, the network device may further perform step S803 of sending eighth indication information to the first node.

The eighth indication information indicates information about a data radio bearer used for transmitting the first data on the uplink transmission path.

Alternatively, optionally, the eighth indication information indicates information about a logical channel used for transmitting the first data on the uplink transmission path.

Optionally, the eighth indication information may be carried in an RRC message generated by the network device, and the network device sends the RRC message to the first node.

Alternatively, optionally, the eighth indication information may be carried in an F1AP message generated by the network device, and the network device sends the RRC message to the first node.

In this way, the first node can learn of a first data radio bearer used for transmitting the first data (for example, the F1-U message).

In this embodiment of this application, a dual-connectivity scenario in which CP/UP transmission is separated is mainly used as an example for description. It may be understood that the solution in this embodiment of this application is also applicable to another dual-connectivity scenario, for example, a scenario in which CP/UP transmission is not separated.

Embodiment 5 to Embodiment 8 are applicable to a dual-connectivity scenario such as that shown in FIG. 7-5 or FIG. 7-6 or another similar scenario.

Embodiment 9

Figure 19:
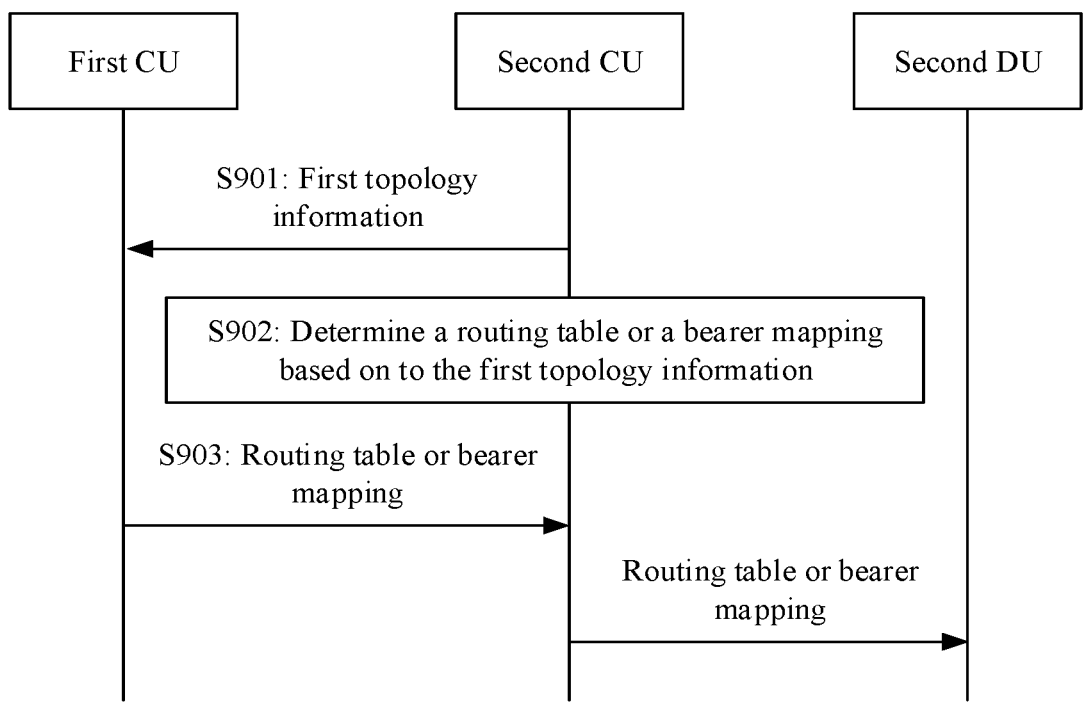

An embodiment of this application further provides a communication method, to obtain a required network topology of a network in an inter-donor-CU migration scenario. The method is applicable to the inter-donor-CU migration scenario, or a dual-connectivity scenario such as the scenario shown in FIG. 7-4 (or another dual-connectivity scenario). Refer to FIG. 19. The method includes the following steps.

S901: A second CU sends first topology information of a network to a first CU.

Correspondingly, the first CU receives the first topology information of the network from the second CU.

The first topology information of the network is used to represent a node in the network and a connection relationship between the nodes. Optionally, the second CU sends, to the first CU, topology information of a node managed and controlled by the second CU. For example, referring to FIG. 7-1, a donor-CU 2 may send, to a donor-CU 1, topology information corresponding to a donor-DU 2 and an IAB 4 node.

The first CU may be a CU of a source donor node, and the second CU is a CU of a target donor node. Alternatively, the first CU may be a CU of a target donor node, and the second CU is a CU of a source donor node.

In some other embodiments, the first CU may also send, to the second CU, topology information of a node managed and controlled by the first CU. Still refer to FIG. 7-1. For example, the first CU is the donor-CU 1, and the second CU is the donor-CU 2. The donor-CU 1 may send, to the donor-CU 2, topology information of a donor-DU 1, an IAB 1 node, an IAB 2 node, and an IAB 3 node.

S902: The first CU determines a routing table or a bearer mapping based on the first topology information.

S903: The first CU sends the routing table or the bearer mapping to the second CU.

Determining the routing table is used as an example for description. The method in this embodiment means that the first CU may determine a routing table of each node on a target path. Refer to FIG. 7-1. The target path includes the first CU, a second DU, an IAB 4 node, the IAB 2 node, and the IAB 3 node. The first CU sends the determined routing table to the second CU, and the second CU sends the routing table to a corresponding node. The routing table includes a routing identifier and an identifier that is of a next-hop node and that corresponds to the routing identifier. For example, refer to FIG. 7-1. The donor-CU 1 determines a routing table on the donor-DU 2, for example, a correspondence between a routing identifier 1 and an identifier of the IAB 4 node, and the donor-CU 1 sends the correspondence to the donor-CU 2. The donor-CU 2 sends the correspondence to the donor-DU 2, so that the donor-DU 2 performs routing based on the correspondence.

Embodiment 9 may be applicable to an inter-donor-CU migration scenario such as FIG. 7-1 and FIG. 7-2, and is applicable to a dual-connectivity scenario such as FIG. 7-4.

The foregoing mainly describes the solutions in embodiments of this application from a perspective of the methods. It may be understood that, to implement the foregoing functions, the network node includes a corresponding hardware structure and/or software module for implementing each function. Persons skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this application.

In embodiments of this application, functional unit division may be performed on the network node based on the foregoing method examples. For example, functional units may be obtained through division based on corresponding functions, or two or more functions may be integrated into one processing unit 1701. The integrated unit may be implemented in a form of hardware, or may be implemented in a form of a software functional unit. It should be noted that, in embodiments of this application, division into the units is an example, and is merely a logical function division. In actual implementation, another division manner may be used.

Figure 20:
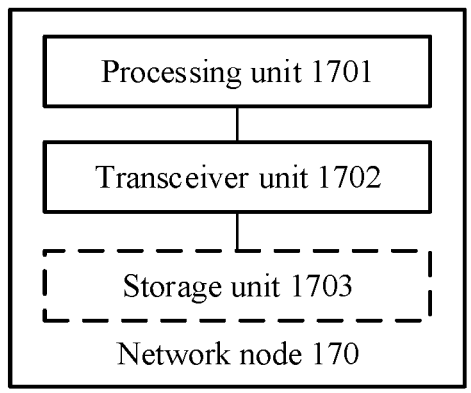
FIG. 20 to FIG. 22 each are a schematic diagram of a structure of a network node according to an embodiment of this application.

An embodiment of this application further provides a network node (denoted as a network node 170). As shown in FIG. 20, the network node 170 includes a processing unit 1701 and a transceiver unit 1702.

That the network node 170 is a first donor node is used as an example, in a possible implementation:

The processing unit 1701 is configured to determine a first mapping. The first mapping includes a route mapping and/or a bearer mapping. The route mapping is a mapping relationship between downlink data and a downlink transmission path. The bearer mapping is a mapping relationship between the downlink data and a downlink transmission bearer. The downlink transmission path includes a transmission path between a first CU and a target node of the downlink data through a second DU of a second donor node. The downlink transmission bearer includes a radio link control RLC channel between the second DU and a first node. The first node is a next-hop node of the second DU.

The transceiver unit 1702 is configured to: send the first mapping to a second CU of the second donor node, and send the downlink data to the second DU.

Optionally, the transceiver unit 1702 is further configured to receive, from the second CU, one or more second routing identifiers allocated by the second CU; and a first routing identifier is different from the one or more second routing identifiers.

Optionally, the transceiver unit 1702 is further configured to receive, from the second CU, information about one or more RLC channels between the second DU and the first node, and quality of service QoS information corresponding to the one or more RLC channels, where the one or more RLC channels include a first RLC channel.

Optionally, the transceiver unit 1702 is further configured to send, to the second CU, information about a general packet radio service tunneling protocol GTP tunnel of the downlink data and QoS information corresponding to the GTP tunnel.

Optionally, the transceiver unit 1702 is further configured to receive, from the second CU, the information about the GTP tunnel of the downlink data and service attribute information corresponding to the GTP tunnel.

That the network node 170 is a second donor node is used as an example, in a possible implementation:

The processing unit 1701 is configured to determine a first mapping. The first mapping includes a route mapping and/or a bearer mapping. The route mapping is a mapping relationship between downlink data and a downlink transmission path. The bearer mapping is a mapping relationship between the downlink data and a downlink transmission bearer. The downlink transmission path includes a transmission path between a first CU and a target node of the downlink data through a second DU of a second donor node. The downlink transmission bearer includes an RLC channel between the second DU and a first node. The first node is a next-hop node of the second DU.

The transceiver unit 1702 is configured to receive the downlink data from the first CU.

Optionally, the transceiver unit 1702 is further configured to receive, from the first CU, service attribute information of the downlink data and quality of service QoS information corresponding to the service attribute information.

Optionally, the transceiver unit 1702 is further configured to receive, from the first CU, one or more fourth routing identifiers allocated by the first CU. A third routing identifier is different from the one or more fourth routing identifiers.

Optionally, the transceiver unit 1702 is further configured to receive, from the first CU, information about one or more RLC channels and QoS information corresponding to the one or more RLC channels.

Optionally, the transceiver unit 1702 is further configured to receive, from the first CU, information about a general packet radio service tunneling protocol GTP tunnel of the downlink data and QoS information corresponding to the GTP tunnel.

Optionally, the transceiver unit 1702 is further configured to send, to the first CU, the information about the GTP tunnel of the downlink data and service attribute information corresponding to the GTP tunnel.

For specific explanations of the mapping relationship between the downlink data and the downlink transmission path and the mapping relationship between the downlink data and the downlink transmission bearer, refer to the method embodiments.

Optionally, the first donor node is a source donor node, and the second donor node is a target donor node; or the first donor node is a target donor node, and the second donor node is a source donor node.

Optionally, the first donor node is a primary donor node, and the second donor node is a secondary donor node; or the first donor node is a secondary donor node, and the second donor node is a primary donor node.

Optionally, the network node 170 may further include a storage unit 1703, configured to store data and the like required by the network node 170.

All related content of each step involved in the foregoing method embodiments may be referenced to a function description of a corresponding functional module. Details are not described herein again.

The network node 170 may be a device, or may be a chip or another component in the device.

Units in FIG. 20 may also be referred to as modules. For example, the processing unit 1701 may be referred to as a processing module. In addition, in the embodiment shown in FIG. 20, a name of each unit may not be a name shown in the figure, and the name of each unit specifically depends on a division manner of the modules.

When each unit in FIG. 20 is implemented in a form of a software functional module and sold or used as an independent product, the units may be stored in a computer-readable storage medium. Based on such an understanding, the technical solutions of embodiments of this application essentially, or the part contributing to the conventional technology, or all or a part of the technical solutions may be implemented in the form of a software product. The software product is stored in a storage medium and includes several instructions for instructing a computer device (which may be a personal computer, a server, or a network device) or a processor to perform all or some of the steps of the methods described in embodiments of this application. The storage medium that stores the computer software product includes any medium that can store program code, for example, a USB flash drive, a removable hard disk, a read-only memory (ROM), a random access memory (RAM), a magnetic disk, or an optical disc.

Figure 21:
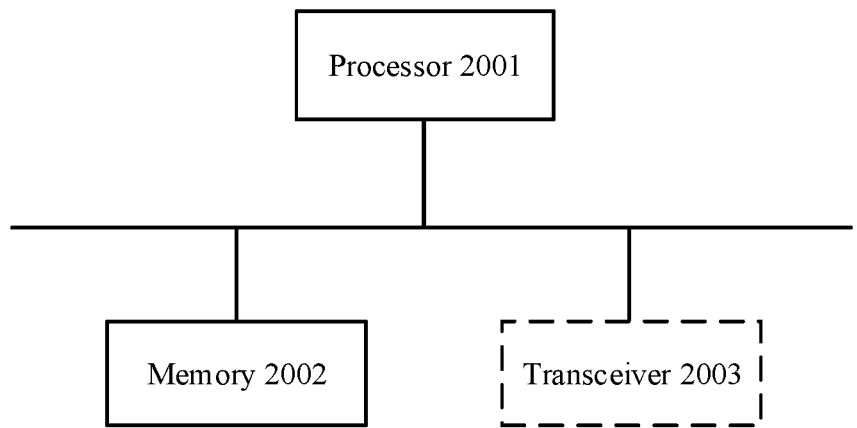
Figure 22:
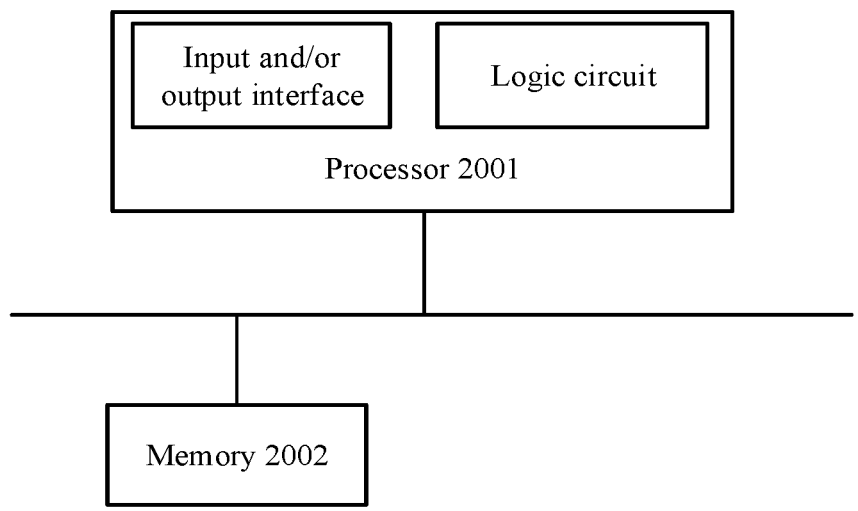

An embodiment of this application further provides a schematic diagram of a hardware structure of a network node (denoted as a network node 200). Refer to FIG. 21 or FIG. 22. The network node 200 includes a processor 2001. Optionally, the network node 200 further includes a memory 2002 connected to the processor 2001.

The processor 2001 may be a general-purpose central processing unit (CPU), a microprocessor, an application-specific integrated circuit (ASIC), or one or more integrated circuits configured to control program execution in the solutions in this application. The processor 2001 may alternatively include a plurality of CPUs, and the processor 2001 may be a single-core (single-CPU) processor, or may be a multi-core (multi-CPU) processor. The processor herein may be one or more devices, circuits, or processing cores configured to process data (for example, computer program instructions).

The memory 2002 may be a ROM, another type of static storage device that can store static information and instructions, a RAM, or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. This is not limited in this embodiment of this application. The memory 2002 may exist independently, or may be integrated with the processor 2001. The memory 2002 may include computer program code. The processor 2001 is configured to execute the computer program code stored in the memory 2002, to implement the method provided in the foregoing embodiments of this application.

In a first possible implementation, referring to FIG. 21, the network node 200 further includes a transceiver 2003. The processor 2001, the memory 2002, and the transceiver 2003 are connected through a bus. The transceiver 2003 is configured to communicate with another communication device or another protocol layer in the network node. Optionally, the transceiver 2003 may include a transmitter and a receiver. A component that is in the transceiver 2003 and that is configured to implement a receiving function (for example, receive a data packet delivered by an upper-layer protocol layer) may be considered as the receiver, and the receiver is configured to perform receiving steps in embodiments of this application. A component that is in the transceiver 2003 and that is configured to implement a sending function (for example, deliver a data packet to another protocol layer) may be considered as the transmitter, and the transmitter is configured to perform sending or delivering steps in embodiments of this application.

Based on the first possible implementation, a schematic diagram of a structure shown in FIG. 21 may be used to illustrate a structure of the network node in the foregoing embodiment. The processor 2001 is configured to control and manage an action of the network node. For example, the processor 2001 is configured to support the network node in performing steps in the foregoing method embodiments (for example, FIG. 8 to FIG. 14) and/or actions performed by the network node in another process described in embodiments of this application. The processor 2001 may communicate with another protocol layer in another communication device or a network node by using the transceiver 2003. The memory 2002 is configured to store program code and data that are of a terminal.

In a second possible implementation, the processor 2001 includes a logic circuit and an input interface and/or an output interface. The output interface is configured to perform a sending or delivering action in a corresponding method, and the input interface is configured to perform a receiving action in a corresponding method.

Based on the second possible implementation, referring to FIG. 22, a schematic diagram of a structure shown in FIG. 22 may be used to illustrate a structure of the network node in the foregoing embodiment. The processor 2001 is configured to control and manage an action of the network node. For example, the processor 2001 is configured to support the network node in performing steps in FIG. 8 to FIG. 14 and/or actions performed by the network node in another process described in embodiments of this application. The processor 2001 may communicate with another protocol layer in another communication device or network node by using the input interface and/or the output interface. The memory 2002 is configured to store program code and data that are of a terminal.

In a possible implementation, a "module" or unit in the network node 170 may refer to a specific ASIC, a circuit, a processor and a memory that execute one or more software or firmware programs, an integrated logic circuit, and/or another component that can provide the foregoing functions. In a simple embodiment, persons skilled in the art may figure out that the network node 170 may be in a form shown in FIG. 21 or FIG. 22.

For example, the processor 2001 shown in FIG. 21 or FIG. 22 may invoke computer-executable instructions stored in the memory 2002, so that the network node performs the communication method in the foregoing method embodiments.

Specifically, functions/implementation processes of the transceiver unit 1702 and the processing unit 1701 in FIG. 20 may be implemented by the processor 2001 shown in FIG. 21 or FIG. 22 by invoking the computer-executable instructions stored in the memory 2002. Alternatively, a function/implementation process of the processing unit 1701 in FIG. 20 may be implemented by the processor 2001 shown in FIG. 21 or FIG. 22 by invoking the computer-executable instructions stored in the memory 2002, and a function/implementation process of the transceiver unit 1702 in FIG. 20 may be implemented by using the transceiver 2003 shown in FIG. 21.

An embodiment of this application further provides a computer-readable storage medium, including instructions. When the instructions are run on a computer, the computer is enabled to perform any one of the foregoing methods.

An embodiment of this application further provides a computer program product including instructions. When the computer program product runs on a computer, the computer is enabled to perform any one of the foregoing methods.

An embodiment of this application further provides a system chip. The system chip is applied to a network node, the system chip includes at least one processor, and related program instructions are executed in the at least one processor, to perform any method provided in the foregoing embodiments.

An embodiment of this application further provides a communication system, including one or more network nodes provided in the foregoing embodiments.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to embodiments, in a process of implementing this application that claims protection, persons skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. It is clear that persons skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication system comprising:
a first donor node comprising a first central unit (CU) and a first distributed unit (DU); and
a second donor node comprising a second CU and a second DU,
wherein the first CU is configured to:
determine a first mapping, wherein the first mapping comprises a route mapping or a bearer mapping, the route mapping is between downlink data and a downlink transmission path, the bearer mapping is between downlink data and a downlink transmission bearer, the downlink transmission path comprises a transmission path between the first CU and a target node of the downlink data through the second DU of the second donor node, the downlink transmission bearer comprises a radio link control (RLC) channel between the second DU and a first node, and the first node is a next-hop node of the second DU;
send the first mapping to the second CU; and
send downlink data to the second DU,
wherein the second CU is configured to receive the first mapping, and
wherein the second DU is configured to receive the downlink data.

2. The communication system according to claim 1, wherein the mapping relationship between the downlink data and the downlink transmission path comprises a target address of the downlink data, service attribute information of the downlink data, and a first routing identifier corresponding to the target address and the service attribute information, the mapping relationship between the downlink data and the downlink transmission bearer comprises the target address of the downlink data, the service attribute information of the downlink data, and information about a first RLC channel corresponding to the target address and the service attribute information, and the downlink data comprises the service attribute information.

3. The communication system according to claim 2, wherein the first CU is further configured to:
receive, from the second CU, one or more second routing identifiers allocated by the second CU, wherein the first routing identifier is different from the one or more second routing identifiers.

4. The communication system according to claim 2, wherein the first CU is further configured to:
receive, from the second CU, information regarding one or more RLC channels between the second DU and the first node, and quality of service (QoS) information corresponding to the one or more RLC channels, wherein the one or more RLC channels comprise the first RLC channel.

5. The communication system according to claim 1, wherein the first CU is further configured to:
send, to the second CU, information regarding a general packet radio service tunneling protocol (GTP) tunnel of the downlink data and quality of service (QoS) information corresponding to the GTP tunnel, and
wherein the second CU is further configured to:
determine service attribute information of the downlink data according to the information regarding the GTP tunnel of the downlink data and the QoS information corresponding to the GTP tunnel.

6. The communication system according to claim 5, wherein the second CU is further configured to:
send, to the first CU, the information about the GTP tunnel of the downlink data and service attribute information corresponding to the GTP tunnel.

7. The communication system according to claim 1, wherein the first donor node is a source donor node and the second donor node is a target donor node, or the first donor node is a target donor node and the second donor node is a source donor node.

8. The communication system according to claim 1, wherein the first donor node is a primary donor node and the second donor node is a secondary donor node, or the first donor node is a secondary donor node, and the second donor node is a primary donor node.

9. A central unit (CU) of a donor node, comprising:
a memory storing executable instructions;
a processor configured to execute the executable instructions to perform operations of:
determining a first mapping, wherein the first mapping comprises a route mapping or a bearer mapping, the route mapping is between downlink data and a downlink transmission path, the bearer mapping is between downlink data and a downlink transmission bearer, the downlink transmission path comprises a transmission path between the CU and a target node of the downlink data through a second distributed unit (DU) of a second donor node, the downlink transmission bearer comprises a radio link control (RLC) channel between the second DU and a first node, and the first node is a next-hop node of the second DU;
sending the first mapping to a second CU of the second donor node; and
sending the downlink data to the second DU.

10. The central unit according to claim 9, wherein the mapping relationship between the downlink data and the downlink transmission path comprises a target address of the downlink data, service attribute information of the downlink data, and a first routing identifier corresponding to the target address and the service attribute information, the mapping relationship between the downlink data and the downlink transmission bearer comprises the target address of the downlink data, the service attribute information of the downlink data, and information about a first RLC channel corresponding to the target address and the service attribute information, and the downlink data comprises the service attribute information.

11. The central unit according to claim 10, wherein the processor is configured to further perform an operation of:
receiving, from the second CU, one or more second routing identifiers allocated by the second CU, wherein the first routing identifier is different from the one or more second routing identifiers.

12. The central unit according to claim 10, wherein the processor is configured to further perform an operation of:
receiving, from the second CU, information about one or more RLC channels between the second DU and the first node, and quality of service (QoS) information corresponding to the one or more RLC channels, wherein the one or more RLC channels comprise the first RLC channel.

13. The central unit according to claim 9, wherein the processor is configured to further perform an operation of:
sending, to the second CU, information about a general packet radio service tunneling protocol, (GTP), tunnel of the downlink data and quality of service (QoS) information corresponding to the GTP tunnel to determine service attribute information of the downlink data.

14. The central unit according to claim 13, wherein the processor is configured to further perform an operation of:
receiving, from the second CU, the information about the GTP tunnel of the downlink data and service attribute information corresponding to the GTP tunnel.

15. A central unit (CU) of a donor node, comprising:
a memory storing executable instructions;
a processor configured to execute the executable instructions to perform operations of:
receiving a first mapping from a first CU of a first donor node, wherein the first mapping comprises a route mapping or a bearer mapping, the route mapping is between downlink data and a downlink transmission path, the bearer mapping is between downlink data and a downlink transmission bearer, the downlink transmission path comprises a transmission path between the first CU and a target node of the downlink data through a distributed unit (DU) of the donor node, the downlink transmission bearer comprises a radio link control (RLC) channel between the DU and a first node, and the first node is a next-hop node of the DU; and
sending the first mapping to the DU for processing downlink data received by the DU from the first CU.

16. The central unit according to claim 15, wherein the mapping relationship between the downlink data and the downlink transmission path comprises a target address of the downlink data, service attribute information of the downlink data, and a third routing identifier corresponding to the target address and the service attribute information, the mapping relationship between the downlink data and the downlink transmission bearer comprises the target address of the downlink data, the service attribute information of the downlink data, and information about a first RLC channel corresponding to the target address and the service attribute information, and the downlink data comprises the service attribute information.

17. The central unit according to claim 16, wherein the processor is configured to further perform an operation of:
sending, to the first CU, one or more second routing identifiers allocated by the CU, wherein the first routing identifier is different from the one or more second routing identifiers.

18. The central unit according to claim 16, wherein the processor is configured to further perform an operation of:
sending, to the first CU, information about one or more RLC channels between the DU and the first node, and quality of service (QoS) information corresponding to the one or more RLC channels, wherein the one or more RLC channels comprise the first RLC channel.

19. The central unit according to claim 15, wherein the processor is configured to further perform operations of:
receiving, from the first CU, information regarding a general packet radio service tunneling protocol (GTP) tunnel of the downlink data and quality of service (QoS) information corresponding to the GTP tunnel; and
determining service attribute information of the downlink data according to the information about the GTP tunnel of the downlink data and the QoS information corresponding to the GTP tunnel.

20. The central unit according to claim 19, wherein the processor is configured to further perform an operation of:
sending, to the first CU, the information regarding the GTP tunnel of the downlink data and service attribute information corresponding to the GTP tunnel.

* * * * *